United States Patent
Harper et al.

(10) Patent No.: US 9,032,039 B2
(45) Date of Patent: May 12, 2015

(54) METHOD, APPARATUS AND SYSTEM FOR MANAGEMENT OF INFORMATION CONTENT FOR ENHANCED ACCESSIBILITY OVER WIRELESS COMMUNICATION NETWORKS

(71) Applicant: Wireless Ink Corporation, East Islip, NY (US)

(72) Inventors: David Walker Harper, Bay Shore, NY (US); Jason James Sabella, Coram, NY (US); William Henry Munch, Tampa, FL (US)

(73) Assignee: Wireless Ink Corporation, East Islip, NY (US)

( * ) Notice: Subject to any disclaimer, the term of this patent is extended or adjusted under 35 U.S.C. 154(b) by 0 days.

(21) Appl. No.: 14/483,916

(22) Filed: Sep. 11, 2014

(65) Prior Publication Data

US 2014/0380150 A1 Dec. 25, 2014

Related U.S. Application Data

(63) Continuation of application No. 14/324,698, filed on Jul. 7, 2014, which is a continuation of application No. 14/175,768, filed on Feb. 7, 2014, now Pat. No. 8,825,801, which is a continuation of application No.

(Continued)

(51) Int. Cl.
*G06F 15/173* (2006.01)
*G06F 15/16* (2006.01)
(Continued)

(52) U.S. Cl.
CPC .......... *G06F 17/30905* (2013.01); *G06Q 30/02* (2013.01); *H04L 12/18* (2013.01);
(Continued)

(58) Field of Classification Search
USPC ......... 709/217, 219, 223, 228, 248, 250, 203, 709/246
See application file for complete search history.

(56) References Cited

U.S. PATENT DOCUMENTS

| 5,267,042 A | 11/1993 | Tsuchiya et al. |
| 5,450,344 A | 9/1995 | Woo et al. |

(Continued)

FOREIGN PATENT DOCUMENTS

| EP | 1132847 A2 | 9/2001 |
| EP | 1213883 A1 | 6/2002 |

(Continued)

OTHER PUBLICATIONS

Discovery Documents produced in *Wireless Ink Corporation v. Facebook Inc. et al.*, Case Nos. 10-CV-1841 and 11-CV-1751, compilation of source code files containing documents numbered UKN3301-UKN3399.

(Continued)

*Primary Examiner* — Jude Jean Gilles
(74) *Attorney, Agent, or Firm* — Ryan, Mason & Lewis, LLP

(57) ABSTRACT

A method includes obtaining content at a mobile device, determining information associated with at least one wireless networking functionality of the mobile device responsive to user input, and providing the content and determined information to at least one server for insertion into a specified application-based information channel. Another method includes receiving, at a server from a mobile device, content for insertion into a specified application-based information channel, receiving, at the server from the mobile device, information associated with at least one wireless network functionality of the mobile device, and integrating the content and the information associated with said at least one wireless network functionality of the mobile device into the specified application-based information channel.

30 Claims, 48 Drawing Sheets

Related U.S. Application Data

13/364,950, filed on Feb. 2, 2012, now Pat. No. 8,793,336, which is a continuation of application No. 13/027,519, filed on Feb. 15, 2011, now Pat. No. 8,135,801, which is a continuation of application No. 12/548,928, filed on Aug. 27, 2009, now Pat. No. 7,908,342, which is a continuation of application No. 10/464,526, filed on Jun. 18, 2003, now Pat. No. 7,599,983.

(60) Provisional application No. 60/389,430, filed on Jun. 18, 2002.

(51) Int. Cl.

| | | |
|---|---|---|
| *G06F 17/30* | (2006.01) | |
| *G06Q 30/02* | (2012.01) | |
| *H04L 12/18* | (2006.01) | |
| *H04L 12/58* | (2006.01) | |
| *H04L 29/06* | (2006.01) | |
| *H04L 29/08* | (2006.01) | |
| *G06F 3/0484* | (2013.01) | |
| *G06F 3/0481* | (2013.01) | |
| *H04L 12/24* | (2006.01) | |
| *H04W 8/00* | (2009.01) | |
| *H04W 4/00* | (2009.01) | |
| *H04W 8/20* | (2009.01) | |
| *H04W 28/06* | (2009.01) | |

(52) U.S. Cl.
CPC ........ *H04L12/1827* (2013.01); *H04L 12/1859* (2013.01); *H04L 12/189* (2013.01); *H04L 12/5895* (2013.01); *H04L 29/06* (2013.01); *H04L 51/38* (2013.01); *H04W 4/00* (2013.01); *H04W 8/20* (2013.01); *H04W 28/06* (2013.01); *H04L 67/14* (2013.01); *H04L 67/04* (2013.01); *H04L 67/18* (2013.01); *H04L 69/329* (2013.01); *G06F 3/0484* (2013.01); *G06F 3/0481* (2013.01); *H04L 41/22* (2013.01); *H04W 8/00* (2013.01); *G06F 17/30896* (2013.01); *H04L 67/02* (2013.01); *H04L 67/10* (2013.01); *H04L 67/42* (2013.01)

(56) References Cited

U.S. PATENT DOCUMENTS

| | | | |
|---|---|---|---|
| 5,712,679 A | 1/1998 | Coles | |
| 5,727,156 A | 3/1998 | Herr-Hoyman et al. | |
| 5,768,640 A | 6/1998 | Takahashi et al. | |
| 5,870,552 A | 2/1999 | Dozier et al. | |
| 5,902,347 A | 5/1999 | Backman et al. | |
| 5,945,989 A | 8/1999 | Freishtat et al. | |
| 5,960,074 A | 9/1999 | Clark | |
| 5,983,227 A | 11/1999 | Nazem et al. | |
| 6,020,884 A | 2/2000 | MacNaughton et al. | |
| 6,035,119 A | 3/2000 | Massena et al. | |
| 6,065,120 A | 5/2000 | Laursen et al. | |
| 6,167,253 A | 12/2000 | Farris et al. | |
| 6,199,077 B1 | 3/2001 | Inala et al. | |
| 6,199,099 B1 | 3/2001 | Gershman et al. | |
| 6,199,157 B1 | 3/2001 | Dov et al. | |
| 6,233,608 B1 | 5/2001 | Laursen et al. | |
| 6,263,352 B1 | 7/2001 | Cohen | |
| 6,268,851 B1 | 7/2001 | Bricklin et al. | |
| 6,282,362 B1 | 8/2001 | Murphy et al. | |
| 6,304,746 B1 | 10/2001 | Fascenda et al. | |
| 6,311,058 B1 | 10/2001 | Wecker et al. | |
| 6,313,835 B1 | 11/2001 | Gever et al. | |
| 6,343,302 B1 | 1/2002 | Graham | |
| 6,356,543 B2 | 3/2002 | Hall et al. | |
| 6,356,905 B1 | 3/2002 | Gershman et al. | |
| 6,363,392 B1 | 3/2002 | Halstead et al. | |
| 6,421,717 B1 | 7/2002 | Kloba et al. | |
| 6,438,575 B1 | 8/2002 | Khan et al. | |
| 6,445,777 B1 | 9/2002 | Clark | |
| 6,453,361 B1 | 9/2002 | Morris | |
| 6,462,778 B1 | 10/2002 | Abram et al. | |
| 6,493,758 B1* | 12/2002 | McLain | 709/227 |
| 6,496,849 B1 | 12/2002 | Hanson et al. | |
| 6,525,768 B2 | 2/2003 | Obradovich | |
| 6,546,397 B1 | 4/2003 | Rempell | |
| 6,553,412 B1 | 4/2003 | Kloba et al. | |
| 6,560,639 B1 | 5/2003 | Dan et al. | |
| 6,594,347 B1* | 7/2003 | Calder et al. | 379/88.01 |
| 6,628,934 B2 | 9/2003 | Rosenberg et al. | |
| 6,658,464 B2 | 12/2003 | Reisman | |
| 6,668,353 B1 | 12/2003 | Yurkovic | |
| 6,670,968 B1 | 12/2003 | Schilit et al. | |
| 6,691,158 B1 | 2/2004 | Douvikas et al. | |
| 6,738,950 B1 | 5/2004 | Barnett | |
| 6,757,530 B2 | 6/2004 | Rouse et al. | |
| 6,760,046 B2 | 7/2004 | I'Anson et al. | |
| 6,763,388 B1 | 7/2004 | Tsimelzon | |
| 6,769,009 B1 | 7/2004 | Reisman | |
| 6,779,019 B1 | 8/2004 | Mousseau et al. | |
| 6,779,042 B1 | 8/2004 | Kloba et al. | |
| 6,807,574 B1 | 10/2004 | Partovi et al. | |
| 6,834,306 B1 | 12/2004 | Tsimelzon | |
| 6,870,830 B1* | 3/2005 | Schuster et al. | 370/352 |
| 6,871,220 B1 | 3/2005 | Rajan et al. | |
| 6,879,965 B2 | 4/2005 | Fung et al. | |
| 6,914,626 B2 | 7/2005 | Squibbs | |
| 6,920,488 B1 | 7/2005 | Le Pennec et al. | |
| 6,943,825 B2 | 9/2005 | Silvester | |
| 6,993,575 B2 | 1/2006 | Abkowitz et al. | |
| 7,003,546 B1 | 2/2006 | Cheah | |
| 7,016,899 B1 | 3/2006 | Stern et al. | |
| 7,020,845 B1 | 3/2006 | Gottfurcht et al. | |
| 7,024,464 B1 | 4/2006 | Lusher et al. | |
| 7,051,045 B2 | 5/2006 | Cirinna et al. | |
| 7,058,510 B2 | 6/2006 | Kelly et al. | |
| 7,072,967 B1 | 7/2006 | Saulpaugh et al. | |
| 7,092,370 B2 | 8/2006 | Jiang et al. | |
| 7,136,645 B2 | 11/2006 | Hanson et al. | |
| 7,158,625 B2 | 1/2007 | Casaccia | |
| 7,191,220 B2 | 3/2007 | Ohwa | |
| 7,203,948 B2 | 4/2007 | Mukundan et al. | |
| 7,263,547 B2 | 8/2007 | Kloba et al. | |
| 7,277,927 B2 | 10/2007 | Rensin et al. | |
| 7,380,250 B2 | 5/2008 | Schechter et al. | |
| 7,392,308 B2 | 6/2008 | Aufricht et al. | |
| 7,412,518 B1 | 8/2008 | Duigou et al. | |
| 7,444,156 B2 | 10/2008 | Boss et al. | |
| 7,475,346 B1 | 1/2009 | Bullock et al. | |
| 7,487,204 B2 | 2/2009 | Asthana et al. | |
| 7,526,718 B2 | 4/2009 | Samadani et al. | |
| 7,535,492 B2 | 5/2009 | Kahn et al. | |
| 7,574,208 B2 | 8/2009 | Hanson et al. | |
| 7,574,486 B1 | 8/2009 | Cheng et al. | |
| 7,590,681 B1 | 9/2009 | Chang et al. | |
| 7,599,983 B2 | 10/2009 | Harper et al. | |
| 7,802,207 B2 | 9/2010 | Agboatwalla et al. | |
| 7,908,342 B2* | 3/2011 | Harper et al. | 709/217 |
| 8,135,801 B2 | 3/2012 | Harper et al. | |
| 8,289,864 B2* | 10/2012 | Dolganow et al. | 370/252 |
| 2001/0012281 A1 | 8/2001 | Hall et al. | |
| 2001/0015756 A1 | 8/2001 | Wilcock et al. | |
| 2001/0034746 A1 | 10/2001 | Tsakiris et al. | |
| 2001/0034765 A1 | 10/2001 | Bimson et al. | |
| 2001/0039571 A1 | 11/2001 | Atkinson | |
| 2001/0044824 A1 | 11/2001 | Hunter et al. | |
| 2001/0051979 A1 | 12/2001 | Aufricht et al. | |
| 2001/0054087 A1 | 12/2001 | Flom et al. | |
| 2002/0016801 A1 | 2/2002 | Reiley et al. | |
| 2002/0018078 A1 | 2/2002 | Khan et al. | |
| 2002/0021794 A1 | 2/2002 | Kemppainen | |
| 2002/0024536 A1 | 2/2002 | Kahan et al. | |
| 2002/0029252 A1 | 3/2002 | Segan et al. | |
| 2002/0032785 A1 | 3/2002 | Britt, Jr. | |
| 2002/0035609 A1 | 3/2002 | Lessard et al. | |
| 2002/0044690 A1 | 4/2002 | Burgess | |
| 2002/0046353 A1 | 4/2002 | Kishimoto | |

(56) References Cited

U.S. PATENT DOCUMENTS

| | | |
|---|---|---|
| 2002/0047798 A1 | 4/2002 | Platt |
| 2002/0047895 A1 | 4/2002 | Bernardo et al. |
| 2002/0049777 A1 | 4/2002 | Terayama et al. |
| 2002/0049831 A1 | 4/2002 | Platner et al. |
| 2002/0052895 A1 | 5/2002 | Keating |
| 2002/0054090 A1 | 5/2002 | Silva et al. |
| 2002/0057678 A1 | 5/2002 | Jiang et al. |
| 2002/0059397 A1 | 5/2002 | Feola et al. |
| 2002/0060246 A1* | 5/2002 | Gobburu et al. ......... 235/462.46 |
| 2002/0062397 A1 | 5/2002 | Chang et al. |
| 2002/0073149 A1 | 6/2002 | Young |
| 2002/0087601 A1 | 7/2002 | Anderson et al. |
| 2002/0090934 A1 | 7/2002 | Mitchelmore |
| 2002/0091762 A1 | 7/2002 | Sohn et al. |
| 2002/0094787 A1 | 7/2002 | Avnet et al. |
| 2002/0105539 A1 | 8/2002 | Gamzon et al. |
| 2002/0116534 A1 | 8/2002 | Teeple |
| 2002/0120757 A1 | 8/2002 | Sutherland et al. |
| 2002/0120779 A1 | 8/2002 | Teeple et al. |
| 2002/0129094 A1 | 9/2002 | Reisman |
| 2002/0154213 A1 | 10/2002 | Sibyama et al. |
| 2002/0156702 A1 | 10/2002 | Kane |
| 2002/0165988 A1 | 11/2002 | Khan et al. |
| 2002/0174191 A1 | 11/2002 | Robertson et al. |
| 2002/0180764 A1 | 12/2002 | Gilbert et al. |
| 2002/0194194 A1 | 12/2002 | Fenton et al. |
| 2002/0194195 A1 | 12/2002 | Fenton et al. |
| 2002/0194502 A1 | 12/2002 | Sheth et al. |
| 2003/0004984 A1 | 1/2003 | Chou |
| 2003/0013492 A1 | 1/2003 | Bokhari |
| 2003/0052912 A1 | 3/2003 | Bowman, Jr. et al. |
| 2003/0063770 A1 | 4/2003 | Svendsen et al. |
| 2003/0105812 A1 | 6/2003 | Flowers, Jr. et al. |
| 2003/0115288 A1 | 6/2003 | Ljubicich et al. |
| 2003/0117436 A1 | 6/2003 | Kautto-Koivula et al. |
| 2003/0156208 A1 | 8/2003 | Obradovich |
| 2003/0184793 A1 | 10/2003 | Pineau |
| 2003/0202104 A1 | 10/2003 | Werner |
| 2004/0015567 A1 | 1/2004 | Ziebold et al. |
| 2004/0123131 A1 | 6/2004 | Zacks et al. |
| 2005/0177645 A1 | 8/2005 | Dowling et al. |
| 2005/0210101 A1 | 9/2005 | Janik |
| 2007/0073845 A1 | 3/2007 | Reisman |
| 2011/0138297 A1 | 6/2011 | Harper et al. |
| 2011/0296326 A1 | 12/2011 | Reid et al. |

FOREIGN PATENT DOCUMENTS

| | | |
|---|---|---|
| GB | 2249202 A | 4/1992 |
| JP | 3910794 B2 | 4/2007 |
| KR | 10-2001-0025658 A | 4/2001 |
| KR | 2001-0094912 A | 11/2001 |
| KR | 2002-0006722 A | 1/2002 |
| WO | 0054178 A2 | 9/2000 |
| WO | 0101586 A2 | 1/2001 |
| WO | 0116781 A1 | 3/2001 |
| WO | 0135658 A1 | 5/2001 |
| WO | 0161560 A1 | 8/2001 |
| WO | 0180091 A2 | 10/2001 |
| WO | 0182103 A1 | 11/2001 |
| WO | 0182139 A1 | 11/2001 |
| WO | 0182621 A1 | 11/2001 |
| WO | 0190873 A1 | 11/2001 |
| WO | 0206981 A1 | 1/2002 |
| WO | 0217136 A1 | 2/2002 |
| WO | 0219153 A1 | 3/2002 |
| WO | 0231624 A2 | 4/2002 |

OTHER PUBLICATIONS

Discovery Documents produced in *Wireless Ink Corporation v. Facebook Inc. et al.*, Case Nos. 10-CV-1841 and 11-CV-1751, compilation of source code files titled UKNS9 containing documents numbered UKN3476-UKN3550.

Discovery Documents produced in *Wireless Ink Corporation v. Facebook Inc. et al.*, Case Nos. 10-CV-1841 and 11-CV-1751, compilation of source code files titled UKNS10 containing documents numbered UKN3551-UKN3584, UKN3592-UKN3597, UKN3600, UKN3602-UKN3609, UKN3611, UKN3613, UKN3614, UKN3616, UKN3620, UKN3622, UKN3623, UKN3625, UKN3627, UKN3629-UKN3642, UKN3644-UKN3657, UKN3659 and UKN3660.

Discovery Documents produced in *Wireless Ink Corporation v. Facebook Inc. et al.*, Case Nos. 10-CV-1841 and 11-CV-1751, compilation of training documents titled UKNT1 containing documents numbered UKN3662, UKN3663, UKN3665, UKN3667-UKN3672, UKN3674, UKN3675, UKN3677, UKN3679 and UKN3680.

Discovery Documents produced in *Wireless Ink Corporation v. Facebook Inc. et al.*, Case Nos. 10-CV-1841 and 11-CV-1751, compilation of source code files containing documents numbered UKN458-UKN464, UKN477-UKN479, UKN481-UKN483, UKN485-UKN492, UKN495, UKN496, UKN498, UKN501-UKN548, UKN559-UKN565, UKN567-UKN572, UKN574-UKN600, UKN602-UKN609, UKN611-UKN648, UKN650-UKN718, UKN720-UKN890, UKN892-UKN896, UKN898, UKN900-1009, UKN1011-1051 and UKN1053-UKN1097.

Discovery Documents produced in *Wireless Ink Corporation v. Facebook Inc. et al.*, Case Nos. 10-CV-1841 and 11-CV-1751, compilation of source code files containing documents numbered UKN1099-UKN1196, UKN1198, UKN1200-UKN1306, UKN1308-UKN1311, UKN1314, UKN1316-UKN1339, UKN1341-UKN1344, UKN1347, UKN1349-UKN1359, UKN1380-UKN1383, UKN1385-UKN1388, UKN1391 and UKN1393-UKN1420.

Discovery Documents produced in *Wireless Ink Corporation v. Facebook Inc. et al.*, Case Nos. 10-CV-1841 and 11-CV-1751, compilation of source code files containing documents numbered UKN1422-UKN1425, UKN1429-UKN1444, UKN1447-UKN1708, UKN1710-UKN1714, UKN1716, UKN1718-UKN1741, UKN1743-UKN1745 and UKN1748-UKN1753.

A. Neibauer, "How to Do Everything with Yahoo!," 2000, pp. cover page, copyright page, 3-20, 21-54, 467-491, Osborne McGraw Hill, Berkely, California.

B. Hill, Yahoo! for Dummies, 2001, pp. cover page,copyright page, 23-38, 57-78, 93-101, 243-262; 2nd edition, IDG Books Worldwide, Inc., Foster City, California.

A.M. Agboatwalla et al., U.S. Appl. No. 60/340,405, filed Dec. 13, 2001.

R. Hoeg, "Virtual Accordian Clubs from Yahoo!(Minnesota Accordion Club)," posted on the Internet through Usenet on Dec. 1, 1998, pulled from google Groups (http://groups.google.com/group/rec.music.makers.squeezebox/msg/bad62e373462c6a6).

D. Fox et al., Web Publisher's Construction Kit with HTML 3.2, pp. cover page, copyright p. 15-16, The Waite Group, Inc., Corte Madera, California.

A. Freedman, The Computer Glossary: The Complete Illustrated Dictionary, 2001, pp. cover page, copyright p. 437-438, 9th edition, AMACOM American Management Association, New York, New York.

J. Dempsey, "UseNet Contains E-History," The Post-Standard, Dec. 26, 2001, Syracuse, NY.

B. Hill, "Yahoo! for Dummies," http://catalog.dummies.com/product.asp?isbn=0764507621, Internet Archive, Apr. 6, 2001.

Copyright Recordation, "Yahoo! for Dummies," http://cocatalog.loc.gov/, United States Copyright Office.

K. Maly et al., "Personalized Portal for Wireless Devices," Old Dominion Univeristy Dept. of Computer Science Technical Report TR_2000_07, Nov. 7, 2000, 9 pages.

G. Rossi et al., "Desigining Personalized Web Applications," Proceedings of the Tenth International World Wide Web Conference (WWW10), Hong Kong, May 2001, 4 pages.

C-H.H. Rao et al., "iMobile: a Proxy-Based Platform for Mobile Services," Proceedings of the First Workshop on Wireless Mobile Internet (WMI '01), Rome, Italy, Jul. 2001, 9 pages.

(56) References Cited

OTHER PUBLICATIONS

G. Samaras et al., "A Flexible Personalization Architecture for Wireless Internet Based on Mobile Agents," Proceedings of the Sixth East-European Conference on Advances in Databases and Information Systems (ADBIS 2002) Bratislava. Slovakia, Sep. 2002, 14 pages.

C.R. Anderson et al., "Personalizing Web Sites for Mobile Users," Proceedings of the Tenth International World Wide Web Conference (WWW10), Hong Kong, May 2001, 11 pages.

J.P. Mysore et al., "A Reconfigurable Stream Orchestration Framework for Mobile Users," Proceedings of the Third International Conference on Mobile Data Management (MDM '02), Singapore, Aug. 2002, 8 pages.

P. Brusilovsky., "Adaptive Hypermedia," User Modeling and User-Adaptive Interaction, 2001, pp. 87-110, vol. 11, Kluwer Academic Publishers, Netherlands.

J. Freire et al., "Web Services and Information Delivery for Diverse Environments," Proceedings of the Very Large Data Bases (VLDB) Workshop on Technologies for E-Services, Cairo, Egypt, Sep. 2000, 16 pages.

J. Freire et al. "WebViews: Accessing Personalized Web Content and Services" Proceedings of the Tenth International World Wide Web Conference (WWW10), Hong Kong, May 2001, 11 pages.

R. Hull et al., "Have it Your Way: Personalization of Network-Hosted Services," Proceedings of the 19th British Conference on Databases (BNCOD 19), Sheffield, UK, Jul. 2002, 10 pages.

N. M. Sadeh et al. "MyCampus: An Agent-Based Environment for Context-Aware Mobile Services," Proceedings of the Workshop on Ubiquitous Agents on Embedded, Wearable and Mobile Devices, First International Joint Conference on Autonomous Agents & Multiagent Systems, Bologna, Italy, Jul. 2002, 3 pages.

A. Tsalgatidou et al., "Business Models and Transactions in Mobile Electronic Commerce: Requirements and Properties," Computer Networks, 2001, pp. 221-236, vol. 37, Elsevier Science B.V.

A. Schmidt et al., "WAP-Designing for Small User Interfaces," Extended Abstracts, Conference on Human Factors in Computing Systems (CHI 2000), Hague, Netherlands, Apr. 2000, pp. 187-188.

N. Daswani et al., "Secure Wireless Aggregation," RSA Conference 2001, San Francisco, CA, Apr. 2001, 10 pages.

W. Shi et al., "CONCA: An Architecture for Consistent Nomadic Content Access" Proceedings of the Workshop on Caching, Coherence, and Consistency (WC3 '01), Sorrento, Italy, Jun. 2001, 10 pages.

R. Han et al. "WebSplitter: A Unified XML Framework for Multi-Device Collaborative Web Browsing," Proceedings of the ACM Conference on Computer Supported Cooperative Work (CSCW) 2000, Philadelphia, Pennsylvania, Dec. 2000, 10 pages.

U. Farooq et al., "M-Education: Bridging the Gap of Mobile and Desktop Computing," Proceedings of the IEEE International Workshop on Wireless and Mobile Technologies in Education (WMTE '02), Sweden, Aug. 2002, 4 pages.

U. Farooq et al., "MOOsburg++: Moving Towards a Wireless Virtual Community," Proceedings of the 2002 International Conference on Wireless Networks (ICWN 2002), Las Vegas, Nevada, Jun. 2002, 4 pages.

J. Freire, "Using Wrappers for Device Independent Web Access: Opportunities Challenges and Limitations," Extended Abstract Presented at Portland State University, Portland Oregon, Feb. 2003, 12 pages.

C. Hillebrand et al, "Mobile Communities—Extending Online Communities into the Real World," Proceeding of Mobile and Collaborative Business 2002, Germany, 2002, 12 pages.

T. Huynh, "Developing WAP Services with Allaire's ColdFusion," Master's Thesis in Computer Science Final Report, The Royal Institute of Technology, Stockholm, Jul. 2000, 59 pages.

S-T. Cheng et al., "A New Framework for Mobile Web Services," Proceedings of of the 2002 Symposium on Applications and the Internet (SAINT '02w), Japan, Jan. 2002, 5 pages.

Z. Lei et al., "Context-Based Media Adaptations in Pervasive Computing," Canadian Conference on Electrical and Computer Engineering, Toronto, Ontario, Canada, May 2001, 7 pages.

V. Anupam et al., "Personalizing the Web Using Site Descriptions," Proceedings of the Tenth International Workshop on Database and Expert Systems Applications, Florence, Italy, 1999, 7 pages.

R. Barta et al., "Syndication with JML," Proceedings of the 2000 ACM Symposium on Applied Computing (SAC '00), Mar. 2000, pp. 962-970 vol. 2, Como ,Italy.

P. Bellavista et al., "A Mobile Agent Infrastructure for Terminal, User and Resource Mobility," 2000 IEEE/IFIP Network Operations and Management Symposium (NOMS), Honolulu, Hawaii, Apr. 2000, 14 pages.

Transcript of Claim Construction Hearing, *Wireless Ink Corporation v. Facebook, Inc.*, Case No. 11-CV-1751 (PCK), S.D.N.Y., Nov. 9, 2011, 50 pages.

M. Wagner et al., "A Roadmap to Advanced Personalization of Mobile Services," Proceedings of the 10th International Conference on Cooperative Information Systems (CoopIS 2002), Irvine, California, 2002, 5 pages.

D.E. Bernholdt et al., "Tools for Handheld Supercomputing: An Assessment of the Wireless Application Protocol (WAP)," ERDC PET project Technical Report, May 30, 2000, 32 pages.

S. Hochstetler et al., "Introducing Tivoli Personalized Services Manager 1.1," IBM Redbooks, Jun. 2001, 340 pages.

"AOL on Pocketnet-alt.cellular," Google Groups, at http://groups.google.com/group/alt.cellular/browse_thread/7ee068aee823a48c/411, 2 pages.

"Cellmania—Leading Provider of M-commerce Solutions Products/Services," Mar. 30, 2001, archived at http://web.archive.org/web/20010330224449/http://corp.cellmainia.com/products_services/mfinder.html, 2 pages.

Aol.com, "AOL Mobile," Feb. 23, 2001, archived at http://web.archive.org/web/20010223223036/http://www.aol.com/anywhere/mobile/mobile_demo.html/, 16 pages.

"Yahoo! Gets Even More Mobile—comp.dcom.telecom," Google Groups, at http://groups.google.com/group/comp.dcom.telecom/browse_thread/thread/9b0d195a707 . . . , 1 page.

Yodlee.com, Discovery Documents produced in *Wireless Ink Corporation v. Facebook Inc. et al.*, Case Nos. 10-CV-1841 and 11-CV-1751, Documents numbered JDC0001554 and JDC0001555, 5 pages.

"First Personalized Portal for WAP and Internet Phones Launched by SmartRay Network," Google Groups, at http://groups.google.com/group/alt.cellular.sprintpcs/browse_thread/a3bd0275f122 . . . , 6 pages.

J. Freire et al., "WebViews: Accessing Personalized Web Content and Services," Database Systems Research, Bell Labs, WWW10 Hong Kong, May 2001, 25 pages.

WAPmatic.de, Discovery Documents produced in *Wireless Ink Corporation v. Facebook Inc. et al.*, Case Nos. 10-CV-1841 and 11-CV-1751, Documents numbered JDC0005649, JDC0005652 through JDC0005684, JDC0005693 through JDC0005696, JDC0005700, JDC0005703 through JDC0005736, JDC0005741 through JDC0005745, JDC0005754, JDC0005756, and JDC0005811 through JDC0005857.

Wapjag.de, Discovery Documents produced in *Wireless Ink Corporation v. Facebook Inc. et al.*, Case Nos. 10-CV-1841 and 11-CV-1751, Documents numbered JDC0005651, JDC0005688, JDC0005689, and JDC0005968.

Wappy.to, Discovery Documents produced in *Wireless Ink Corporation v. Facebook Inc. et al.*, Case Nos. 10-CV-1841 and 11-CV-1751, Documents numbered JDC0005746 through JDC0005753.

M. Kuszpa, "room33 With My WAP Page," Maciej Kuszpa on Mobile Social Networks and Mobile Learning, 5 pages.

"room33.com Product Information," Ciao! from bing, 2 pages.

Mbasics.com, Discovery Documents produced in *Wireless Ink Corporation v. Facebook Inc. et al.*, Case Nos. 10-CV-1841 and 11-CV-1751, Documents numbered JDC0005859, JDC0005964, JDC0005967, JDC0005971 through JDC0005977, JDC0006005 and JDC0006069.

Hoiley.com, "Homepage," May 11, 2000, archived at http://web.archive.org/web/20000511091935/http://www.hoiley.com/, 1 page.

(56) References Cited

OTHER PUBLICATIONS

TagTag.com, Discovery Documents produced in *Wireless Ink Corporation v. Facebook Inc. et al.*, Case Nos. 10-CV-1841 and 11-CV-1751, Documents numbered JDC0006036, JDC0006041 through JDC0006045, JDC0006047, JDC0006051 through JDC0006057, and JDC0006071.
myWAP.Genie.de, Discovery Documents produced in *Wireless Ink Corporation v. Facebook Inc. et al.*, Case Nos. 10-CV-1841 and 11-CV-1751, Documents numbered JDC0006037 through JDC0006040, JDC0006048, JDC0006072 through JDC0006080, JDC0006084, and JDC0006087 through JDC0006093.
WAPdrive.com, Discovery Documents produced in *Wireless Ink Corporation v. Facebook Inc. et al.*, Case Nos. 10-CV-1841 and 11-CV-1751, Documents numbered JDC0006058 through JDC0006067.
Mpresence.com, Discovery Documents produced in *Wireless Ink Corporation v. Facebook Inc. et al.*, Case Nos. 10-CV-1841 and 11-CV-1751, Documents numbered JDC0006070, and JDC0006082 through JDC0006083.
Discovery Documents produced in *Wireless Ink Corporation v. Facebook Inc. et al.*, Case Nos. 10-CV-1841 and 11-CV-1751, Documents numbered JDC0000140, JDC0005755, JDC0005776, JDC0005808, JDC0005810, JDC0006094 through JDC0006110, JDC0006173, JDC0006827 through JDC0006999, and JDC0007342.
G.Q. Huang et al., "Agent-based workflow management in collaborative product development on the Internet," Computer-Aided Design, 2000, pp. 133-144, vol. 32, Elsevier Science Ltd.
A. Bhattacherjee, "Management of emerging technologies: Experiences and lessons learned at US West," Information & Management, 1998, pp. 263-272, vol. 33, Elsevier Science B.V.
N. Swartz, "Talkin' About Generation Y," Connected Planet, Oct. 15, 2000, at http://connectedplanetonline.com/wireless/mag/wireless_talkin_generation/ on Apr. 21, 2010, 3 pages.
Bolt.com, "Info," archived at http://web.archive.org/web/20011203081541/www.bolt.com/info/default.asp.
Peperonity.com, "Peperonity," archived at http://web.archive.org/web/20030330223112/http://peperpmity.com/.
Transcript of Claim Construction Hearing, *Wireless Ink Corporation v. Facebook, Inc.*, Case No. 10-CV-1841 (PKC), S.D.N.Y., Oct. 21, 2010, 75 pages.
Memorandum and Order, *Wireless Ink Corporation v. Facebook, Inc.*, Case No. 10-CV-1841 (PKC), S.D.N.Y., May 26, 2011, 29 pages.
Excerpt of Facebook's Response to Wireless Ink's Interrogatory No. 9, *Wireless Ink Corporation v. Facebook, Inc.*, Case No. 10-CV-1841 (PKC), S.D.N.Y., Jun. 22, 2011, pp. 29-36.
Exhibit A of Facebook's Response to Wireless Ink's Interrogatory No. 9, *Wireless Ink Corporation v. Facebook, Inc.*, Case No. 10-CV-1841 (PKC), S.D.N.Y., Jun. 22, 2011, 6 pages.
Excerpt of Google's Response to Wireless Ink's Interrogatory No. 9, *Wireless Ink Corporation v. Facebook, Inc.*, Case No. 10-CV-1841 (PKC), S.D.N.Y., Jun. 22, 2011, pp. 20-32.
Exhibit A of Google's Response to Wireless Ink's Interrogatory No. 9, *Wireless Ink Corporation v. Facebook, Inc.*, Case No. 10-CV-1841 (PKC), S.D.N.Y., Jun. 22, 2011, 131 pages.
Amended Answer of Defendant *MySpace, Inc., Wireless Ink Corporation v. Facebook, Inc.*, Case No. 11-CV-1751 (PKC), Document No. 42-1, S.D.N.Y., Jun. 8, 2011, pp. 1-9.
K. Maly et al., "Personalized Portal for Wireless Devices," included as Exhibit B of Amended Answer of Defendant *MySpace, Inc., Wireless Ink Corporation v. Facebook, Inc.*, Case No. 11-CV-1751 (PKC), Document No. 42-3, S.D.N.Y., Jun. 8, 2011, 3 pages.
M. Gibbs, "All the news that's fit to RSS," NetworkWorld, Feb. 25, 2002, p. 36.
J. Kolari et al., "Net in Pocket? Personal mobile access to web services," VTT Publications 464, Finland, Apr. 2002, 145 pages.
PR Newswire, "Bolt Launches Robust WAP-Based Clubs & Search Tools; Bolt Expands Wireless Offerings—Teens and Marketers Benefit," Apr. 16, 2001, 3 pages.
J. Udell, "Hyperlinks matter," InfoWorld, May 20, 2002, pp. 15-16.
R. Vogles, "Ihre mobile Homepage," PC Pr@xis, Aug. 2001, 6 pages (including translation).
Memorandum and Order in *Wireless Ink Corporation v. Facebook Inc., et al.*, Case Nos. 10-CV-1841 and 11-CV-1751, Aug. 29, 2013.
Judgment in *Wireless Ink Corporation v. Facebook Inc., et al.*, Case Nos. 10-CV-1841 and 11-CV-1751, Aug. 30, 2013.
UCP Morgen Products, "Mobileblog! TM—Blogging from Every Mobile Phone," http://www.ucpmorgen.com/products_mobileblog_en.html, pp. 1-3, 2003.
UCP Morgen News, "Mobileblog! TM—Taking Mobile Messaging to a Whole New Level," http://www.ucpmorgen.com/news_press-release-2003031701_en.html, pp. 1-2, 2003.
NewBay Software "FoneBlog V1—A Website for Every Mobile Phone!," http://www.newbay.com/products_general.html, pp. 1-3, 2003.
NewBay Software "NewBay Software Announces World's First Blogging System for Mobile Network Operators," http://www.newbay.com/pr030101.html, pp. 1-3, 2003.
3TL—Mobile Internet, "Mobile Communities," http://www.3tl.com/MobileOperators/Communities.asp?CID=, 1 page, 2003.
"Yahoo! Mobile," http://mobile.yahoo.com/, 2 pages, 2003.
Peperoni Mobile & Internet Software GmbH, "Mobile Community Services with Mobile Homepage Toolkit," http://en.peperoni.de/pep/produkte/inhalt_mobile.php3, pp. 1-2, 2003.
LittleWASP®, "What can LittleWASP do?," http:// www.littlewasp.com/features.html, 1 page, 2003.
Blogger, "The Revolution will be Bloggerized," http:// www.blogger.com/about.pyra, pp. 1-3, 2003.
Mopilot.com, "Welcome to my.mopilot.com," http://my.mopilot.com/index.htm, 1 page, 2001.
Mbasics—Platform for Mobile Site Building, "Content Management," http:// www.mbasics.com/content_management.html, pp. 1-2, 2003.
I. Vos et al., "The Essential Guide to Mobile Business," 2002, pp. 215-218, Prentice Hall PTR, Upper Saddle River, New Jersey.
N. Whitfield, "The Official AOL UK Handbook Version 6.0," 2001, pp. 241-416 and 484-571, Capstone Publishing Limited, Oxford, United Kingdom.
Phone.com, "Enabling the Wireless Internet: Why You Should Develop Applications Using the Phone.com WAP Solution," Jan. 2000, 12 pages.
Phone.com, "Understanding Security on The Wireless Internet: How WAP Security is Enabling Wireless E-commerce Applications for Today and Tomorrow," Jan. 2000, 12 pages.
GURUbooks.com, "Join the Wireless Web Revolution with . . . Yahoo!," Mobile Guru Series, 2001, 10 pages.
A. Neibauer, "How to Do Everything with Yahoo!," 2000, pp. 115-180, Osborne/McGraw-Hill, Berkeley California.
K. Binder, "The Complete Idiot's Guide to Mac OS X," 2002, pp. 97-104 and 141-183, Alpha Books, United States of America.
T. Stauffer, "How to Do Everything with Your iMAC Third Edition," 2001, pp. 355-369 and 371-380, Osborne/McGraw-Hill, Berkeley California.
D. Pogue, "Mac OS 9: The Missing Manual," 2000, pp. 243-256, Pogue Press/O'Reilly & Associates, Inc, United States of America.
D. Pogue, "Mac OS X: The Missing Manual," 2002, pp. 181-204 and 433-452, Pogue Press/O'Reilly & Associates, Inc, United States of America.
T. Stauffer, "Mastering Mac OS X," 2001, pp. 335-341, Sybex, United States of America.
G. Steinberg, "Mac OS X Little Black Book," 2001, pp. 395-417, The Coriolis Group, Scottsdale, Arizona.
D. Rittner, "The iMac Book Second Edition," pp. 341-373, The Coriolis Group, Scottsdale, Arizona.
I. Steiner, "Serving Up the Wireless Web: Content to Go," ONLINE Magazine, Sep. 2001, at http://www.onlinemag.net/ol2001/steiner9_01.html, 10 pages.
R. Raskin, "All AOL, All the Time," USA Today, Jul. 17, 2001, at http://ww.usatoday.com/life/cyber/ccarch/2001-07-07-raskin.htm, 3 pages.
Business Wire, "America Online and AT&T Wireless Announce Innovative Mobile Services and Marketing Alliance," Jun. 27, 2001,

(56) References Cited

OTHER PUBLICATIONS at http://www.thefreelibrary.com/America+Online+and+AT%26T+ Wireless+Announce+Innovative+Mobile+Services -a075947481, 3 pages.
Business Wire, "America Online Delivers 'AOL Mobile' Services to AT&T Wireless Internet Ready Phones," Sep. 5, 2000, at http://www.thefreelibrary.com/America+Online+Delivers+'AOL+Mobile'+ Services+to+AT%26T+Wireless...-a064994434, 3 pages.
Business Wire, "America Online to Offer Content and Features Through AT&T Wireless Services' Internet-Ready Phones," Jul. 17, 2000, at http://www.thefreelibrary.com/America+Online+to+Offer+ Content+and+Features+Through+AT%26T+Wireless...- a066877339, 3 pages.
BestStuff.com, "America Online Launches New AOL Anywhere Web Site," Oct. 25, 2000, at http://www.beststuff.com/fromthewire/ america-online-launches-new-aol-anywhere-web-s . . . , 2 pages.
Business Wire, "Yahoo! and AT&T Wireless Services Team to Bring Yahoo! Everywhere to AT&T Customers," May 18, 2000, at http:// www.thefreelibrary.com/ Yahoo!+and+AT%26T+Wireless+Services+Team+to+Bri . . . , 2 pages.
M. Ginty, "Yahoo! Gets Even More Mobile," Aug. 11, 1999, at http://www.internetnews.com/bus-news/article.php/180411/Yahoo-Gets-Even-More-Mob . . . , 2 pages.
D. Needle, "A Portal for Portables: SmartRay Lets You Transfer E-mail and Other Info Across Mobile Devices," PCWorld, Nov. 9, 1999, at http://www.pcworld.com/article/13699/a_portal_for_por-tables.html, 3 pages.
J. Newman, "The Next Yahoo?" Wireless Developer Network, accessed Oct. 19, 2011 at http://www.wirelessdevnet.com/channels/ wireless/features/nextyahoo.html, 2 pages.
PR Newswire, "First Personalized Portal for WAP and Internet Phones Launched by SmartRay Network," Nov. 3, 1999, at http:// www.thefreelibrary.com/ First+Personalized+Portal+for+WAP+and+Internet+Phon . . . , 4 pages.
FindArticles.com, "Smartray.com Offers Free Stock Quotes for Wireless Devices," Feb. 2000, at http://findarticles.com/p/articles/ mi_hb6452/is_2_11/ai_n28760296/, 3 pages.
PR Newswire, "smartRay.com Unveils Next Generation of Service," Aug. 16, 2000, at http://www.thefreelibrary.com/smartRay. com+Unveils+Next+Generation+of+Service.-a064256981. 3 pages.
Federal Ministry of Education and Research (Germany) "Example of Start-Up: With Fiery Keenness: Peperoni," EXIST: University-based Start-Ups Status and Prospects, Sep. 2001, p. 24.
PR Newswire Europe, "room33 Introduces Advanced Suite of Mobile Internet Applications for GSM, GPRS and UMTS," http:// www.prnewswire.co.uk/cgi/news/release?id=62656, 2 pages.
H. Denker, "WAP Under Construction," Connect, Aug. 2, 2001, 10 pages (including translation and Certification Statement).
"Smart.ray.com Signs with 7 Carriers," Business and Industry RCR Radio Communications Report, Jul. 10, 2000, 1 page, vol. 19 No. 28.
Business Wire, "AvantGo Teams with Yahoo! to Deliver Content and Services to Mobile Devices," Jun. 1, 2000, 2 pages.
Dow Jones Business News, "AOL Offers Mobile Services to Sprint PCS Wireless-Web Users," Jun. 15, 2000, 2 pages.
PR Newswire, "SmartRay.com and RestaurantMarket.com Strike Deal to Provide Wireless Bidding Alerts for Resturant Industry; Buyers and Sellers will Receive Instant Notifications on Their Mobile Phones, Pagers and PDAs," May 23, 2000, 2 pages.
Business Wire, "Yahoo! Mobile Goes Live; New Yahoo! Service Enables Users to Get Their Yahoo! Everywhere," Aug. 11, 1999, 2 pages.
Business Wire, "Yahoo! Launches Yahoo! Local Info for Web-enabled Phones; Yahoo! Everywhere Provides Wireless Location-Based Directory to Consumers Across the United States," Feb. 20, 2001, 2 pages.
Dow Jones Business News, "Daily Update—Vivendi Says Decision on Seagram Takeover May Be Imminent," Jun. 15, 2000, 3 pages.
PR Newswire, "Smartray.com Unveils Next Generation of Service; Version 2.0 Combines Easy-to-Use Features Improved Look and Enhanced Accessibility through Desktops and Mobile Devices," Aug. 16, 2000, 2 pages.
PR Newswire, "smartRay.com Delivers Stock Quotes and Financial Information to Wireless Devices for Free!; SmartRay Network Inc. Will Use Advanced Technology to Send Personalized Financial information and News to Your Celluar Phone, Pager, or PDA," Dec. 15, 1999. 2 pages.
D.F. Gray, "America Online Upgrades PC Client Software, Offers Customizable Web Site," Enterprise Networking, Nov. 13, 2000, 2 pages.
PR Newswire, "What's the Difference Between a Press Release and Lying in the Sun? When You Lie in the Sun, You Actually Get Red; Smart RAY.com Launches Wireless Entertainment Channel With 6 Unique Content Partners," Jul. 27, 2000, 2 pages.
Business Wire, "America Online Launches New AOL Anywhere Web Site; One-Stop, Customizable Site Offers Members Access to Popular AOL Features Anytime, Any Place," Oct. 25, 2000. 2 pages.
J. Angwin, "E-Commerce (A Special Report): Business Plan You've Got . . . M-Commerce: How AOL is Positioning itself for the Wireless World," The Wall Street Journal, Dec. 11, 2000, 3 pages.
C. Piller, "The Cutting Edge: Focus on Technology; Connecting to Customers on the Move; Wireless: A Yahoo Executive Talks about How to Attract the Growing Number in U.S. Who Use Portable Devices to Access the Web," Jun. 19, 2000, 3 pages.
Business Wire, "GoAmerica Announces Agreement with America Online to Offer AOL Mobile Services Via Go. Web," Aug. 15, 2001, 2 pages.
PR Newswire, "smartRay.com Signs Significant Wireless Partnerships with Nextel and Six Other Carriers; smartRay to Provide Nextel Online(SM) Wireless Internet Customers with On-Demand News and Information," Jul. 5, 2000, 2 pages.
N. Daswani, "Secure Wireless Aggregation," Yodlee, 36 pages.
Upoc.com, Discovery Documents produced in *Wireless Ink Corporation* v. *Facebook Inc. et al.*, Case Nos. 10-CV-1841 and 11-CV-1751, Documents numbered JDC0000177, JDC0000542, JDC0000901, JDC0001546, JDC0001589, JDC0001590 JDC0001593, JDC0001804 through JDC0001819, JDC0001865 through JDC0001867, JDC0004470, JDC0005255, JDC0005697, JDC0005701, JDC0005861 through JDC0005866, JDC0005965, JDC0005963, JDC0005984 through JDC0006002, and JDC0006007 through JDC0006033.
Mobile.yahoo.com, "Overview," archived at http://web.archive.org/ web/200101427014927/http://mobile.yahoo.com/phone/tour?. pv=overview&.pg=1&.ph=tp, 3 pages.
AOL.com, "Now You Can get AOL Anywhere—Even on Your Cell Phone!," archived at http://web.archive.org/web/200101240409/ http://www.aol.com/anywhere/mobile/main.html, 8 pages.
M. Cagan, "Product Strategy," Silicon Valley Product Group, Oct. 4, 2000, at http://svpg.com/product-strategy/, 8 pages.
Decision of the United States Court of Appeals for the Federal Circuit in *Wireless Ink Corporation* v. *Google Inc. et al.* and *Wireless Ink Corporation* v. *Facebook Inc. et al.*, Nos. 2013-1683 and 2013-1684, 2 pages, Jul. 16, 2014.
Decision of the Patent Trial and Appeal Board in *Facebook, Inc.*, Requester v. *Wireless Ink Corp.*, Patent Owner, Appeal No. 2014-007363, Reexamination Control No. 95/001,989, Oct. 30, 2014, 15 pages.
Record of Oral Hearing Before the Patent Trial and Appeal Board in *Facebook, Inc.*, Requester v. *Wireless Ink Corp.*, Patent Owner, Appeal 2014-007363, Reexamination Control No. 95/001,989, Oct. 1, 2014, 20 pages.
Memorandum and Order in *Wireless Ink Corporation* v. *Facebook Inc., et al.*, Case Nos. 10 Civ. 1841 and 11 Civ. 1751, Dec. 17, 2013.
Opening Brief for Plaintiff-Appellant Wireless Ink Corporation in *Wireless Ink Corporation* v. *Google, Inc. et al.*, filed in the United States Court of Appeals for the Federal Circuit, Appeal No. 2013-1689, Dec. 10, 2013.
Lisa Moskowitz, "GeoCities Becomes a Portal," PCWorld, Jul. 13, 1998, http://www.pcworld.com/article/7404/geocities_becomes_ a_portal.html?tk=rel_news, 2 pages.

(56) References Cited

OTHER PUBLICATIONS

Business Wire, Inc., "Ground-Breaking Website & Portal Builder for Novices Unveiled—HotHomepages Poised for a Viral Take-Over of Free Web Market With Unmatched Features and Revenue Generators!", Jan. 17, 2001, 2 pages.
Internet Wire, Inc., "HotHomepages Launches 2.0 Release With Additional Features and New Robust Elements to the Company's Self-Service Web Site Builder," Nov. 2, 2001, 2 pages.
Ed Lowe, "Untethered," Long Island Press, Jan. 13, 2005, http://www.longislandpress.com/2005/01/13/untethered/, 2 pages.
Market Wire, Inc., "Wireless Ink Enables Worldwide Mobile Publishing and Distribution for the Masses; Patent-Pending Technology Allows the Masses to Create and Build a Mobile Site in Minutes Which Is Distributed Globally Across Carrier Networks," Dec. 21, 2004, 2 pages.
Ken Schachter, "Webslingers," Long Island Business News, Jul. 4, 2003, http://www.mlg.com/news_events/newspaper/Webslingers.html, 2 pages.
Primezone Media Network, Inc., "Maxplanet Enters Into Letter of Intent to Acquire Wireless Ink; New Maxplanet to Become Unique Value-Added Service Provider to Wireless Carriers, Entertainment Companies, and Brands," Apr. 29, 2004, 2 pages.
Bruce Brown, "Create Your Own Internet With Clickmarks," PC Magazine, Nov. 20, 2000, http://www.pcmag.com/article2/0,2817,34336,00.asp, 3 pages.
Ellen Jensen, "Clickmarks personal 'habitats' make any Web content wireless," Wireless Networks Online, Sep. 15, 2000, http://www.wirelessnetworksonoine.com/article.mvc/Clickmarks-personal-habitats-make-any-Web-con-0001, 3 pages.
Umair A. Khan et al., U.S. Appl. No. 60/209,873, filed Jun. 7, 2000, 37 pages.
Umair Khan et al., U.S. Appl. No. 60/283,775, filed Apr. 12, 2001, 51 pages.
Clickmarks Platform Architecture: White Paper, 6 pages.
PBI Media, LLC, "Clickmarks Looks for Growth Impetus," Communications Today, vol. 7, No. 221, Nov. 28, 2001, 1 page.
Christy Mulligan, "Dialing for content: Content providers are learning how to cram value onto a four inch-square screen," Computer User, vol. 19, No. 4, Apr. 1, 2001, 4 pages.
PR Newswire Association Inc., "Clickmarks Brings Personalization & Mobilization Services to Chaitime.com, An Online Community Serving South Asians Worldwide; Service Will Increase Loyalty, Be Available From Wired & Wireless Devices," Oct. 10, 2000, 2 pages.
PR Newswire Association Inc., "Clickmarks Selected 'Best of Show' for its Software Platform at Internet World; 'Wireless-Enabled Personal Habitat' Delivers Any Web Content to Any Device as Never Before," Nov. 6, 2000, 2 pages.
PR Newswire Association Inc., "Clickmarks' Personal 'Habitats' Make Any Web Content Wireless; ASP's Web Personalization Service Automatically Feeds Web Content to PDAs and Web-Enabled Cell Phones, Whether or Not It Is Wireless-Ready," Jun. 13, 2000, 2 pages.
Michael Singer, "New Vizzavi Portal on WAP Phones," InternetNews.com, Apr. 23, 2001, http://www.internetnews.coln/bus-news/article.php/749411/New-Vizzavi-Portal-On-WAP-Phones.htm, 1 page.
Heather Forsgren Weaver, "Clickmarks marries personalization with mobilization," Radio Comm. Report, Dec. 4, 2000, 2 pages.
Umair Khan et al., U.S. Appl. No. 60/283,804, filed Apr. 12, 2001, 68 pages.
Ben Sawyer and Dave Greeley, "Creating Geocities Websites," Muska & Lipman Publishing, 1999, 357 pages.
Bud Smith and Arthur Bebak, "Creating Web Pages for Dummies, 4th Ed.", IDG Books Worldwide, Inc., 1999, pp. 73-126.
Adnan M. Agboatwalla et al., U.S. Appl. No. 60/340,405, filed Dec. 13, 2001, 121 pages.
Umair A. Khan et al., U.S. Appl. No. 60/210,160, filed Jun. 7, 2000, 62 pages.
Umair A. Khan et al., U.S. Appl. No. 60/212,485, filed Jun. 16, 2000, 32 pages.
Umair Khan et al., U.S. Appl. No. 60/283,781, filed Apr. 12, 2001, 44 pages.
Umair Khan et al., U.S. Appl. No. 60/283,873, filed Apr. 12, 2001, 53 pages.
Quinton Y. Zondervan et al., U.S. Appl. No. 60/341,340, filed Dec. 14, 2001, 74 pages.
Umair A. Khan et al., U.S. Appl. No. 60/341,344, filed Dec. 14, 2001, 79 pages.
Alex Tsakiris et al., U.S. Appl. No. 60/185,350, filed Feb. 26, 2000, 20 pages.
Reuven Gamzon, U.S. Appl. No. 60/233,136, filed Sep. 18, 2000, 6 pages.
Bruce Brown, "Create Your Own Internet With Clickmarks," PC Magazine, Nov. 21, 2000, p. 64.
Discovery Documents produced by Internet Archive regarding ClickMark in *Wireless Ink Corporation v. Facebook Inc. et al.*, Case Nos. 10-CV-1841 and 11-CV-1751, compilation of documents numbered JDC0010331-JDC0010505.
Discovery Documents produced by Internet Archive regarding ClickMark in *Wireless Ink Corporation v. Facebook Inc. et al.*, Case Nos. 10-CV-1841 and 11-CV-1751, compilation of documents numbered JDC0010518-JDC0010582, JDC0010587-JDC0010615, JDC0010622-JDC0010647, JDC0011882-JDC0011890, JDC0012051-JDC0012052, JDC0012057-JDC0012063, JDC0012070-JDC0012071, and JDC0012075.
Discovery Documents produced by Internet Archive regarding ClickMark in *Wireless Ink Corporation v. Facebook Inc. et al.*, Case Nos. 10-CV-1841 and 11-CV-1751, compilation of documents numbered UK00047, UK00122, UK00123 and UK00133.
Discovery Documents produced by Internet Archive regarding Yahoo! GeoCities in *Wireless Ink Corporation v. Facebook Inc. et al.*, Case Nos. 10-CV-1841 and 11-CV-1751 documents numbered JDC0010648-JDC0010657.
Discovery Documents produced by Internet Archive regarding Buzzed in *Wireless Ink Corporation v. Facebook Inc. et al.*, Case Nos. 10-CV-1841 and 11-CV-1751, documents numbered JDC0013173-JDC0013174, and JDC0013184.
Discovery Documents produced by Internet Archive regarding TagTag in *Wireless Ink Corporation v. Facebook Inc. et al.*, Case Nos. 10-CV-1841 and 11-CV-1751, documents numbered JDC0013175-JDC0013183.
Discovery Documents produced by Internet Archive regarding SantanaBuilder in *Wireless Ink Corporation v. Facebook Inc. et al.*, Case Nos. 10-CV-1841 and 11-CV-1751, documents numbered JDC0013185-JDC0013187.
Discovery Documents produced in *Wireless Ink Corporation v. Facebook Inc. et al.*, Case Nos. 10-CV-1841 and 11-CV-1751, compilation of support documentation containing documents numbered UKN1, UKN3, UKN5, UKN7, UKN8, UKN10, UKN11, UKN13-UKN16, UKN18-UKN21, UKN23, UKN25-UKN55, UKN57-UKN63, UKN65, UKN67-UKN69, UKN71-UKN93, UKN95-UKN97, UKN99-UKN103, UKN105-UKN108, UKN110-UKN126, UKN128-UKN143, UKN145, UKN147, UKN148, UKN150-UKN156, UKN158-UKN169, UKN171-UKN174 and UKN176-UKN179.
Discovery Documents produced in *Wireless Ink Corporation v. Facebook Inc. et al.*, Case Nos. 10-CV-1841 and 11-CV-1751, compilation of support documentation containing documents numbered UKN181, UKN182, UKN184, UKN185, UKN187-UKN189, UKN191, UKN192, UKN194-UKN196, UKN198, UKN200, UKN202, UKN204, UKN206, UKN214, UKN216, UKN218-UKN228, UKN230-UKN250, UKN252-UKN258, UKN260-UKN268, UKN270-UKN296, UKN298-UKN329, UKN331-UKN353, UKN355-UKN363 and UKN365-UKN371.
Discovery Documents produced in *Wireless Ink Corporation v. Facebook Inc. et al.*, Case Nos. 10-CV-1841 and 11-CV-1751, compilation of support documentation titled UKNM3 containing documents numbered UKN373-UKN390, UKN392, UKN393, UKN395, UKN397, UKN404-UKN407, UKN409-UKN432, UKN-434, UKN436-UKN439, UKN441, UKN442, UKN444-UKN446, UKN449-UKN453, and UKN455-UKN457.

(56) References Cited

OTHER PUBLICATIONS

Discovery Documents produced in *Wireless Ink Corporation* v. *Facebook Inc. et al.*, Case Nos. 10-CV-1841 and 11-CV-1751, compilation of source code files containing documents numbered UKN1754-UKN1875 and UKN1877-UKN1879.

Discovery Documents produced in *Wireless Ink Corporation* v. *Facebook Inc. et al.*, Case Nos. 10-CV-1841 and 11-CV-1751, compilation of source code files containing documents numbered UKN1889-UKN2723.

Discovery Documents produced in *Wireless Ink Corporation* v. *Facebook Inc. et al.*, Case Nos. 10-CV-1841 and 11-CV-1751, compilation of source code files containing documents numbered UKN2725-UKN2734, UKN3153, UKN3155, UKN3158 and UKN3160-UKN3300.

"Blah!—The Company," http://www.blah.com/corporate/company/index.htm, 1 page, 2003.

"About Upoc," http://www.upoc.com/about.jsp, 1 page, 2002.

"Homestead—Your Complete Web Site Building & Hosting Solution," http://www.homesteatd.com, 2 pages, 2003.

\* cited by examiner

FIG. 8

WEB SITE LOGO

LOGOUT

| HOME | MY WINKSITE | DIRECTORY | FUN & GAMES | HELP |

Welcome username. If you are not username, click here | Logout

Start Page > Main Menu (ancillary mobile site name)

ADMINISTRATION

MY WINKSITE ACCOUNT

- METRICS
  - USERNAME:
    username
    MEMBER SINCE:
    DD Mon YYYY 00:00 AM/PM
    NUMBER OF LOGINS:
    x
    LAST LOGIN:
    DD Mon YYYY 00:00 AM/PM
- MOBILE SITES
  - 01. ancillary mobile site name
  - 02. ancillary mobile site name  ← 802
  - 03. ancillary mobile site name

≫ MAIN MENU

PREVIEW SITE ☐ ← 812

MOBILE SITE INFORMATION

Here you can manage mobile site content for "ancillary mobile site name"

▶ ancillary mobile site name | edit
Your site can be viewed on the mobile Internet at the following address:
http://www.sitedomain.com/username/usercreateddirectory | announce site ← 806
Site Status: Online    Password Protection: Off username's M-Channels (mobile content and communication channels)

| | | |
|---|---|---|
| ▷ About | manage about content | ■ ON |
| ▷ Announcements | manage announcement content | ☐ OFF |
| ▷ Core | manage core content | ☐ OFF |
| ▷ Agenda | manage agenda content | ☐ OFF |
| ▷ Notes | manage notes content | ■ ON |
| ▷ Zine | manage zine content | ☐ OFF ← 808 |
| ▷ Rant&Rave | manage rant&rave content | ☐ OFF |
| ▷ Surveys | manage surveys content | ☐ OFF |
| ▷ Chat | manage chat content | ■ ON |
| ▷ Journal | manage journal content | ☐ OFF |
| ▷ Guestbook | manage guestbook content | ☐ OFF |
| ▷ Links | manage links content | ☐ OFF |
| ▷ M-Card | manage m-card content | ■ ON |

Icon Legend:
■ ON : M-Channel is visible to site visitors.
☐ OFF : M-Channel is not visible to site visitors.
Click on the icon in the same row as the M-Channel you wish to turn On or Off.

ALERT: DELETING A SITE CAN NOT BE UNDONE    DELETE SITE ☐
← 810

Start Page > Main Menu (ancillary mobile site name)

© Copyright 2001-2002 WINK Interactive, LLC. All Rights Reserved.

WEB SITE LOGO

LOGOUT

ADMINISTRATION

Welcome username. If you are not username, click here | Logout

| HOME | MY WINKSITE | DIRECTORY | FUN & GAMES | HELP |

Main Menu > General Inquiry List

≫ General Inquiry List

MAIN MENU | ≫ | AUTO RESPONSE | + | ADD AN ITEM | +

Show All A B C D E F G H I J K L M N O P Q R S T U V W X Y Z

| Last Name | First Name | E-Mail | View | Edit | Status | Erase |
|---|---|---|---|---|---|---|
| contact's last name | contact's first name | email | view | edit | disabled | erase |
| contact's last name | contact's first name | email | view | edit | disabled | erase |
| contact's last name | contact's first name | email | view | edit | enabled | erase |
| contact's last name | contact's first name | email | view | edit | enabled | erase |
| contact's last name | contact's first name | email | view | edit | enabled | erase |
| contact's last name | contact's first name | email | view | edit | disabled | erase |
| contact's last name | contact's first name | email | view | edit | enabled | erase |

Pages: 1

Main Menu > General Inquiry List

© Copyright 2001-2002 WINK Interactive, LLC. All Rights Reserved.

| WINKsite | WINKsite |
|---|---|
| ABOUT WINKsite<br>1 Description (OK)<br>2 Location (OK)<br>3 631-463-8083 (Call)<br>4 Version (OK)<br>5 Logo (OK) | DESCRIPTION<br>Description will go here. |
| ----- / WINK | Done / |

| WINKsite | WINKsite |
|---|---|
| LOCATION<br>48 South Service Road<br>Suite 100<br>Melville, NY<br>11747 | VERSION<br>WINKsite V1.0 |
| Done / | Done / |

| WINKsite |
|---|
| The mobile site builder!<br><br>WINKsite |
| Done / |

FIG. 24c

| WINKsite |
|---|
| DIRECTORY |
| 1 Member search (OK) |
| 2 Site search (OK) |
| 3 Member list (OK) |
| 4 Site list (OK) |

| ----- | WINK |

FIG. 24d

| WINKsite | WINKsite |
|---|---|
| MEMBER SEARCH<br>1 Begins with (OK)<br>2 Contains (OK)<br>3 Ends with (OK) | MEMBER SEARCH<br>*Begins with:/Contains:/Ends with:*<br>_____ |
| -----     DONE | Find |

| WINKsite | WINKsite |
|---|---|
| MEMBERS<br>*B/C/E smith*<br>1-9 of 134<br>1 Blacksmith (OK)<br>2 Smithsonian (OK)<br>...<br>8 Smith's World (OK)<br>9 Will Smith (OK)<br>  More... (More) | MEMBER LIST<br>1 0-9 (OK)<br>2 ABC (OK)<br>3 DEF (OK)<br>4 GHI (OK)<br>5 JKL (OK)<br>6 MNO (OK)<br>7 PQRS (OK)<br>8 TUV (OK)<br>9 WXYZ (OK) |
| -----     Done | -----     Done |

| WINKsite | WINKsite |
|---|---|
| MEMBER LIST<br>1 A (OK)<br>2 B (OK)<br>3 C (OK) | MEMBERS: A<br>1-9 of 26<br>1 Abe (OK)<br>2 Ace (OK)<br>...<br>8 Arvan (OK)<br>9 Astro (OK)<br>  More... (More) |
| -----     Done | -----     Done |

*FIG. 24e*

| WINKsite |
|---|
| SITE SEARCH |
| 1 Begins with (OK) |
| 2 Contains (OK) |
| 3 Ends with (OK) |
| |
| -----     DONE |

| WINKsite |
|---|
| SITE SEARCH |
| *Begins with:/Contains:/Ends with:* |
| \_\_\_\_\_ |
| |
| Find |

| WINKsite |
|---|
| SITES |
| *B/C/E world* |
| 1-9 of 145 |
| 1 Bill's World (Go) |
| 2 Dave's World (Go) |
| ... |
| 8 Jay's World (Go) |
| 9 Pat's World (Go) |
|    More... *(More)* |
| -----     Done |

| WINKsite |
|---|
| SITE LIST |
| 1 0-9 (OK) |
| 2 ABC (OK) |
| 3 DEF (OK) |
| 4 GHI (OK) |
| 5 JKL (OK) |
| 6 MNO (OK) |
| 7 PQRS (OK) |
| 8 TUV (OK) |
| 9 WXYZ (OK) |
| -----     Done |

| WINKsite |
|---|
| SITE LIST |
| 1 A (OK) |
| 2 B (OK) |
| 3 C (OK) |
| |
| -----     Done |

| WINKsite |
|---|
| SITES: A |
| 1-9 of 39 |
| 1    Abe's Home (abe) (Go) |
| 2 🗆 Ace World (john42)(Go) |
| ... |
| 8    Arvan Industries (artie)(Go) |
| 9 🗆 Astro's World (fred185) (Go) |
|    More... *(More)* |
| -----     Done |

FIG. 24f

WINKsite

GO TO...
*No Such User or User Has No Sites*
type username:

_____

| OK | |

---

WINKsite

MCARD
jay
1 Sites (OK)
2 Profile (OK)
3 6315551234 (Call)

| ----- | Done |

---

WINKsite jay
Sites: 24
1   Go Club (Go)
2 ▫ Wap Club (Go)
...
8   This Club (Go)
9 ▫ That Club (Go)
    *More... (More)*

| ----- | Done |

---

WINKsite

MCARD
jay
Profile goes here
----
Last login:
Wed Mar 6, 2002
09:48AM
----
Member since:
Mon Oct 1, 2001
12:00AM

| Done | |

FIG. 24g

WINKsite

PRIVATE SITE:
*Wrong Password*
Type password:

_____

| OK | |

FIG. 25a

| My WINKsite |
|---|
| Go Club |
| 1 About (OK) |
| 2 Announcements (OK) |
| 3 Core (OK) |
| 4 Agenda (OK) |
| 5 Notes (OK) |
| 6 Zine (OK) |
| 7 Rant&Rave (OK) |
| 8 Surveys (OK) |
| 9 Chat (OK) |
|   More... (More) |
| -----    Page2/ |

| My WINKsite |
|---|
| Go Club |
| Page 2 |
| 1 Journal (OK) |
| 2 Guestbook (OK) |
| 3 Links (OK) |
| 4 M-Card (OK) |
| 5 Logout (OK) |
| -----    Page1 |

FIG. 25b

| My WINKsite |
|---|
| ABOUT |
| This is the site description text. |
| |
| Main      |

FIG. 25c

| My WINKsite |
|---|
| ANNOUNCEMENTS |
| 1-9 of 126 |
| 1 Jan11@12:34PM (View) |
| 2 Jan09@09:34AM (View) |
| ... |
| 8 Dec25@07:57PM (View) |
| 9 Dec23@01:09AM (View) |
|     More... (More) |
| -----     Main |

| My WINKsite |
|---|
| ANNOUCEMENTS |
| Tue.8 Jan 2002 |
| 01:44PM |
| This is an example announcement. |
| Done |

FIG. 25d

| My WINKsite |
|---|
| CORE |
| 1-9 of 74 |
| 1 Services (OK) |
| 2 Products (OK) |
| ... |
| 8 Rebates (OK) |
| 9 Coupons (OK) |
|     More... (More) |
| -----     Main |

| My WINKsite |
|---|
| CORE |
| Services |
| Page 1 of 5 |
| This is the content for this item, which spans many pages, and can go on and on as much as needed... |
| Last Updated: |
| Mon.11 Feb 2002 |
| 09:45AM |
| ---End--- |
| 1 More... (More) |
| |
| *NOTE: date/time on last page only |
| *NOTE: "End" only on last pg. |
| *NOTE: "More..." not on last pg. |
| Done |

FIG. 25e

My WINKsite

AGENDA
1 Today:11
2 Tomorrow:4
3 Future:9
4 Past:23

Main

My WINKsite

AGENDA:TODAY/TM../RW/FUT../PAST
1-9 of 11
1 11Jan:Event A (OK)
2 07Jan:Event B (OK)
...
8 01Jan:Event H (OK)
9 25Dec:Event I (OK)
More... (More)

Done

My WINKsite

AGENDA:TODAY/TM../RW/FUT../PAST
Event Title A
Thu.21 Feb 2002
08:38PM
@ Event Location
Page 1 of 3
This is the content for this item, which spans many pages, and can go on and on as much as needed...
— End —
1 More... (more)

*NOTE: title/dt/tm/loc only on 1st pg.
*NOTE: "End" only on last pg.
*NOTE: "More..." not on last pg.

Done

FIG. 25f

My WINKsite

ZINE
1-9 of 126
1 11Jan:My Issue Name A (OK)
2 09Jan:My Issue Name B (OK)
...
8 03Jan:My Issue Name H (OK)
9 30Dec:My Issue Name I (OK)
    More... (More)

Main

My WINKsite

ZINE
Mon.11 Jan,2002
My Issue Name A
10-18 of 23
1 My Article Title A (View)
2 My Article Title B (View)
...
8 My Article Title H (View)
9 My Article Title I (View)
    More... (More)

Done

My WINKsite

ZINE ARTICLE
My Article Title A
by Author
Page 1 of 3
This is the content for this item, which spans many pages, and can go on and on as much as needed...
—End—
1 More... (More)

*Note: title/author only on 1st pg.
*Note: "End" only on last pg.
*Note: "More..." not on last pg.

Done

My WINKsite

RANT&RAVE
1-9 of 126
1 My Topic A:11Jan (OK)
2 My Topic B:06Jan (OK)
...
8 My Topic C:01Jan (OK)
9 My Topic D:29Dec (OK)
More... (More)

Main

My WINKsite

RANT&RAVE
My Topic
Fri.11 Jan 2002
1 View Comments (OK)
2 Add Comment (OK)

Done

My WINKsite

RANT&RAVE
1-8 of 147
1 Add Comment (OK)
2 Name A:11Jan@12:30AM (View)
3 Name B:08Jan@03:15PM (View)
...
8 Name G:30Dec@04:18AM (View)
9 Anonymous:18Dec@03:25PM (View)
More... (More)

Done

My WINKsite

RANT&RAVE
Name A:
Comment A
Mon.11 Jan 2002
02:18PM

Skip/Done          Done/

My WINKsite

RANT&RAVE
Type name:
Type comment:

OK

My WINKsite writing
please wait

My WINKsite loading
please wait

FIG. 25i

My WINKsite

SURVEYS
1 Open:13
2 Closed:21

___
Main

---

My WINKsite

SURVERYS:OPEN/CLOSED
1-9 of 13
1 Survey Question A?:13Jan (OK)
2 Survey Question B?:11Jan (OK)
...
8 Survey Question H?:03Jan (OK)
9 Survey Question I?:30Dec (OK)
More... (More)

___
Done

---

My WINKsite

SURVEYS
Survey Question A that will take up as many lines as it needs?
1 Take survey (OK)
2 View comments (OK)
3 View results (OK)

___
Done

---

My WINKsite

SURVEYS
Survey Question A with nowrap?
1 Choice 1 (Vote)
2 Choice 2 (Vote)
...
8 Choice 8 (Vote)
9 Choice 9 (Vote)

___
Cancl

---

My WINKsite

SURVEYS
Survey Question A with nowrap?
11% Choice 1
09% Choice 2
...
00% Choice 8
10% Choice 9
Votes:250

___
Done

---

My WINKsite

SURVEYS
1-8 of 147
1 Add Comment (OK)
2 Name A:11Jan@12:30AM (View)
3 Name B:08Jan@03:15PM (View)
...
8 Name G:30Dec@04:18AM (View)
9 Anonymous:18Dec@03:25PM (View)
More... (More)

___
Done

FIG. 25i cont.

My WINKsite

SURVEYS
Name A:
Comment A
Mon.11 Jan 2002
02:18PM

Skip/Done | Done/

My WINKsite

SURVEY
Type name:
Type comment:

OK

My WINKsite writing
please wait

My WINKsite loading
please wait

FIG. 25j

My WINKsite

CHAT DISCLAIMER
WINKsite cannot and does not screen the content included in the chat room. For this reason, WINKsite neither endorses nor assumes responsibility for any content that may be considered objectionable to the user.

| Agree | Cancl |

My WINKsite

CHAT
Type alias: _____

| | OK |

My WINKsite

[Write Msg] (Msg)
* IDLE X SECS/MINS/HRS/DAYS/WKS
÷alias1:text 1
÷alias2:text 2
...
÷aliasn:text n
[Write Msg] (Msg)

| Msg | Menu |

My WINKsite

1 Quick text
2 Write msg
3 Exit chat

| --- | Done |

My WINKsite

Quick Text
1 Emotions
2 Phrases

| --- | Done |

My WINKsite

1 ;) Wink
2 :) Happy
3 :D Laugh
4 :( Sad
5 :O Suprised
6 :| Confused
7 :\ Oh well
8 8) Cool
9 x Kiss
@}-;--Rose

| --- | Done |

FIG. 25j cont.

My WINKsite

1 Are you still there ?
2 How's it going?
3 What's up?
4 Thanks!
5 Goodbye
6 See you later
7 I love you!
8 My WINKsite username is Done

My WINKsite

Type message:
_____

Send

My WINKsite

Do you want to exit chat?

Yes | No

FIG. 25k

| My WINKsite | My WINKsite |
|---|---|
| JOURNAL<br>1-9 of 126<br>1 11Jan:My Title A (OK)<br>2 09Jan:My Title B (OK)<br>...<br>8 03Jan:My Title H (OK)<br>9 26Dec:My Title I (OK)<br>   More... (More) | JOURNAL<br>*My Title*<br>*Pg 1 of 3*<br>This is the content for this item, which spans many pages, and can go on and on as much as needed...<br>*Mon.11 Jan 2002*<br>*12:34PM*<br>*--- End ---*<br>*1 More... (More)*<br><br>*NOTE: title only on 1st pg.<br>*NOTE: date/time only on last pg.<br>*NOTE: "End" only on last pg.<br>*NOTE: "More..." not on last pg. |
| -----    Main | Done |

FIG. 25l

My WINKsite

GUESTBOOK
1-8 of 126
1 Add entry (OK)
2 05Mar:Name A (View)
3 04Mar:Name B (View)
...
8 27Dec:Name G (View)
9 29Nov:Name H (View)
More... (More)

— | Main

My WINKsite

GUESTBOOK
Name A:
Entry Content
Tue.5 Mar 2002
12:34PM

Skip/Done | Done/

My WINKsite

GUESTBOOK
Type name:

Type entry:

OK

My WINKsite writing
please wait

My WINKsite loading
please wait

FIG. 25m

My WINKsite

LINKS
1-9 of 126
1 Link Name A (Go)
2 Link Name B (Go)
...
8 Link Name H (Go)
9 Link Name I (Go)
More... (More)

--- | Main

FIG. 25n

My WINKsite

M-CARD
jay
1 Sites (OK)
2 Profile (OK)
3 Send e-mail (OK)
4 6316642010 (Call)

--- | Main

My WINKsite jay
Sites: 24
1   Go Club (Go)
2 🔲 Wap Club (Go)
...
8   This Club (Go)
9 🔲 That Club (Go)
More... (More)

--- | Done

My WINKsite

MCARD
jay
*Profile goes here*

Last login:
Wed Mar 6, 2002
09:48AM

Member since:
Mon Oct 1, 2001
12:00AM

| Done

FIG. 25o

| My WINKsite | My WINKsite | My WINKsite |
|---|---|---|
| E-MAIL FORM<br>Your Name:<br>_____ | Your e-mail:<br>(required)<br>_____ | Provide callback number?<br><br>Yes  \|  No |
| OK | OK | |

| My WINKsite | My WINKsite | My WINKsite |
|---|---|---|
| Type callback number:<br>_____ | Select subject:<br>1 Enter your own subject<br>2 Let's Meet!<br>3 What's Up<br>4 Where are you?<br>5 Call Me<br>6 E-mail me<br>7 Site comments<br>8 Site suggestions<br>9 Go to chat room<br>   Appointment Request | Type subject:<br>_____ |
| OK | OK | OK |

*FIG. 25o cont.*

My WINKsite

Type message:
___

OK

My WINKsite

Review & Edit:
1 Name:Jay (Edit)
2 Email:jay@email.com (Edit)
3 Phone:6315551234 (Edit)
4 Subj:Hello (Edit)
5 Msg:How are you doing? (Edit)

Send

My WINKsite

Your e-mail has been sent to fred123.

Done

METHOD, APPARATUS AND SYSTEM FOR MANAGEMENT OF INFORMATION CONTENT FOR ENHANCED ACCESSIBILITY OVER WIRELESS COMMUNICATION NETWORKS

RELATED APPLICATION(S)

The present application is continuation of U.S. patent application Ser. No. 14/324,698 filed Jul. 7, 2014, which is a continuation of U.S. patent application Ser. No. 14/175,768 filed Feb. 7, 2014 and now issued as U.S. Pat. No. 8,825,801, which is a continuation of U.S. patent application Ser. No. 13/364,950 filed Feb. 2, 2012 and now issued as U.S. Pat. No. 8,793,336, which is a continuation of U.S. patent application Ser. No. 13/027,519 filed Feb. 15, 2011 and now issued as U.S. Pat. No. 8,135,801, which is a continuation of U.S. patent application Ser. No. 12/548,928 filed Aug. 27, 2009 and now issued as U.S. Pat. No. 7,908,342, which is a continuation of U.S. patent application Ser. No. 10/464,526 filed Jun. 18, 2003 and now issued as U.S. Pat. No. 7,599,983, which claims the priority of U.S. Provisional Application Ser. No. 60/389,430 filed Jun. 18, 2002, the disclosures of which are hereby incorporated by reference herein.

FIELD OF THE INVENTION

The present invention relates generally to network-based communication systems, and more particularly to techniques for information content management in such systems.

BACKGROUND OF THE INVENTION

One of the most rapidly expanding aspects of wireless networking involves the accessing of information content over wireless networks via web-enabled mobile devices. Examples of such devices include mobile telephones, personal digital assistants (PDAs), palmtop computers, etc. As is well-known, these and other web-enabled devices not only provide access to the Internet, but can also be used to support other types of wireless networking functionality, such as messaging, distributed collaboration, and location-based services.

An important challenge in this context relates to facilitating the process of creating, publishing, distributing or otherwise managing information content so as to provide optimal presentation consistent with the limited display space and navigational capabilities of typical mobile devices. Many users, for example, may wish to make specific personalized information content available via mobile devices to their friends, colleagues, subscribers or other entities. However, conventional techniques have been unable to meet this need in a satisfactory manner. By way of example, conventional techniques such as web site authoring tools and web logging ("blogging") are not optimized for use in the generation of information content for shared access via mobile devices.

These and other conventional techniques suffer from a number of significant drawbacks, including a failure to provide suitable integration of messaging, collaboration, location-based services or other wireless networking functionality with the generation of shared information content. As a result, it is generally not possible for different mobile device users to link to and take further action on a persistent version of a given set of shared information content. The conventional techniques thus fail to provide a mechanism that facilitates uniform, action-driven content access and associated user interaction via wireless networks. Also, such techniques generally require a significant amount of programming knowledge for their proper use, and are therefore not suitable for relatively unsophisticated users.

Accordingly, a need exists for improved techniques for managing information content in a manner that overcomes one or more of the drawbacks of the conventional techniques described above.

SUMMARY OF THE INVENTION

The present invention in an illustrative embodiment thereof provides techniques for efficient generation and management of mobile sites that are advantageously integrated with wireless networking functionality of a wireless network in a network-based communication system.

In accordance with one aspect of the invention, a method comprises obtaining content at a mobile device, determining information associated with at least one wireless networking functionality of the mobile device responsive to user input, and providing the content and determined information to at least one server for insertion into a specified application-based information channel.

In accordance with another aspect of the invention, a mobile device comprises at least one processing element comprising a processor coupled to a memory and at least one network interface. The at least one processing element is configured to obtain content, determine information associated with at least one wireless networking functionality of the mobile device responsive to user input, and provide, via the at least one network interface, the content and determined information to at least one server for insertion into a specified application-based information channel.

In accordance with another aspect of the invention, a method comprises receiving, at a server from a mobile device, content for insertion into a specified application-based information channel, receiving, at the server from the mobile device, information associated with at least one wireless network functionality of the mobile device, and integrating the content and the information associated with said at least one wireless network functionality of the mobile device into the specified application-based information channel.

In accordance with another aspect of the invention, a server comprises at least one processing element comprising a processor coupled to a memory and at least one network interface. The at least one processing element is configured to receive, from a mobile device, content for insertion into a specified application-based information channel, receive, from the mobile device, information associated with at least one wireless network functionality of the mobile device, and integrate the content and the information associated with said at least one wireless network functionality of the mobile device into the specified application-based information channel.

BRIEF DESCRIPTION OF THE DRAWINGS

FIGS. 6 through 17b are screenshots of illustrative site pages associated with a content management site in the system of FIG. 1A.

FIGS. 24a through 25o show typical illustrative examples of mobile site screens generated at a mobile device in the system of FIG. 1A.

DETAILED DESCRIPTION

The present invention will be illustrated herein in the context of an exemplary network-based communication system and associated system elements and processes. It is to be appreciated, however, that the particular arrangements shown and described herein are presented by way of illustrative example only, and should therefore not be construed as limiting the scope of the present invention to any particular embodiment or group of embodiments. Those skilled in the art will recognize that the described techniques are more generally applicable to any wireless communication application in which it is desirable to provide improved integration of information content management with wireless network functionality.

Figure 1A:
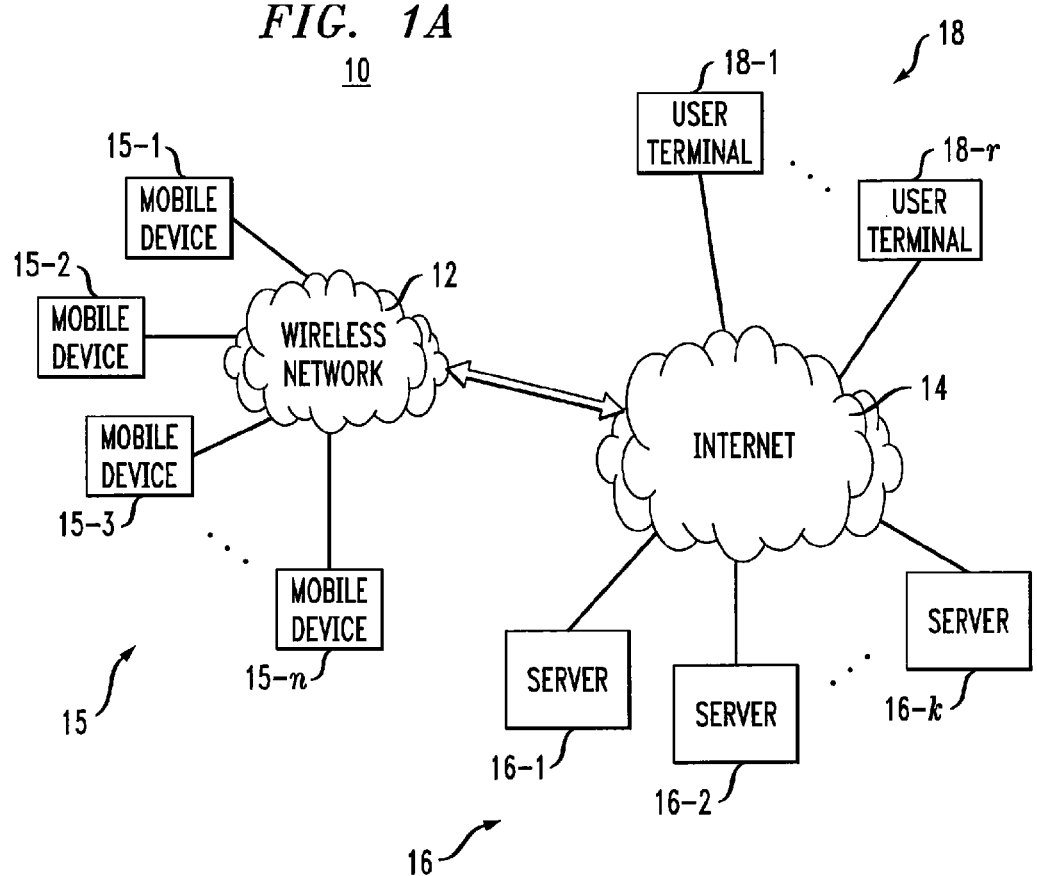
FIG. 1A is a block diagram of an example network-based communication system configured in accordance with an illustrative embodiment of the invention.

FIG. 1A shows an example network-based communication system 10 configured in accordance with an illustrative embodiment of the invention. The system 10 includes a wireless network 12 coupled to the Internet 14, a set of mobile devices 15, a set of servers 16 and a set of user terminals 18. More specifically, mobile devices 15-1, . . . 15-n are coupled to the wireless network 12, while servers 16-1, . . . 16-k and user terminals 18-1, . . . 18-r are coupled to the Internet 14. The numbers n, k, and r are purely arbitrary, provided for simplicity and clarity of illustration only, and in a given implementation of this illustrative embodiment can take on any desired value. Also, alternative embodiments of the invention need not include the particular system elements shown, and may include other elements of a type and configuration known to those skilled in the art, in place of or in addition to the particular elements shown.

The mobile devices 15 and user terminals 18 may be more generally referred to herein as user devices.

The term "user" is intended to include, without limitation, an individual, a group of individuals, a business, an organization, or any other entity capable of deriving benefit from use of at least a portion of the system 10. Actions described herein as being performed by or otherwise associated with a user may be performed by or otherwise associated with an individual or other entity, a corresponding device, or both the entity and the device.

The network configuration of system 10 illustratively comprises wireless network 12 and Internet 14. However, the invention does not require this particular network arrangement. A network suitable for use with the invention may include any type of data communication network, including the Internet, an intranet, an extranet, a wide area network (WAN), a metropolitan area network (MAN), a wired local area network (LAN), an IEEE 802.11 or Wi-Fi wireless LAN, a satellite communications network, a virtual private network (VPN), a public switched telephone network (PSTN), a cellular network based on third generation (3G) wideband code division multiple access (CDMA) or other standard, as well as portions or combinations of these and other networks.

It is also to be appreciated that the invention is not limited with regard to the particular communication protocols that may be utilized in communicating information within the system 10 of FIG. 1A. Examples of communication protocols utilizable in conjunction with the invention include Internet protocol (IP), transmission control protocol (TCP), user datagram protocol (UDP), real-time protocol (RTP), short message service (SMS), multimedia message service (MMS), wireless application protocol (WAP), session initiation protocol (SIP), etc.

The mobile devices 15 can collectively comprise a wide variety of different devices configurable for communication over the network 12. The term "mobile device" as used herein is intended to include, without limitation, any type of portable information processing device capable of being configured for communication over a network. Examples of mobile devices 15 utilizable in system 10 of FIG. 1A include a mobile telephone, a personal digital assistant (PDA), a palmtop computer, a hand-held computer, a laptop computer, a tablet computer, a global positioning system (GPS) receiver or other GPS-based navigational device, an MP3 player or other type of audio player, a pager, a watch or other timepiece, a camera, a portable game player, etc.

The servers 16 may comprise, by way of example, network computers or other types of computers or processing elements capable of being configured for the maintenance, storage, delivery or other processing of information received or deliverable over the Internet or other type of network.

Although not specifically denoted as such in the figure, one or more of the user terminals 18 may each comprise a mobile device. Also, a given one of the user terminals 18 may comprise a non-mobile device, including, by way of example, a desktop personal computer, a workstation, a minicomputer, a mainframe computer, a television, a set-top box, a kiosk, etc.

Figure 1B:
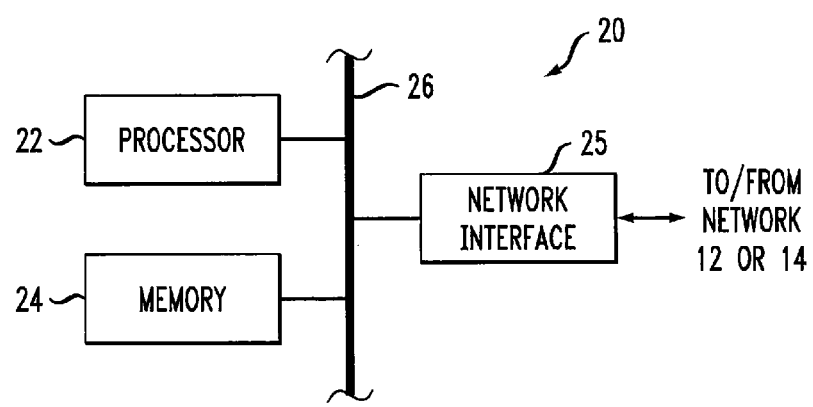
FIG. 1B is a block diagram showing one possible implementation of a given processing element in the system of FIG. 1A.

FIG. 1B shows one possible implementation of an information processing element 20 of the system 10. The processing element 20 may be viewed as being representative of a given one of the mobile devices 15, a given one of the servers 16, or a given one of the user terminals 18. The processing element 20 in this implementation includes a processor 22, a memory 24, and a network interface 25, which communicate with one another over a set of bus lines 26. The processor 22 may comprise, for example, a microprocessor, a central processing unit (CPU), an application-specific integrated circuit (ASIC), a computer, or any other type of digital data processing device, as well as portions or combinations of such devices. The memory 24 may comprise electronic memory such as random access memory (RAM), read-only memory (ROM), disk-based memory, or any other type of storage device, as well as portions or combinations of such devices. The network interface 25 provides an interface for the processing element 20 to the wireless network 12 or Internet 14.

The memory 24 of processing element 20 stores one or more software programs which are executed by the processor 22 in providing at least a portion of the system functionality described herein as being associated with the corresponding mobile device, server or user terminal. One skilled in the art would understand that memory 24 is an example of a computer-readable storage medium.

In accordance with one aspect of the invention, the system 10 in the illustrative embodiment provides at least one content management site accessible to a system user. The user may be a user associated with one of the mobile devices 15, or any other system user. The content management site may be supported by one or more of the servers 16, and may be accessed by the user over Internet 14 via one of the user terminals 18. The content management site permits the user to enter information in accordance with a specified format comprising a plurality of selectable mobile information channels each corresponding to an information category. The mobile information channels are also referred to as "M-channels" herein, and will be described in greater detail below. The entered information is processed to generate a mobile web site comprising information content that is accessible via one or more of the mobile devices 15 over the wireless network 12 of the system 10. The information content of the mobile site is preferably configured such that a persistent version thereof is accessible via the one or more mobile devices 15 over the wireless network 12.

The content management site can also be accessed via one of the mobile devices 15, and used to create a mobile site also accessible via that mobile device and one or more other mobile devices.

The system 10 can support any desired number of content management sites and any desired number of mobile sites that are generated and managed via the content management sites. For example, a given content management site can be associated with a particular business or other entity, and can be used to generate a plurality of mobile sites for various users associated with that business or other entity. An operator of the content management site can offer mobile site building and other content management services to such entities for a fee. The operator may also provide customization services, so that a given entity can create mobile sites that bear corresponding corporate trademarks, logos or other symbols, or that are customized in other ways.

In the illustrative embodiment, the content management sites and the mobile sites may each be implemented as a corresponding web site accessible over the Internet 14, although this is not a requirement of the invention. Other embodiments may implement one or more of the content management sites or one or more of the mobile sites as intranet sites, extranet sites or other information sources accessible via these or other types of networks.

Advantageously, the information content of a given mobile site generated in the system 10 may be configured so as to integrate therewith information associated with at least one wireless networking functionality of the wireless network 12. This information may be determinable based at least in part on one or more parameters associated with the above-noted mobile information channels or M-channels. Examples of such information include information specifying at least one messaging action implementable over the wireless network, information specifying at least one collaboration action implementable over the wireless network, and information specifying at least one location-based service action implementable over the wireless network. Other types of information associated with wireless networking functionalities may also or alternatively be used.

Accessibility to a given mobile site may be controlled so as to permit one or more third parties to view at least a portion of the mobile site without any such parties being registered users of the content management or mobile site portions of the system.

A given content management site may be provided, for example, by a service provider or other entity operating the wireless network 12, and a user thereof may be a subscriber of that entity. More particularly, the content management site may include identifying information indicating association of the site with the entity operating the wireless network, and may be made accessible only to subscribers of the wireless network.

As another example, a given content management site used for generation and management of a mobile site may be provided to the user contingent upon purchase of specified goods or services associated with the wireless network 12.

Numerous other content management site configurations may be used in implementing the invention.

A given mobile site in accordance with the invention can be generated for a group comprising multiple members having a common interest. For example, a mobile site may be generated for a family, a group of friends, a club, a sports team, a business, a sales force, a civic group, a fan group, a political party, a campaign, a charity, or any other type of multi-member organization. Such a site may be used for efficient dissemination of relevant information to group members via the wireless network 12. For example, the site can be used to generate messages, using instant messaging (IM), SMS, MMS, pages, emails, voice-over-IP (VoIP) calls, cellular telephone calls, or any other suitable messaging format, that are sent to organization members over the wireless network. Such a message from a given member of the organization can direct other members to access the mobile site to obtain additional information regarding events, news, cancellations, reschedulings, updates, polls, special requests, etc. Organization members can easily and efficiently post information and generate messages to other members so as to facilitate collaboration and other types of interaction.

A given mobile site, also by way of example, may be associated with an event, and information identifying the event and its associated mobile site may be transmitted via the wireless network 12 to mobile devices of one or more users that are determined to be likely to have an interest in the subject matter of the event. The event may be a movie, a concert, a sporting event, a political rally, a contest, a promotion, particular goods or services being offered for sale by a vendor at certain prices or on certain conditions, etc. Such interested users may be determined, for example, by comparing generalized demographic data associated with the event with personal demographic data previously stored for the system users, or utilizing other marketing data based techniques. A mobile site of this type is especially useful for implementing follow-up marketing actions, user registration, etc.

As another example, a given mobile site may be associated with a particular geographic location. More specifically, the given mobile site may be generated for a "waypoint" specified by particular latitude and longitude coordinates representing a geographic location utilized in the activity of geocaching, or other location-based activity. In generating such a mobile site utilizing the techniques of the invention, a user could enter information such as a title, a location specified by latitude, longitude, elevation, or other location-identifying information, a difficulty level, a terrain quality, one or more hints, a map, or other types of information. Along with typical items found in a conventional geocache, such as trinkets and a log, a password could be included that provides access to a corresponding mobile site which can be utilized by other users to validate that they have found the geocache. Contests or promotions could also be organized to provide specified rewards to a first user to reach a given geocache. The first user to reach the geocache can be identified by determining the first user to log into the geocache mobile site using the appropriate password. Visitors to the mobile site may be provided with an ability to leave a note or other message describing aspects of their journey, what items they took from the geocache, what items they placed in the geocache, etc. Mobile sites corresponding to geocaches may be searched for by zip code, state, country, keyword, waypoints, GPS coordinates, etc. A mobile device with built-in GPS capability may be used to facilitate interaction with mobile sites corresponding to geocaches or other geographic locations. Mobile sites corresponding to these and other geographic locations can be accessed, for instance, using a GPS-based automotive navigation device, or other types of user devices.

As an additional example, a given mobile site may be associated with a game. More specifically, a mobile site may be generated for a game and accessed from a web-enabled gaming device or other type of user device. The mobile site could provide information such as tips, tricks, player profiles, and player locations, and could also be used to support collaboration or other types of communication between players. Players may also be permitted to access the mobile site from non-gaming user devices, to participate in game-related activities that could lead to increasing their health points, skill level, number of lives, hit points, magic level, equipment, apparatus, gear, etc.

As a further example, a given mobile site may be associated with a user of IM, SMS, MMS, email or other type of messaging service. More specifically, a mobile site may be generated for a particular user so that other users exchanging messages with the particular user are provided with access to persistent information content that facilitates their interaction with the particular user. Such an arrangement is particularly useful as the volume of wireless "spam" is continually increasing and users require an "island in the storm" at which they can interact in a controlled, private collaborative workspace. Additionally, when a user accesses an email or other type of message using a mobile device, that user can be directed to a mobile site for follow-up marketing actions or other activities.

As another example, a given mobile site may be associated with a television program, movie, music artist or other entertainment-related entity. More specifically, a mobile site may be generated for a broadcast program and accessed by a user from a set-top box while the user is watching that program. Interaction activities involving provided content could then take place between viewers, the network, and advertisers.

As yet another example, a given mobile site may be associated with a particular product via product name, bar code, radio frequency identification (RFID), or other type of product-identifying information. Such a mobile site could be configured to provide, for its associated product, additional information of interest to product users, customer service access, ordering or purchase support, etc.

Of course, the foregoing are merely examples of mobile sites that may be generated and managed using the techniques of the invention. Numerous other types of mobile sites may be used in implementing the present invention.

The term "mobile site" as used herein is intended to include, without limitation, a web site, a collaborative workspace, a data mailbox, a collaborative community, an Internet storefront, one or more M-channels and/or an associated data set, or other similar element(s), as well as portions or combinations thereof.

The above-noted M-channels will now be described in greater detail. As mentioned previously, M-channels are utilized at the content management site of the illustrative embodiment to facilitate the generation of mobile sites and the management of associated content. More specifically, the M-channels allow unsophisticated users to easily and efficiently author message data or other types of information content to be made accessible via a collaborative workspace, a data mailbox, a collaborative community, or other type of mobile site or portion thereof generated or otherwise managed in the system 10. Features such as task, action, event, location, delivery or collaborative enabling of specified M-channel content may be specified along with access methods, automatic generation of wirelessly accessible navigation menus, content presentation views, etc.

The particular configuration of the M-channels, and the content integration options associated therewith, may vary from implementation to implementation depending upon factors such as the particular wireless networking functionalities available in the system.

Examples of M-channels suitable for use in the illustrative embodiment include channels denoted herein as mobile ID/business card (also referred to as a "contact" M-channel), announcements, chat, events, guest book, diary/journal, bookmarks/links, discussion forum, survey/poll, newsletter/zine, notes, email, address book, contribute/donate, mobile volunteer management, company directory, in/out board, field reports, feedback, form builder, live data/in-out syndication, mobile document library, products catalog/shopping cart, services catalog/shopping cart, appointments, task list/assignments, promotions, offers, coupons, sweepstakes, contests, photo blog, etc. Numerous other information categories may be represented by corresponding mobile information channels at a content management site in accordance with the invention.

The notation "/" as used herein should be understood to refer to "and/or" unless otherwise indicated.

Additional details regarding the operation of exemplary M-channels in accordance with the invention will be described below in conjunction with certain of the site pages of FIGS. 2 through 17, as well as in conjunction with the operational flow diagrams of FIGS. 21 and 22.

As indicated previously, the content management aspects of the system 10 can be implemented at least in part utilizing software associated with processing elements of the system. A more particular example of one possible arrangement of such elements will now be described in conjunction with FIG. 1C. Of course, this is simply one possible arrangement, and a wide variety of other arrangements suitable for implementing the techniques of the invention will be readily apparent to those skilled in the art.

Figure 1C:
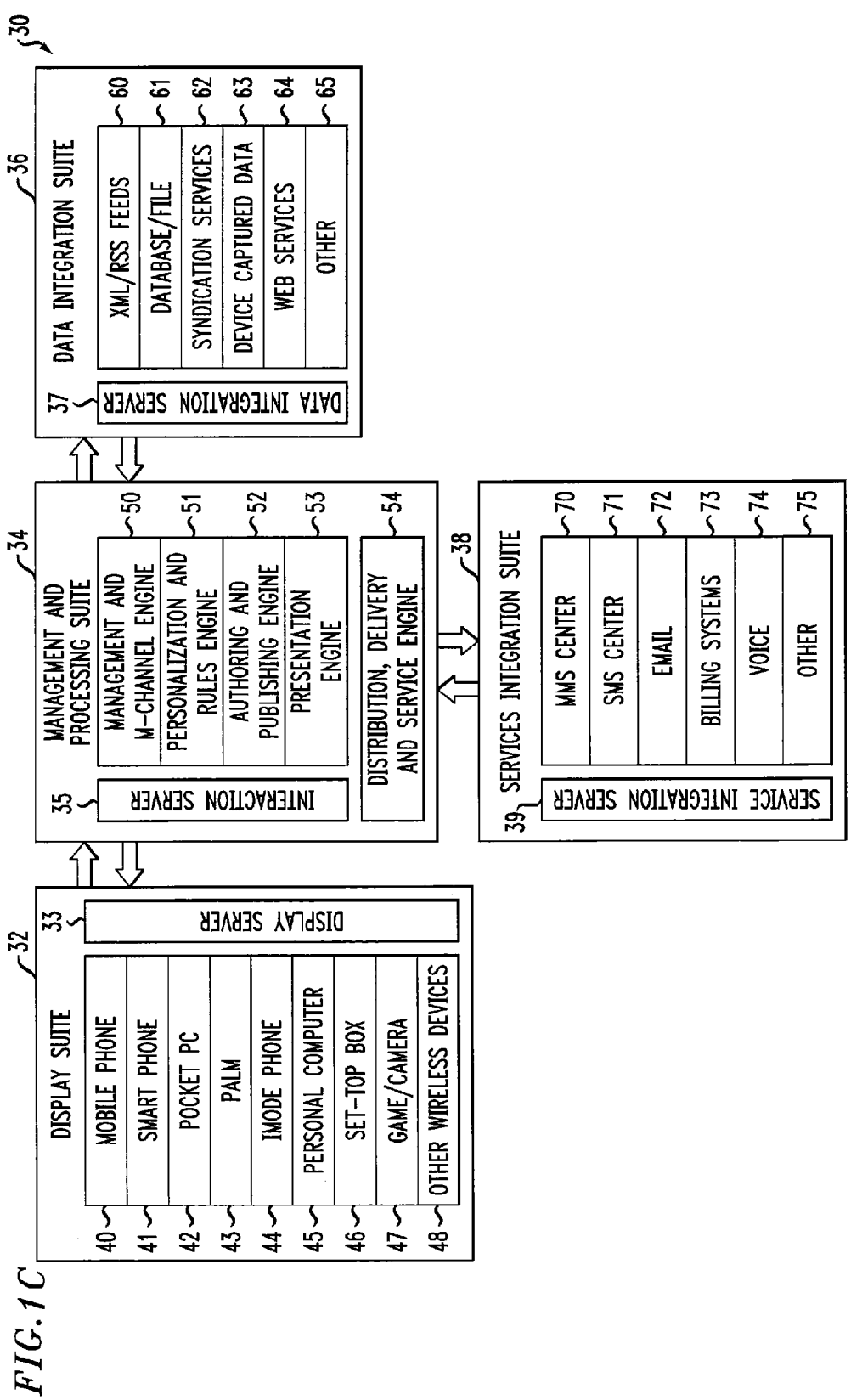
FIG. 1C shows a block diagram of one possible arrangement of system elements associated with the system of FIG. 1A.

Referring now to FIG. 1C, a set of processing elements 30 in the system 10 includes a plurality of "suites," each suite comprising a particular arrangement of hardware, software and/or firmware elements implemented using one or more of the mobile devices 15, servers 16 and user terminals 18 of the system 10. More specifically, the set of processing elements 30 comprises a display suite 32 associated with a display server 33, a management and processing suite 34 associated with an interaction server 35, a data integration suite 36 associated with a data integration server 37, and a services integration suite 38 associated with a services integration server 39. Each of the servers 33, 35, 37 and 39 may comprise one or more of the servers 16 or other elements shown in FIG. 1A, or suitable portions or combinations thereof.

Communications between the suites 32, 34, 36 and 38 may be carried out using conventional connections established over wireless network 12 or Internet 14, or using other communication channels or transport media of a type known in the art.

In the display suite 32, a number of example user devices, including mobile phone 40, smart phone 41, pocket PC 42, Palm device 43, iMode phone 44, personal computer 45, set-top box 46, game and/or camera 47 and other wireless devices 48, interact with the display server 33. The display server 33 interacts with elements of one or more of the other suites in controlling the presentation of particular screens on the various user devices. Certain of the user devices in suite 32 may be viewed as representative examples of mobile devices 15, while others may be viewed as representative examples of user terminals 18.

The management and processing suite 34 includes a management and M-channel engine 50, a personalization and rules engine 51, an authoring and publishing engine 52, a presentation engine 53, and a distribution, delivery and service engine 54. The interaction server 35 controls the interface between these engines and the display server 33 of the display suite 32. The management and processing suite 34 in this example provides the above-noted content management site(s) utilized to generate and otherwise manage mobile sites in accordance with the techniques of the invention.

The data integration suite 36 includes extensible markup language (XML) and/or rich site summary (RSS) feeds 60, database and/or file 61, syndication services 62, device-captured data 63, web services 64, and other data sources 65. The data integration server 37 controls the interface between these data sources and the interaction server 35 of the management and processing suite 34.

Other XML-related protocols that may be utilized in conjunction with the invention include, for example, remote procedure call (RPC), outline processor markup language (OPML), and simple object access protocol (SOAP).

The services integration suite 38 includes an MMS center 70, an SMS center 71, email systems 72, billing systems 73, voice systems 74, and other systems 75, each of which may be viewed as representative of a particular type of wireless networking functionality accessible to the mobile devices 15 via the wireless network 12. The services integration server 39 controls the integration of information associated with these wireless networking functionalities with the content of the mobile site generated via the content management site.

Figure 1D:
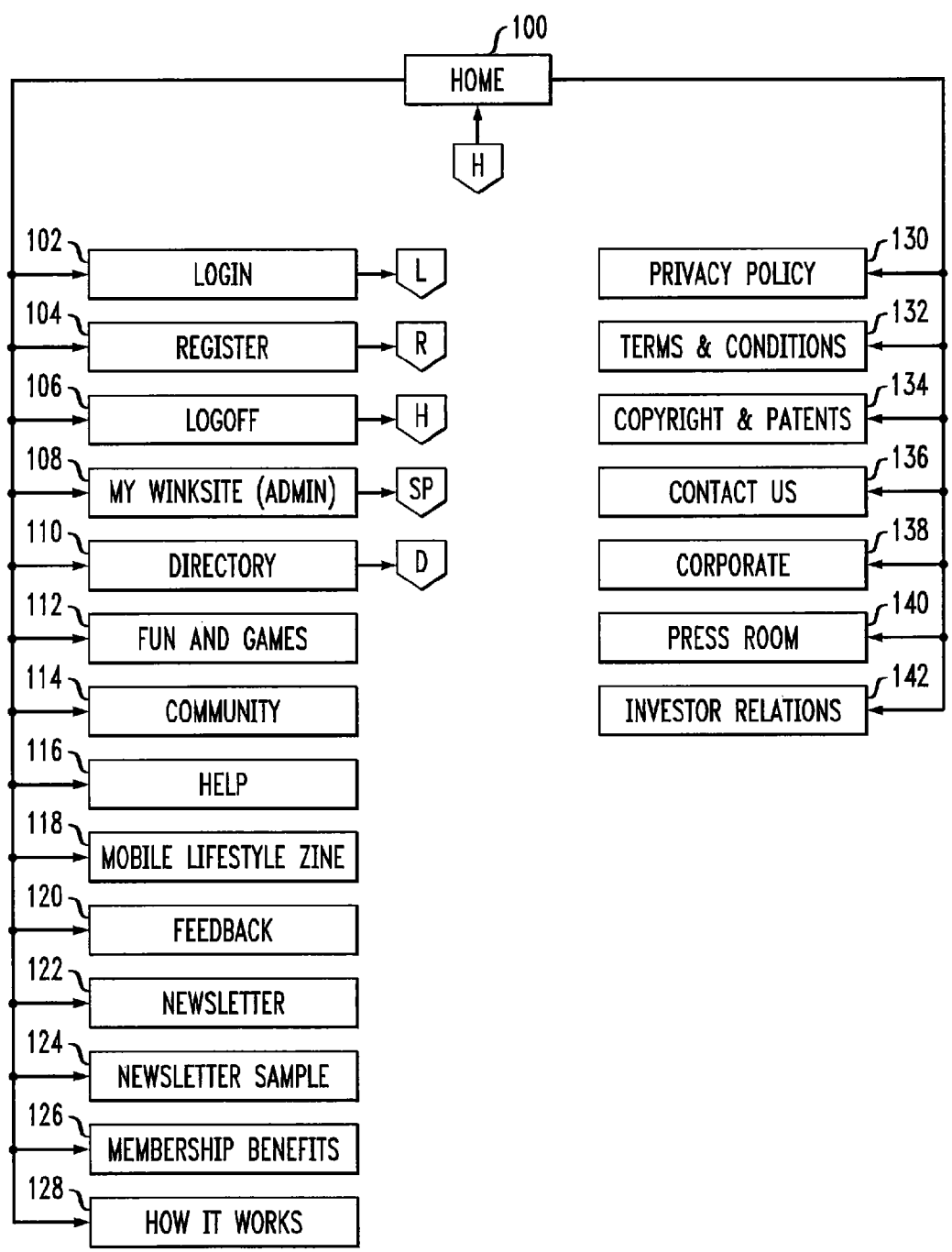
FIG. 1D shows a schematic diagram of home page of a content management site in the system of FIG. 1A.

FIG. 1D shows a home page of an example content management site in the illustrative embodiment of the invention. The example content management site in the context of the illustrative embodiment comprises an Internet web site used to generate and otherwise manage mobile sites. A given one of the mobile sites may be referred to herein as a "Winksite," where "Wink" may be viewed generally as a shortened form of the term "wireless ink," reflecting the wireless content management aspects of the invention.

It is to be appreciated that certain aspects of the content management site may be made accessible via one or more of the mobile sites and vice-versa. The notation "Winksite" may therefore also be used to denote a content management site or portion thereof, or a hybrid site comprising aspects of both a content management site and one or more mobile sites.

Additional schematic diagrams of web pages associated with the example content management site or a corresponding mobile site will be described in conjunction with FIGS. 2 through 5. Related screenshots of the web pages associated with the content management site will be described with reference to FIGS. 6 through 17. It should again be emphasized, however, that the arrangements shown are presented by way of illustrative example, and should therefore not be construed as limiting the scope of the invention in any way.

The content management site may be viewed as being part of a mobile communications publishing platform provided by the system 10 of FIG. 1A. This platform integrates aspects of wireless network functionality with mobile site content generation, thereby facilitating user interaction via the mobile devices 15. The content management site in the illustrative embodiment is designed to generate and otherwise manage dynamic, time-sensitive, task-oriented mobile sites, including wireless collaborative workspaces and communities. The content management site allows content such as data, media, multimedia, messages, news, features, events, polls, competitions and advertising to be rapidly created, entered into the system, and then subsequently syndicated, distributed, shared, collaborated with or acted upon by users of mobile devices.

By utilizing the content management site, system users can create one or more personal or business mobile sites with various sets of features, and then share such sites via the mobile Internet or other wireless network with friends, family, colleagues, or other groups of any type. The content management site makes it simple for unsophisticated users to upload, enter, create, syndicate, distribute or otherwise manage content that is important to them, in a manner that allows such content to be accessed, shared, and acted upon from a mobile device.

Referring now to FIG. 1D, a home page 100 of the content management site provides a user interface comprising a series of display regions denoted by blocks 102 through 142, each associated with a corresponding user-activatable control mechanism. These control mechanisms may be implemented as a plurality of hypertext links, each of which, when activated, instantiates a subordinate user interface comprising one or more other pages of data associated with the content management site. The home page 100 and other pages referred to herein may be configured using hypertext markup language (HTML), XML, or other any suitable web page formatting language, as well as combinations of such languages.

Access to the home page 100 may be provided to all system users, regardless of whether or not those users have previously registered with the system. A given user accesses the home page 100 by entering a corresponding uniform resource locator (URL) in a web browser of their associated user device. Although not specifically shown in the figure, introductory, instructional or other explanatory text, as well as graphics and various forms of advertising, including so-called click-through or banner advertising, may be included on the home page 100.

A registration process is preferably provided in order to allow users to establish an account with the system. Such a process can be initiated by activation of the hyperlink associated with block 104. Previously-registered users can login to their accounts by activating the hyperlink associated with block 102. Details of the registration and login processes associated with respective blocks 104 and 102 will be described below in conjunction with the respective flow diagrams of FIGS. 19 and 20.

Access to certain system features associated with certain blocks, such as blocks 108 through 124, may be limited to registered users. Registered users may also be referred to herein as "members."

The text and graphics of the home page 100, although initially the same for both registered and unregistered users, may be periodically updated or otherwise customized to display account information or other information that is unique to a registered user, upon login of such a user.

Block 106 in FIG. 1D represents a display region containing a link to an optional logoff process. The logoff process enables a registered user who has previously logged in to activate a control so as to redirect his or her browser to the non-customized version of home page 100. This feature is useful, for example, in a situation in which multiple users share the same personal computer or other terminal. More specifically, a given registered user who has logged in may, without turning off the computer or closing its Internet connection, and even without closing the browser or pointing it to another URL, conceal and prevent further access to his or her account information while also enabling another registered or unregistered user to access the home page 100.

Figure 2:
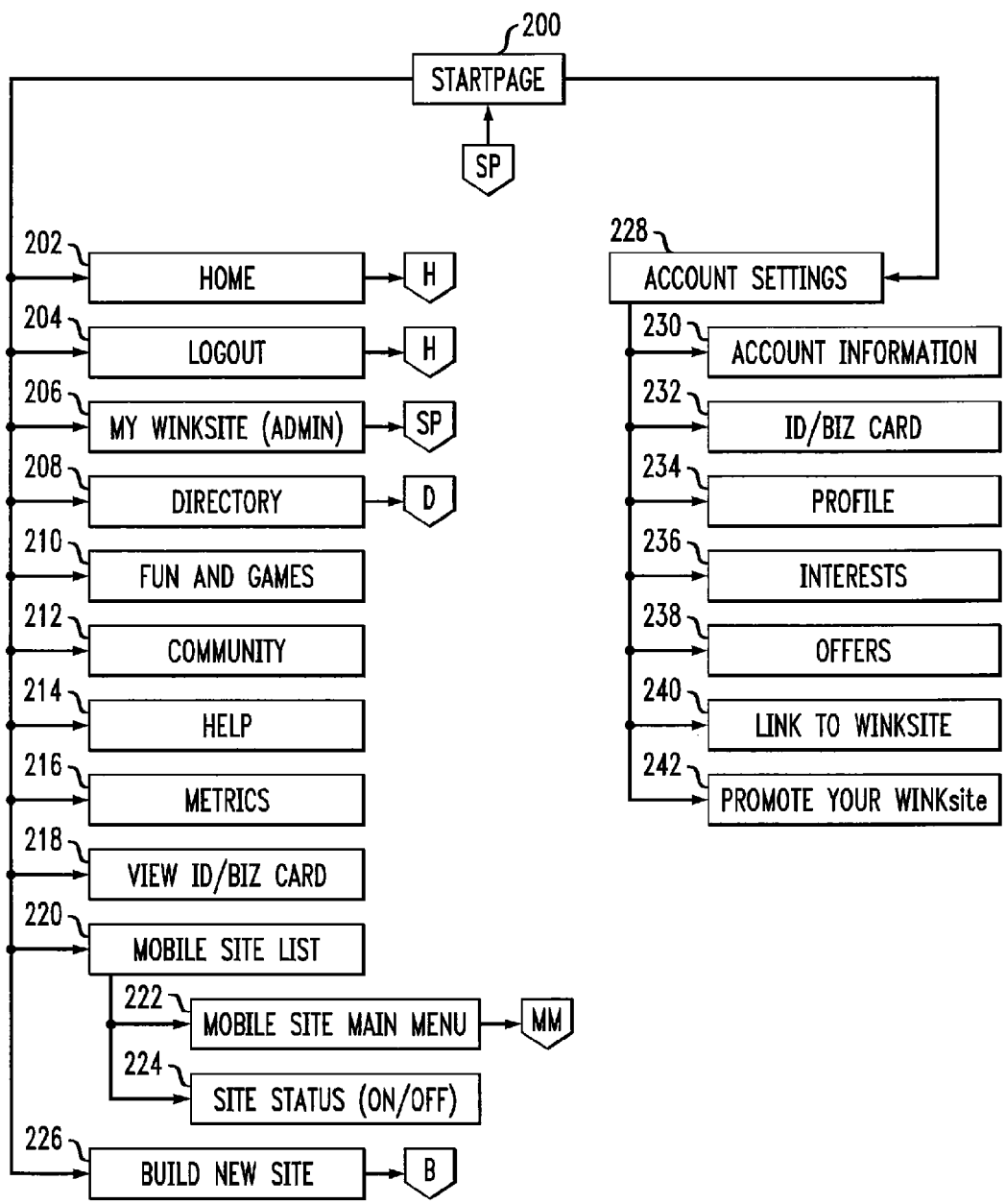
FIGS. 2 and 3 show additional schematic diagrams of site pages associated with a content management site in the system of FIG. 1A.

FIG. 2 shows a start page 200 of the example content management site in the illustrative embodiment of the invention. The start page 200 provides a user interface comprising a series of display regions denoted by blocks 202 through 242, each associated with a corresponding user-activatable hypertext link or other control mechanism. The start page 200 may be accessed, for example, by activating the link associated with block 108 of FIG. 1D.

Figure 3:
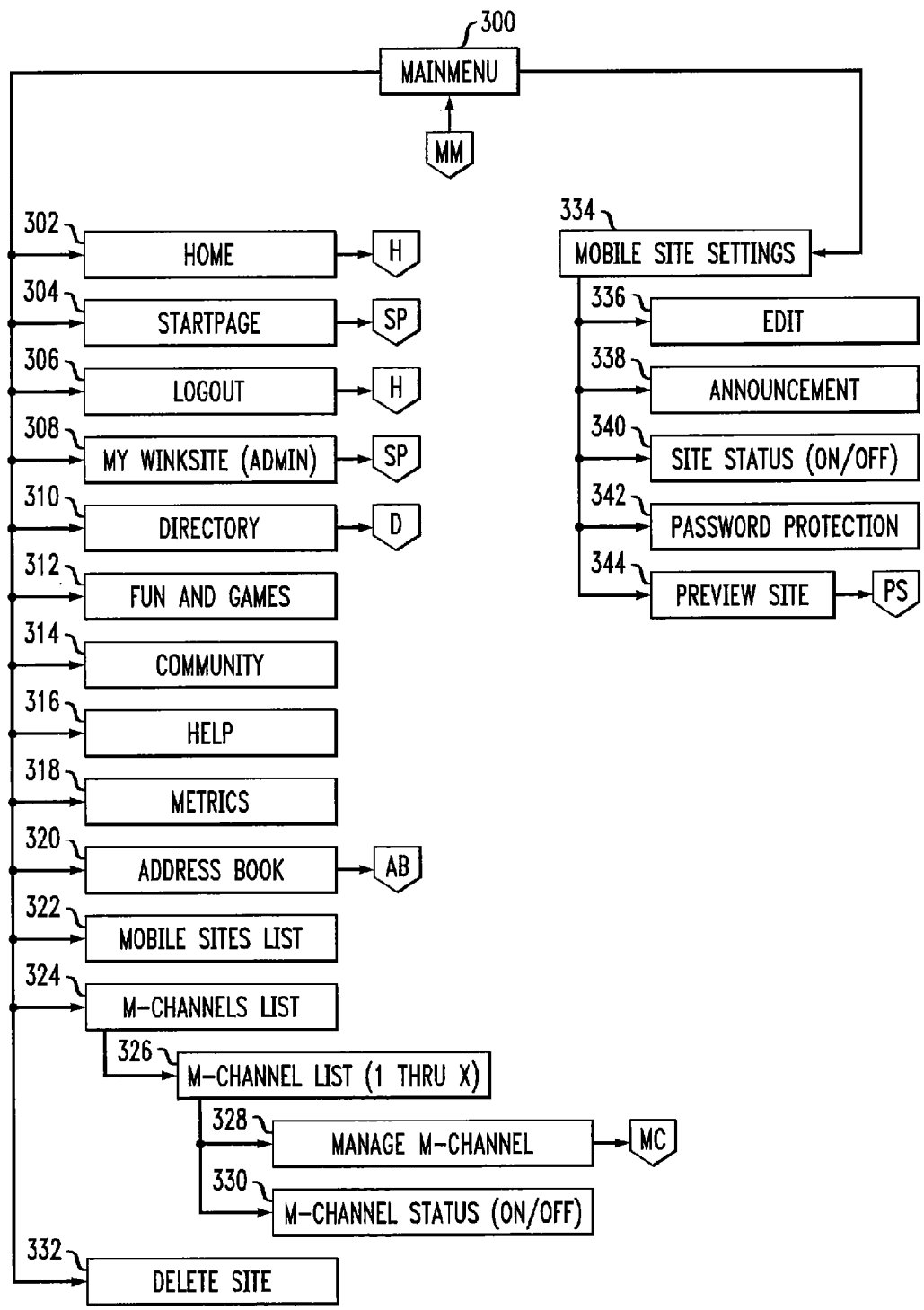

FIG. 3 shows a main menu page 300 of the example content management site in the illustrative embodiment of the invention. The main menu page 300 provides a user interface comprising a series of display regions denoted by blocks 302 through 344, each associated with a corresponding user-activatable hypertext link or other control mechanism. The main menu page 300 may be accessed, for example, by activating the link associated with block 222 of FIG. 2.

An example of a preference feature that may be made available only to registered users is an address book feature. This feature can be accessed by activating the link associated with block 320 in FIG. 3. Such a feature allows the names, email addresses, mobile telephone numbers and other contact information of potential message recipients to be recorded and then easily selected when a message is to be sent.

A given registered user may be permitted to elect to share his or her address book information, or other types of user information, with other users. Such sharing can be implemented by activating a link (not shown) to a page where the user may provide identifying information about the other individual(s) with whom he or she proposes to share information. The site software may be configured such that, if any of the other individuals are registered users, an email message is sent to those individuals. The email message may contain a link to the URL of a page at which the individuals will be given the option of accepting or declining the information sharing proposal.

If any of the other individuals are not registered users, then an attempt may be made to obtain an email address for each of those other non-registered users. For any such non-registered users for which an email address is obtained, an email message may be sent containing a link, along with appropriate explanatory text, to the site registration process to be described in conjunction with FIG. 19. After completing the registration process, the individual will be given the option of accepting or declining the information sharing proposal.

A given registered user may also be permitted to designate one or more other users selected, for example, from among those listed in a directory or contact list, with whom the given user would like to interact. Any such other users may be notified in the manner indicated above and provided with an opportunity to accept or deny the proposed interaction.

Another preference feature that may be provided to registered users is an ability to designate one or more of the mobile sites available in the directory of the content management site as "favorite" mobile sites. This can substantially reduce the number of screens or pages that need be reviewed in order to select a particular mobile site to visit. However, it should be understood that registered users who have designated certain mobile sites as favorite mobile sites are not thereafter limited to making their selections only from among those favorites. Each such user may still choose to review and select from all of the available mobile sites within the directory.

Yet another preference feature that may be made available to registered users is an ability to post one or more messages on a "community bulletin board" that is accessible to both registered and non-registered users. This feature allows non-registered users to become aware of the messages posted by registered users, thereby encouraging further registrations and increasing use of the site.

Registered users may also be permitted to track the activity of their associated mobile sites by creating, selecting or otherwise designating an avatar whose health, personality, responses, behavior or other characteristics reflects in some manner the level of activity associated with the sites. Such an avatar may be used to provide an "at a glance" representation of the popularity, usage, traffic patterns or other characteristic(s) of a corresponding mobile site.

It is also possible to provide different levels of service for different registered users. For example, certain registered users may be permitted to elect to upgrade their registration to one or more "preferred" levels of service. The various levels of service may be designated using different colors or other sets of designations, such as "copper," "silver," "gold" and "platinum," or "individual," "individual plus," "business" and "business plus." As their registration level increases, the corresponding registered users will receive additional benefits, such as increased storage space, bandwidth or publishing features and options.

A variety of other techniques may be used to encourage user registration. For example, demographic data or other types of marketing data may be used to identify particular groups likely to benefit from registration, and particular mobile sites can be pre-created and made available to such groups on a trial basis, upon registration, or upon satisfaction of other conditions. The mobile site addresses for all of the members of each group will preferably reflect in some common way one or more unique characteristics of the group.

Figure 4:
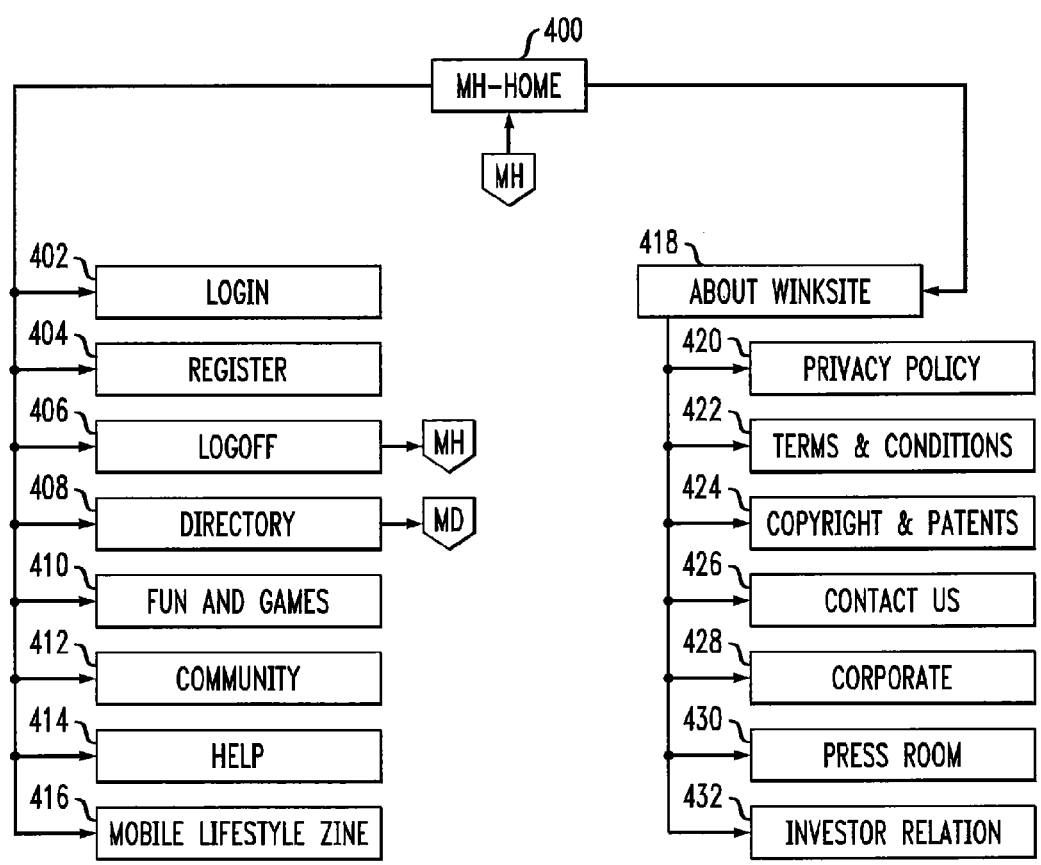
FIGS. 4 and 5 show schematic diagrams of site pages associated with a mobile site in the system of FIG. 1A.
Figure 5:
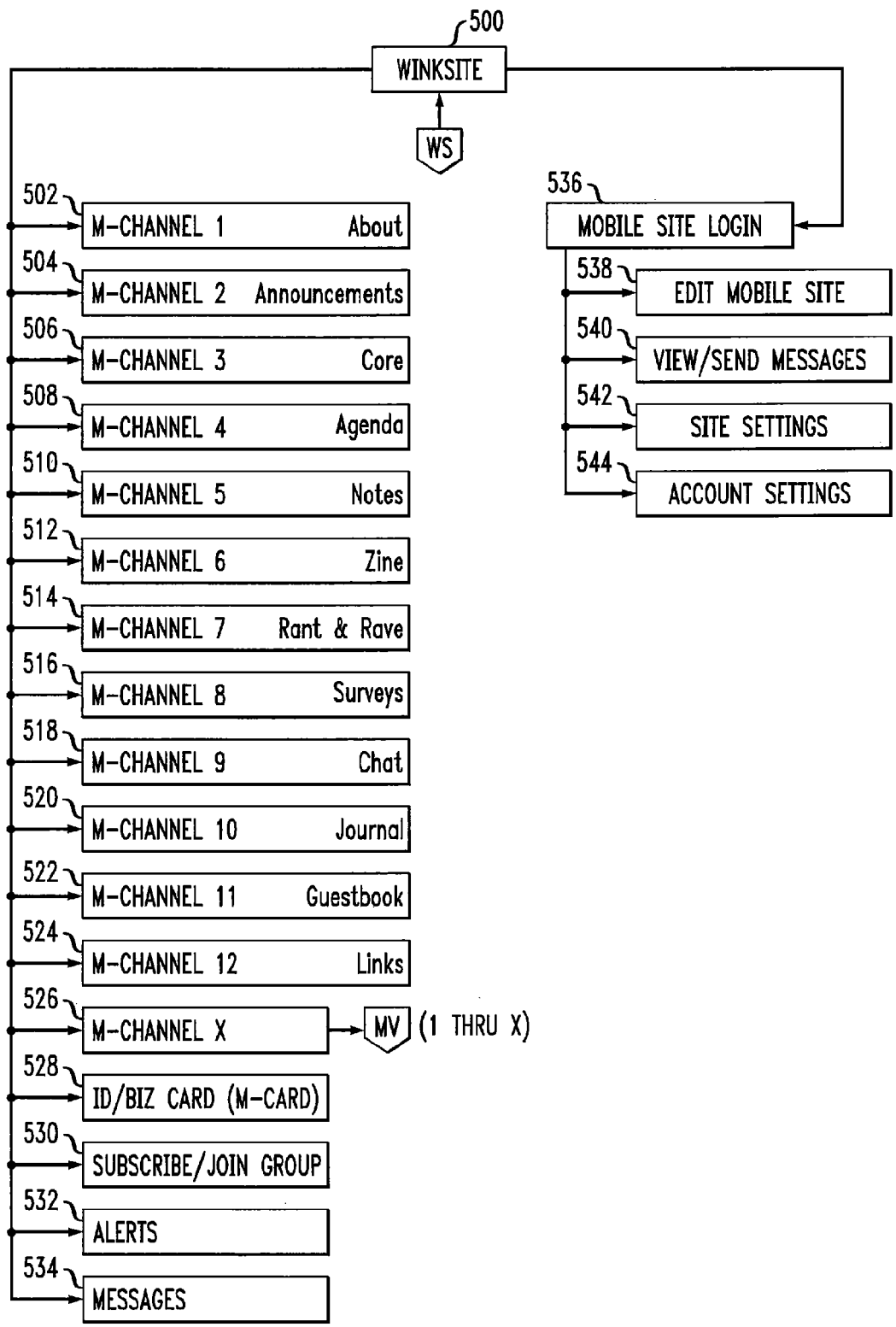

Referring now to FIGS. 4 and 5, these figures show a mobile site home (M-home) page 400 and a Winksite page 500, respectively, of an example mobile site in the illustrative embodiment of the invention. The pages 400 and 500 provide user interfaces comprising series of display regions denoted by blocks 402 through 432, and 502 through 544, respectively, with each of the blocks being associated with a corresponding user-activatable hypertext link or other control mechanism. The mobile site home page 400 may be accessed, for example, by entering a corresponding URL of the mobile site into a browser at one of the mobile devices 15. The Winksite page 500 may be accessed, for example, by activating the link associated with block 402 of FIG. 4 and completing an associated login process.

As noted above, FIGS. 6 through 17 are screenshots of illustrative site pages associated with a content management site in the system of FIG. 1A. These screenshots will now be described in greater detail.

Figure 6:
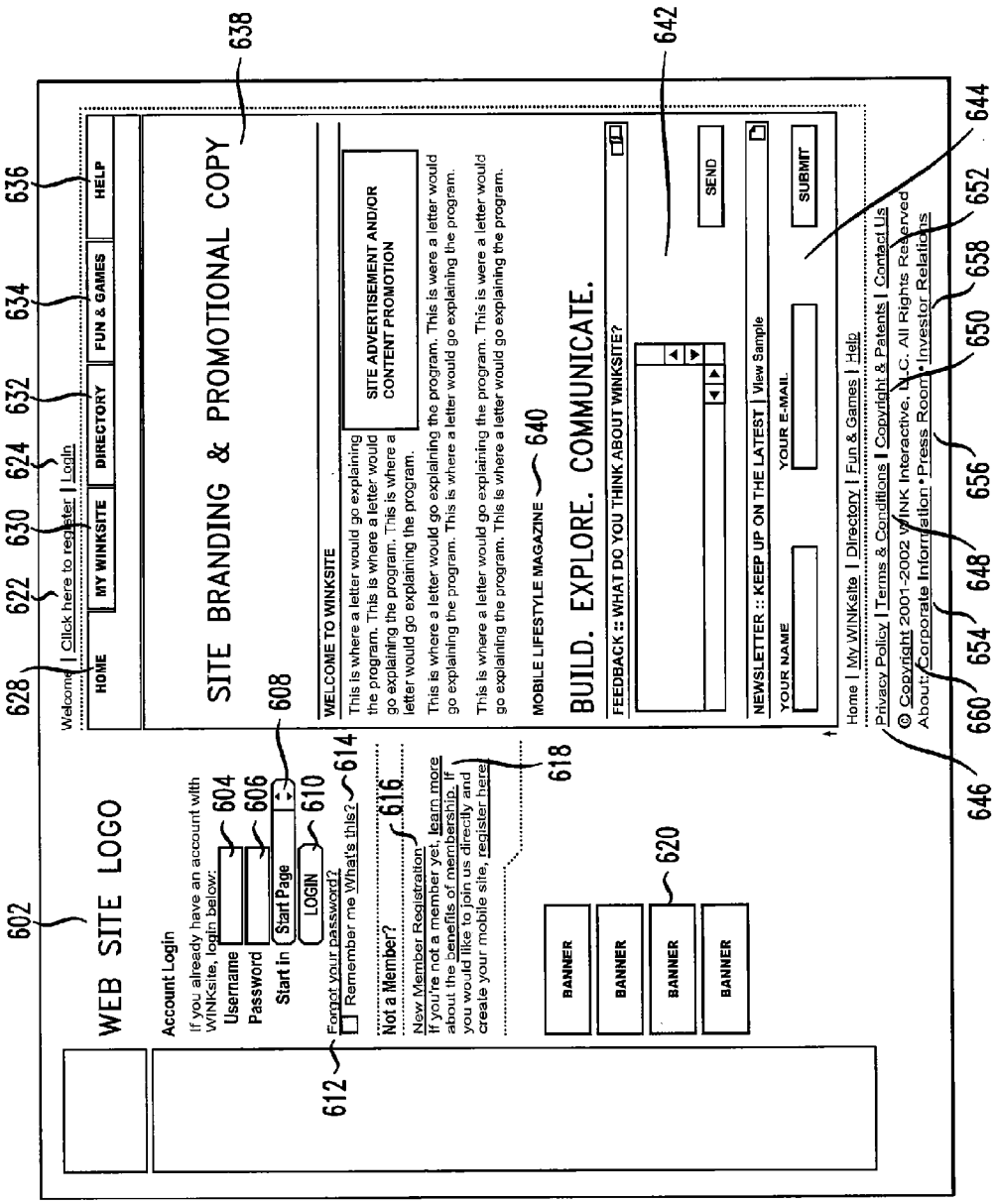

With reference to FIG. 6, an example of a home page of the content management site is shown. This home page screenshot may be viewed as corresponding generally to the home page 100 schematically shown in FIG. 1D. The home page in this example includes, among other elements, elements 602 through 658 arranged as shown. A web site logo 602 can be included, along with site branding and promotional copy 638, associated with an entity providing the content management site. A login section includes fields 604 and 606 for entering respective user name and password information, along with a "Start in" selector 608 and a login button 610. The home page further includes links 612, 614, 618, 622, 624, 630, 632, 634, 636, 646, 648, 650, 652, 654, 656, 658 and 660, banner advertisements 620, explanatory text 640, a feedback entry field 642, and a user information submission field 644.

Figure 7:
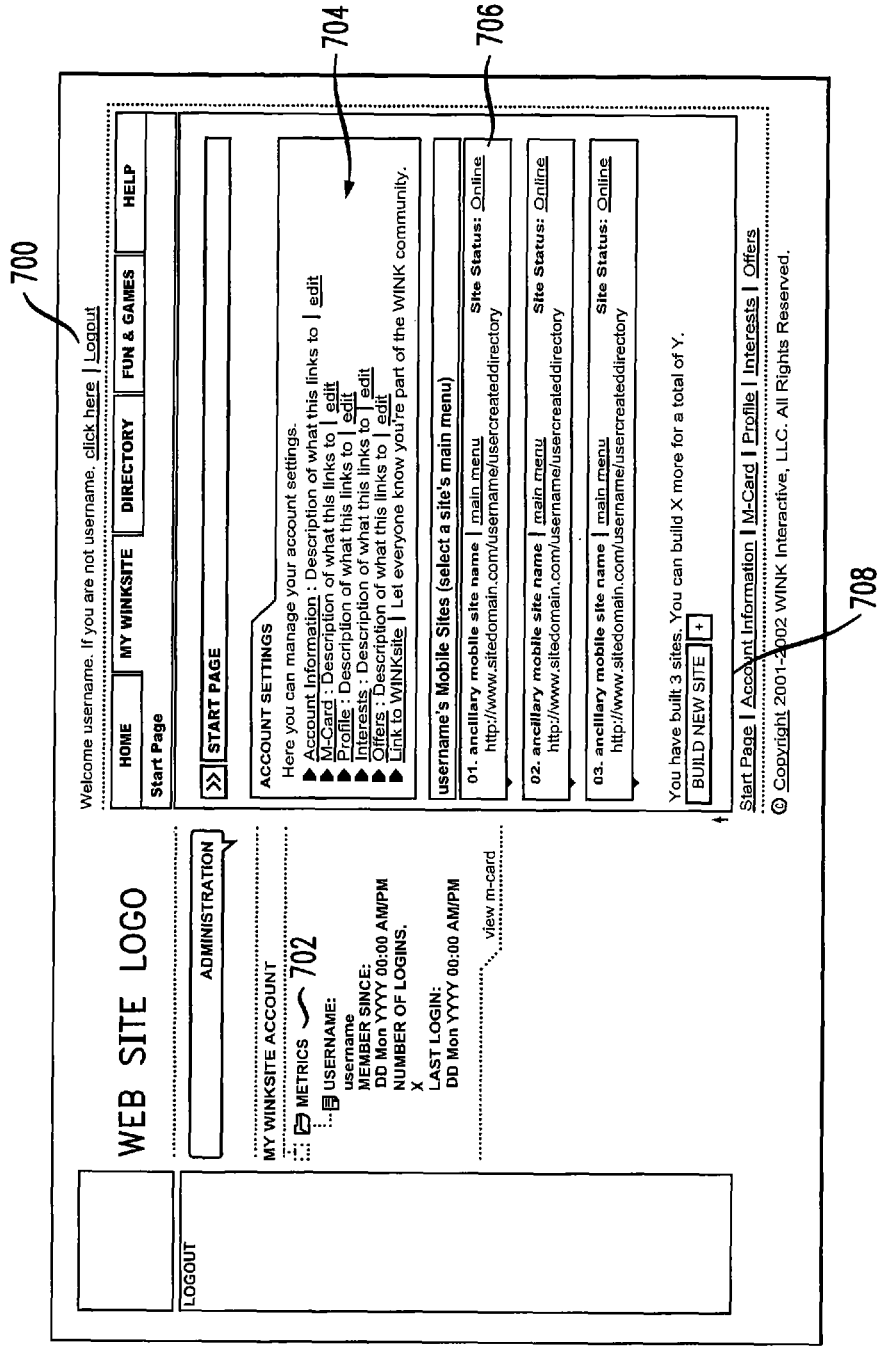

FIG. 7 shows an example of a start page of the content management site. This start page screenshot may be viewed as corresponding generally to the start page 200 schematically shown in FIG. 2. The start page in this example includes, among other elements, a logout link 700, user account information 702, account settings links 704, information 706 specifying the mobile sites associated with that user, and a link 708 allowing the user to build a new mobile site.

Figure 14:
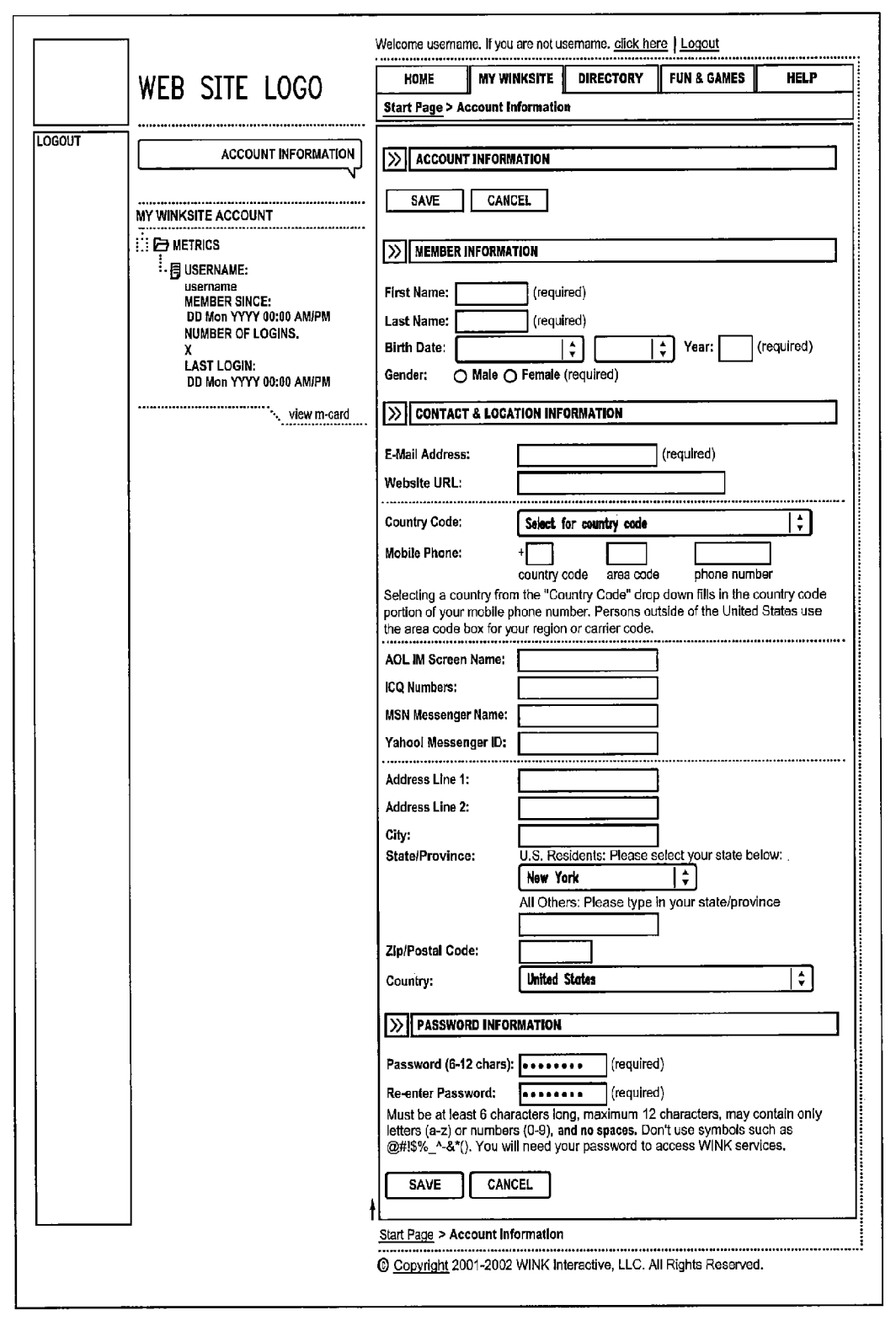

A given registered user, after initial registration, may access his or her registration information directly, on an as-needed basis, in order to make changes therein as appropriate. For example, a registered user may wish to change his or her password or username, or to provide updated address or contact information. The account information link in the set of account setting links 704 instantiates a subordinate user interface comprising a site page that may be configured as shown in FIG. 14. Other links in the set of account setting links 704 similarly provide access to pages allowing entry or revision of information associated with a user M-card, profile, interests, offers, etc.

FIG. 8 shows an example of a main menu page of the content management site for managing a given mobile site associated with a system user. This main menu page screenshot may be viewed as corresponding generally to the main menu page 300 schematically shown in FIG. 3. The main menu page in this example includes information 802 identifying user account information and the particular mobile sites associated with that user, page navigational links 804, mobile site information 806 associated with a selected one of the mobile sites associated with the user, M-channel information 808, and a delete site field 810.

Figure 9A:
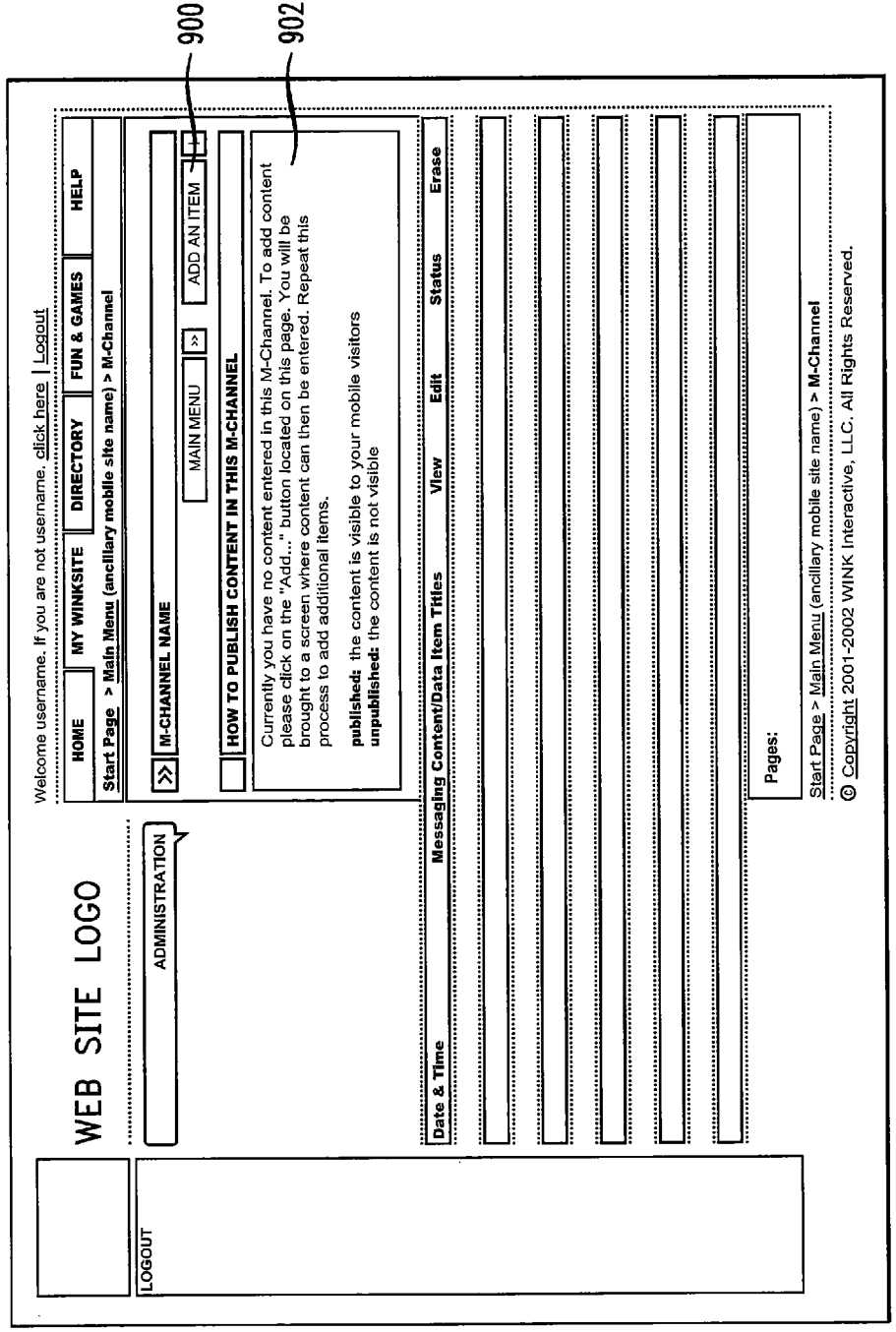
Figure 9B:
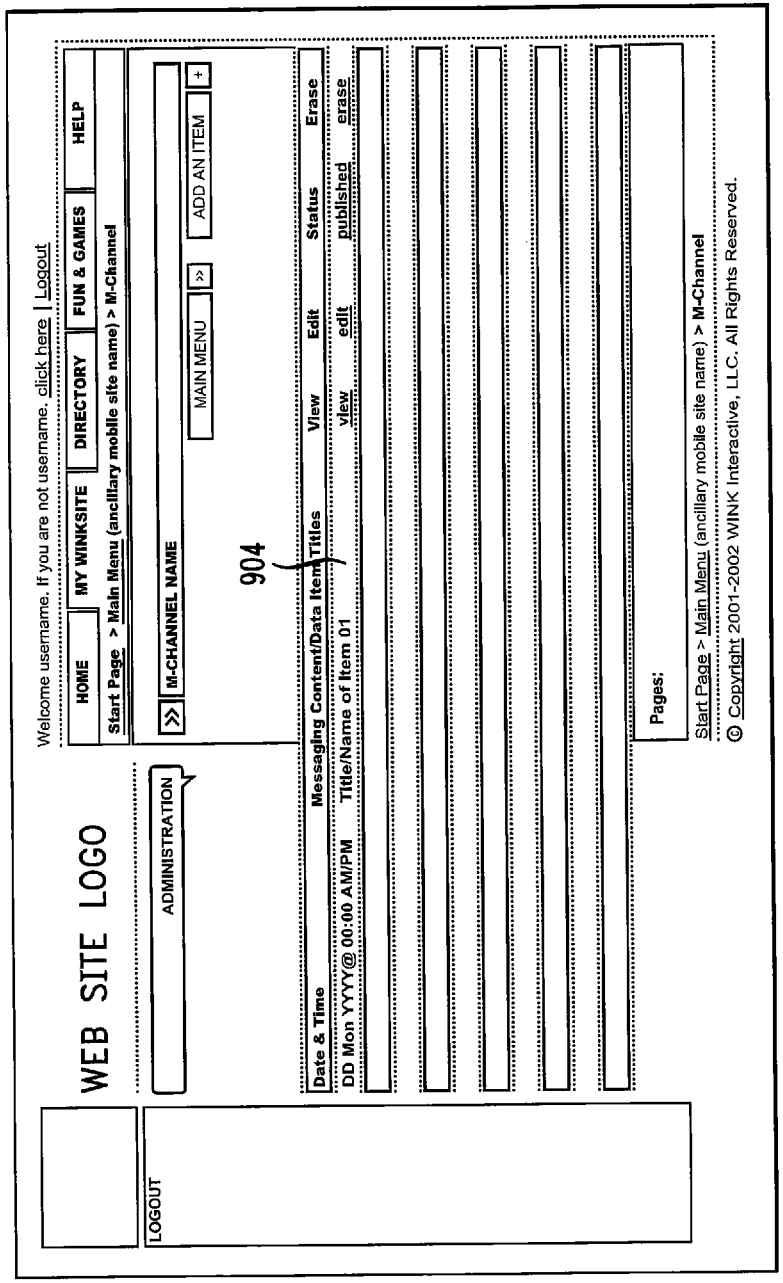

FIGS. 9A and 9B show example M-channel pages of the content management site. These pages correspond generally to particular ones of the M-channels identified in M-channel information 808 of a selected mobile site in FIG. 8.

With reference initially to FIG. 9A, the page as shown corresponds to an M-channel for which the user has not yet entered any content. The page includes a button 900 which permits a user to add an item of content to the M-channel, and explanatory text 902 which indicates that the user currently has no content in the channel, and describes the manner in which the user can add content items to the channel.

FIG. 9B shows a page for which the user has added an item of content. The page includes information 904 specifying, among other things, the title or name of the content item, the date and time of its posting to the site, and its status. If the item has a "published" status, the corresponding content is visible to users visiting the associated mobile site. If the item has an "unpublished" status, the corresponding content is not visible to users visiting the associated mobile site.

Figure 10:
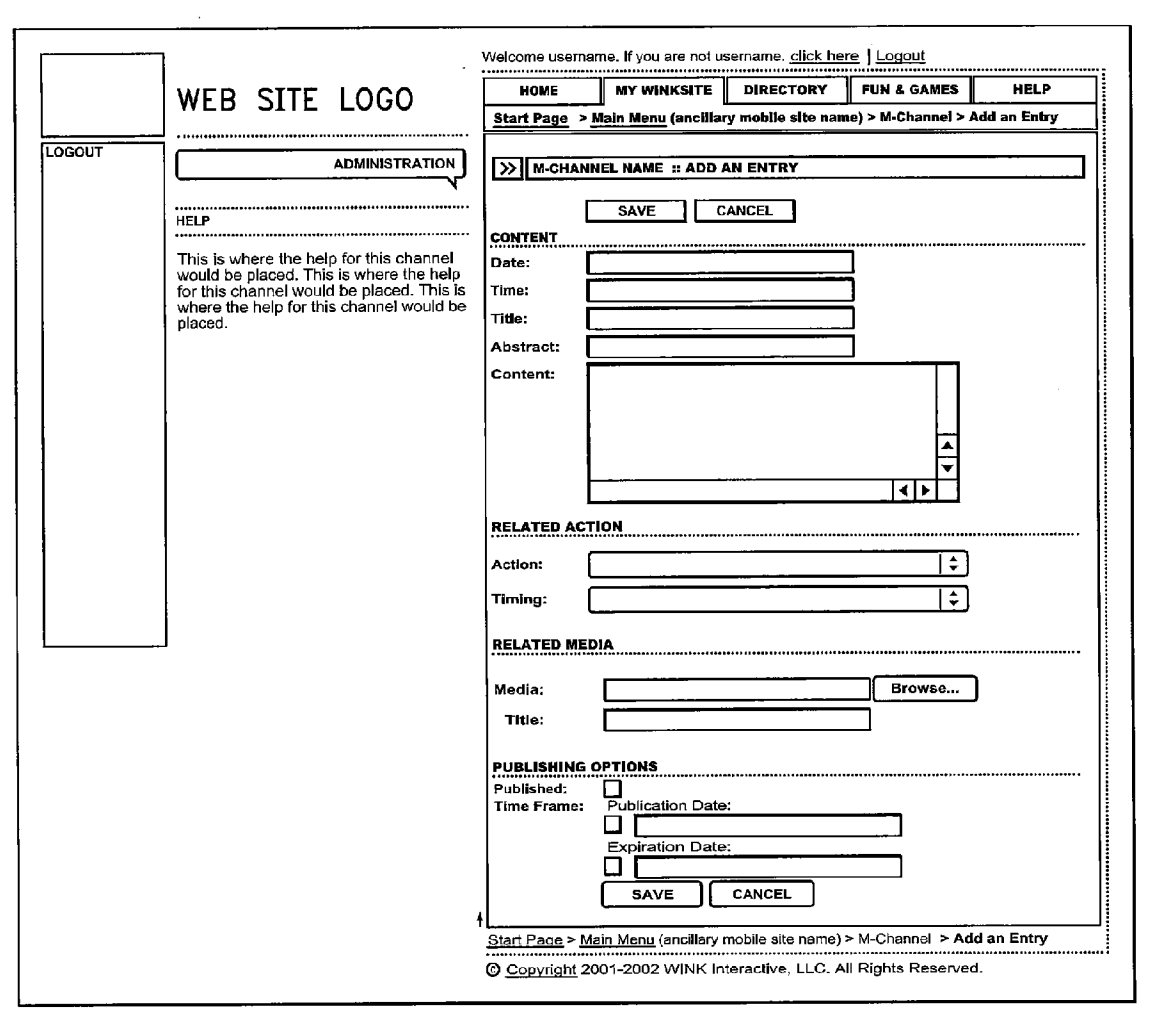

FIG. 10 shows an example page for use in adding content to a given one of the M-channels. This page may be accessed, for example, upon activation of the add button 900 in the M-channel page of FIG. 9A.

The content management site of the system 10 in the illustrative embodiment thus allows a user to manage content for access via the mobile devices 15 by interaction with one or more specified M-channels. As indicated above, a user selects a particular M-channel by activating the corresponding link 808 in FIG. 8. This action instantiates a subordinate user interface to the selected M-Channel, represented by the page shown in FIG. 9A. The user then activates the add button 900 of FIG. 9A, which instantiates a subordinate user interface to an authoring wizard associated with that M-channel, represented by the page shown in FIG. 10.

FIG. 11 shows an example page for use in managing a contact list associated with one or more of the M-channels. This page may be accessed, for example, from the main menu page 300.

Figure 12:
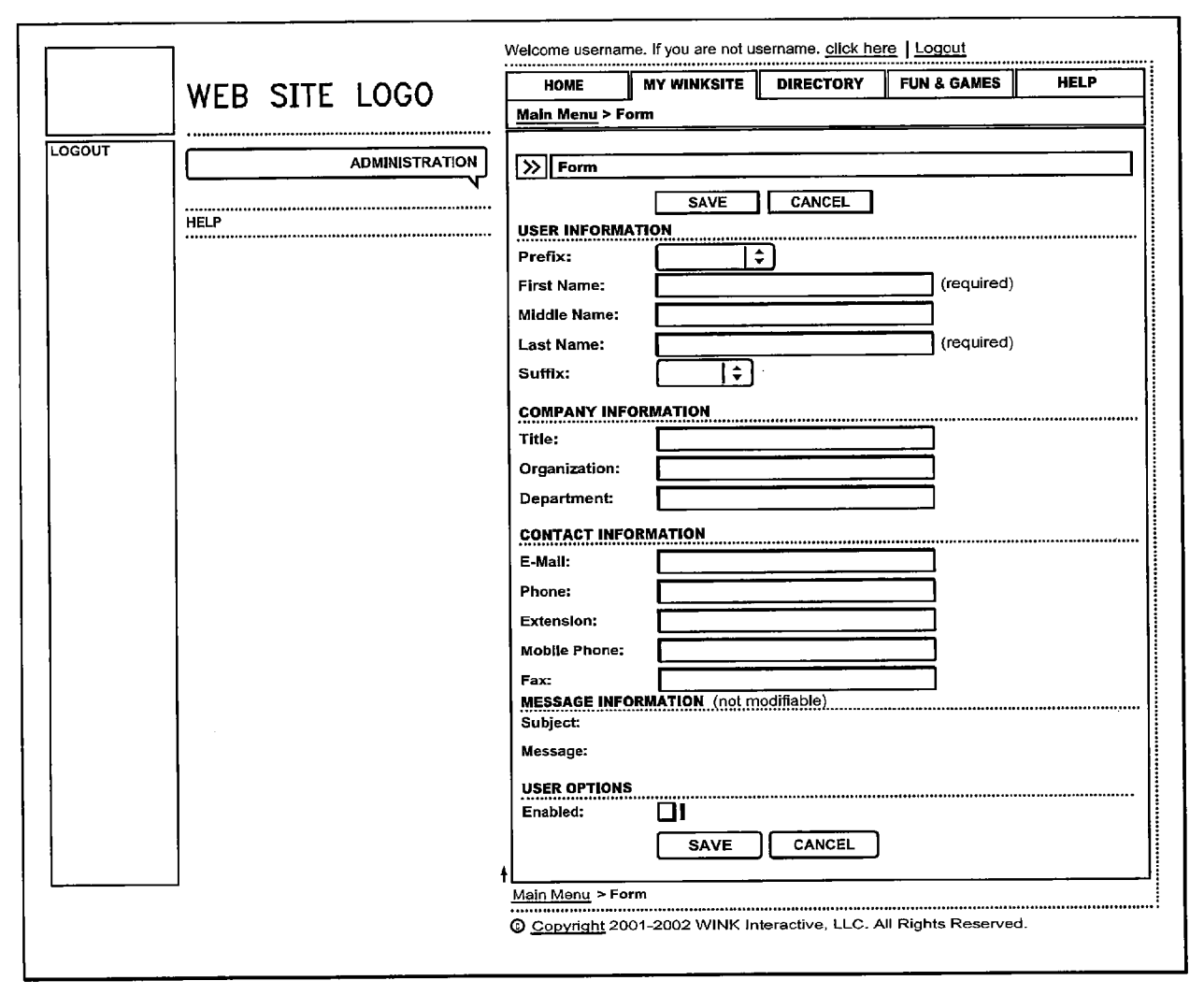

FIG. 12 shows an example page for use in adding a new contact to the contact list of FIG. 11. This page may be accessed, for example, by activating an "add an item" button in the page of FIG. 11.

Figure 13:
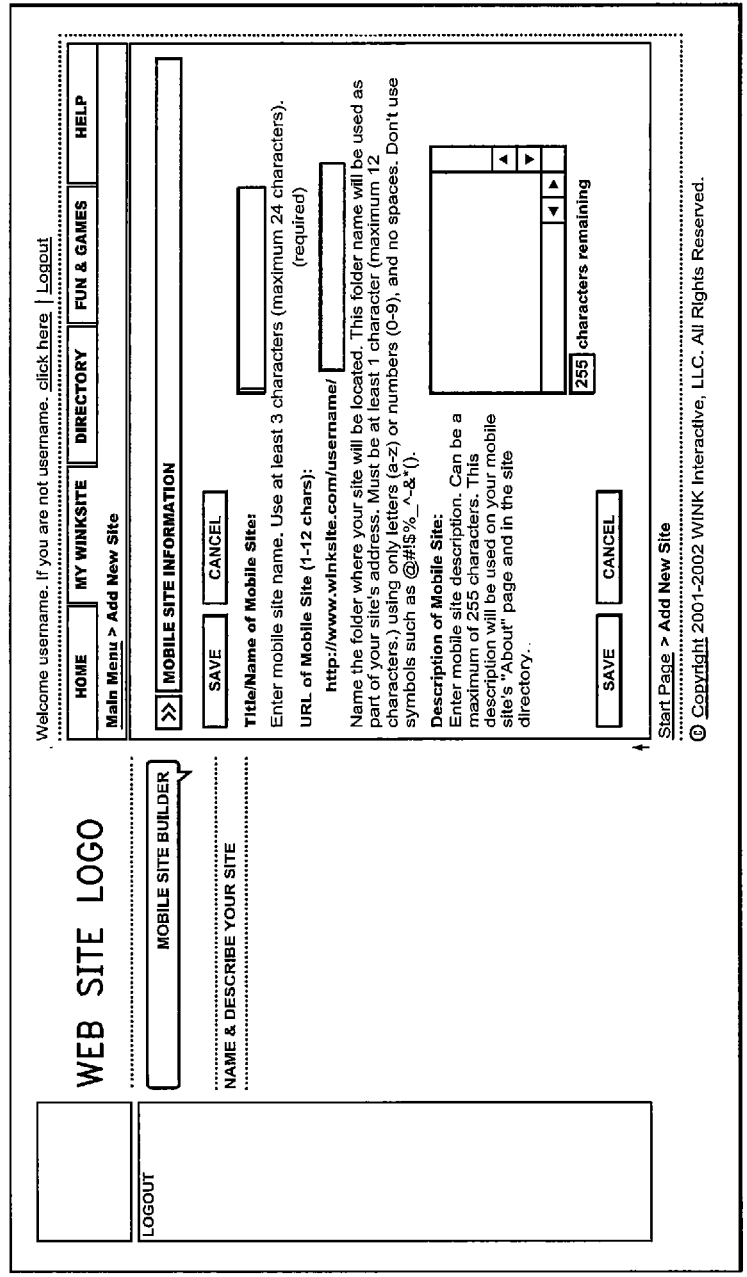

FIG. 13 shows an example page for use in creating a new mobile site. This page may be accessed, for example, by activating the "build new site" link 708 in the start page of FIG. 7. The mobile site creation page includes fields allowing a user to name the mobile site, to specify a URL for the mobile site, and to enter a description of the mobile site.

FIG. 14 shows an example page for use in establishing or updating a user account with the system. This page may be accessed, for example, as part of a registration process initiated by activating the link associated with block 104 in FIG. 1D, or by activating the link associated with block 228 of the start page in FIG. 2.

Figure 15:
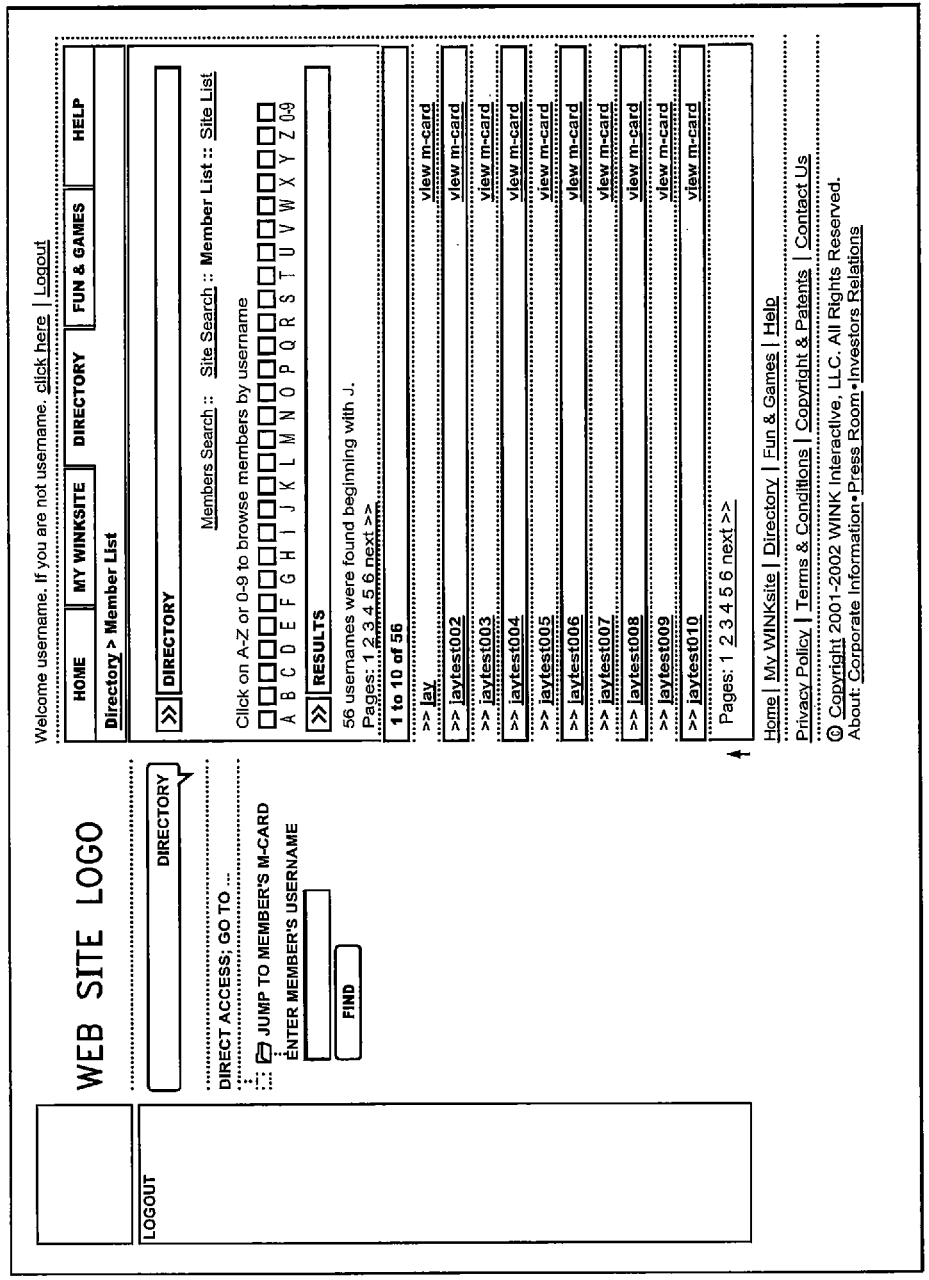

FIG. 15 shows an example page of member list results generated by performing a search in the member directory of the content management site. The directory may be accessed, for example, by activating the link associated with block 110 in FIG. 1D or the link associated with block 208 in FIG. 2.

Figure 16:
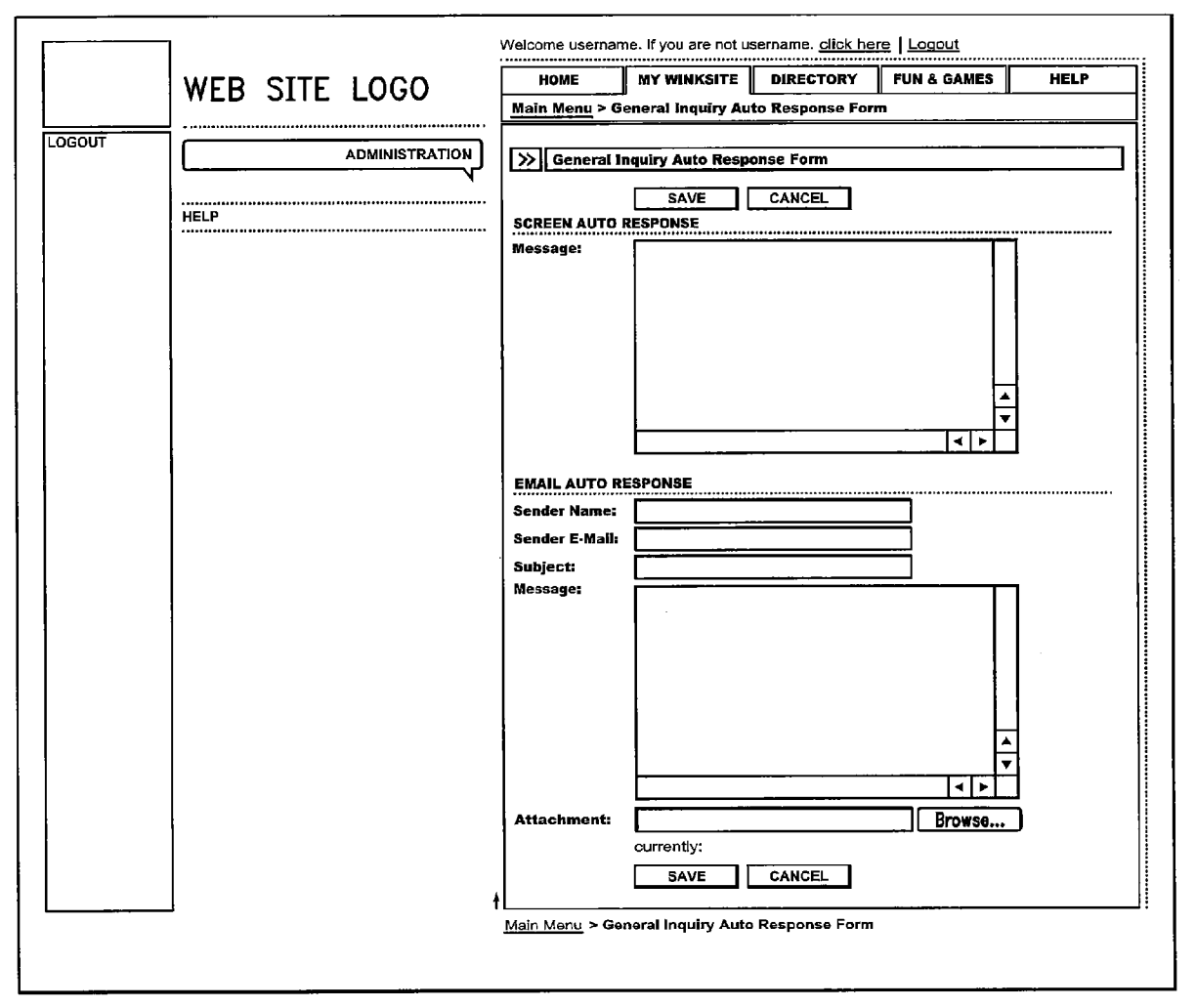

FIG. 16 shows an example page for automated response management. This page may be accessed, for example, from the main menu page 300.

Figure 17A:
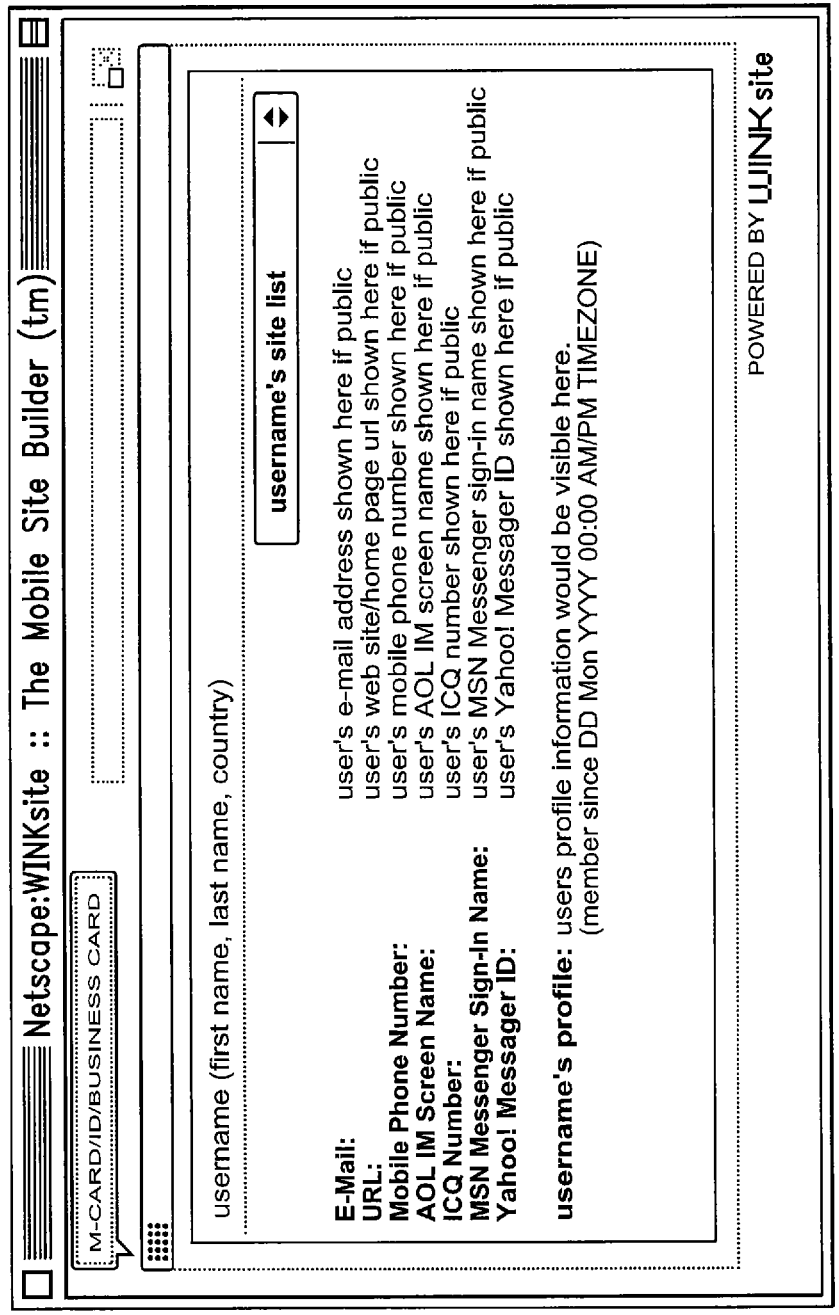
Figure 17B:
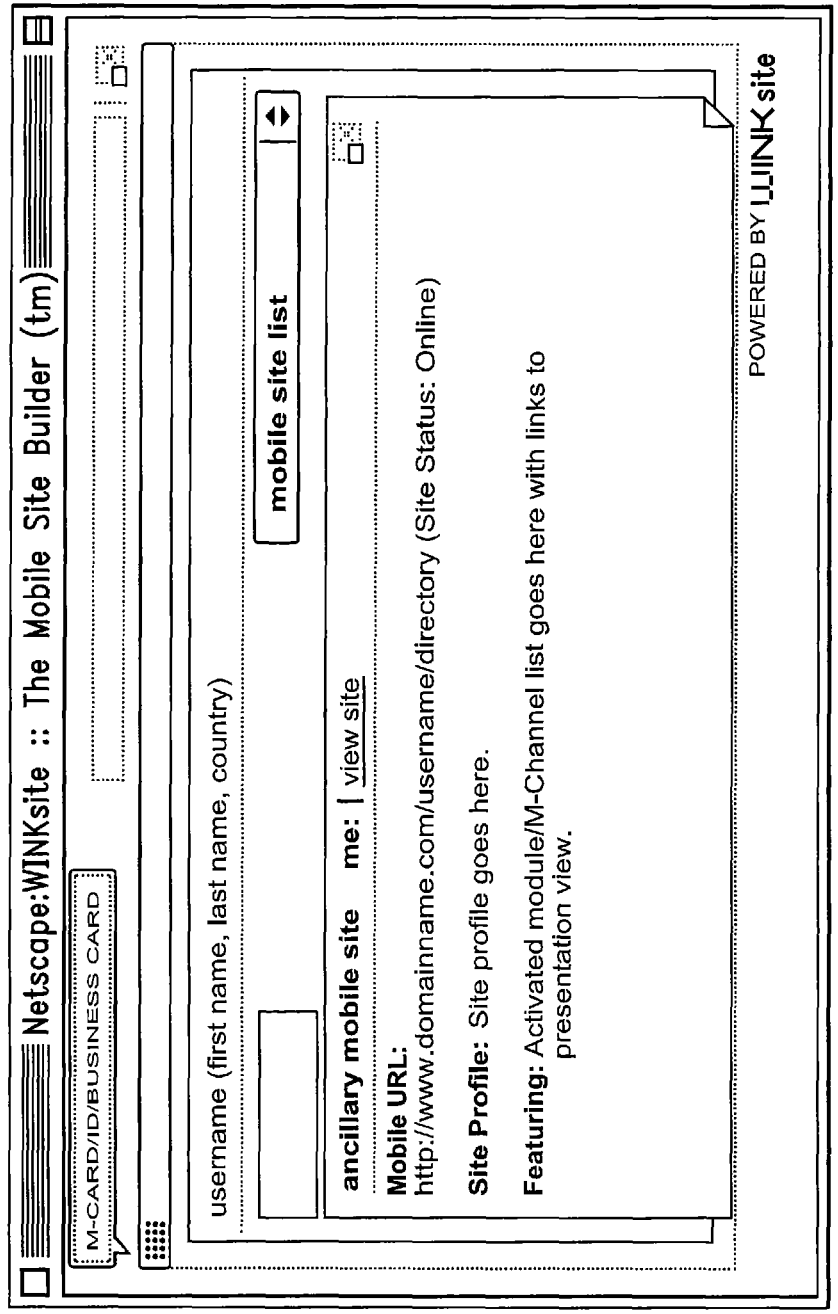

FIGS. 17A and 17B show example pages corresponding to a user identification card or business card, also referred to herein as an M-card, or part of a contact M-channel. Such pages may be accessed, for example, by activating links associated with blocks 218 in FIG. 2 or 528 in FIG. 5.

Figure 24A:
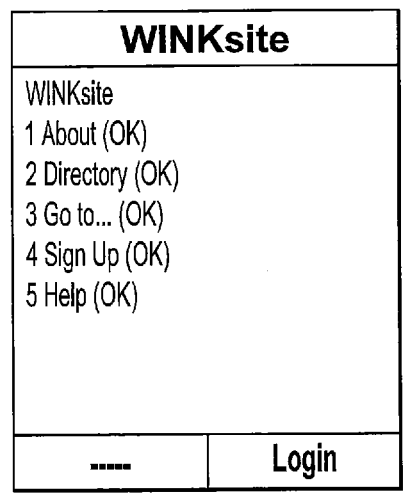
Figure 25G:
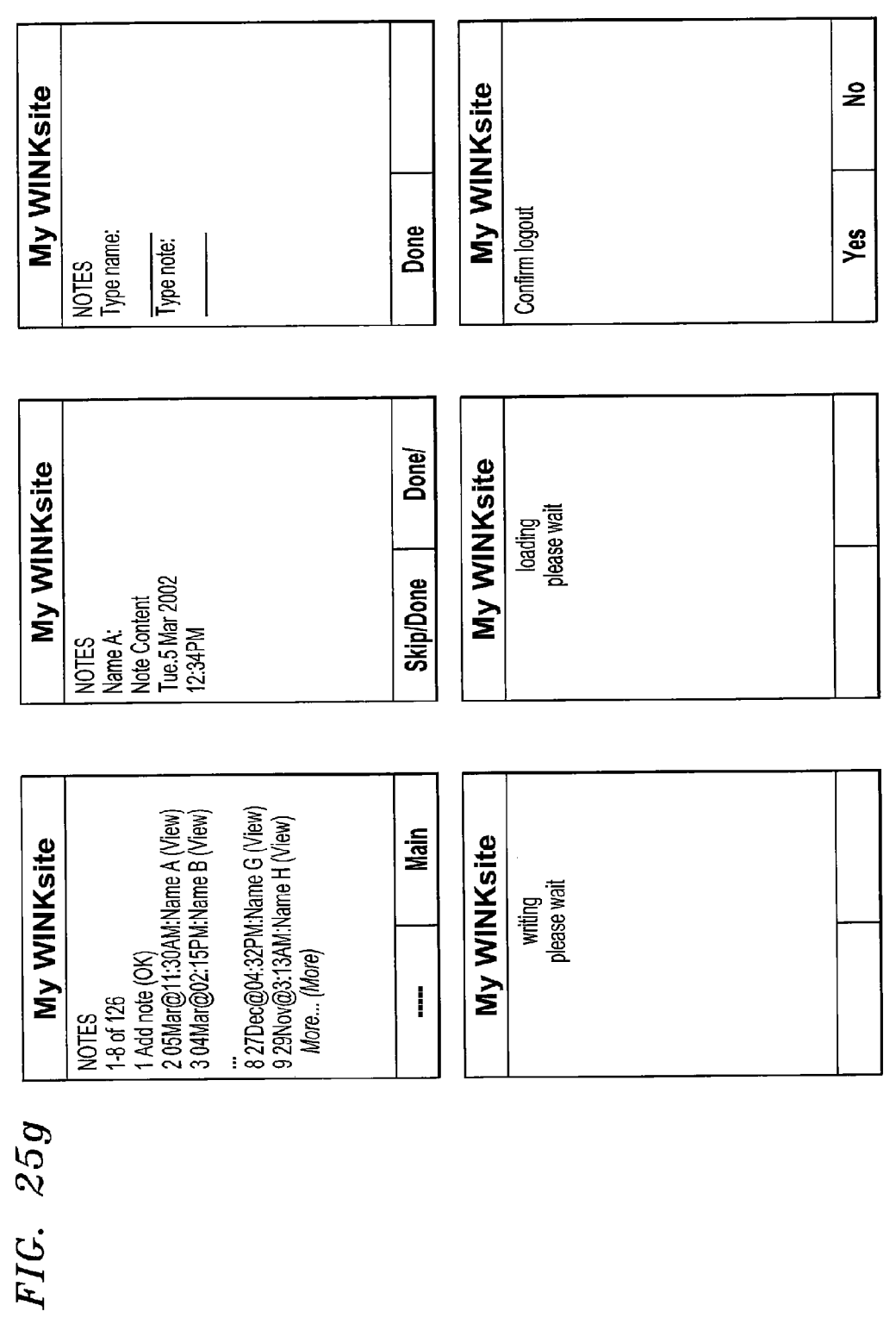

Exemplary mobile site pages will now be described in greater detail with reference to FIGS. 18, 24 and 25.

Figure 18:
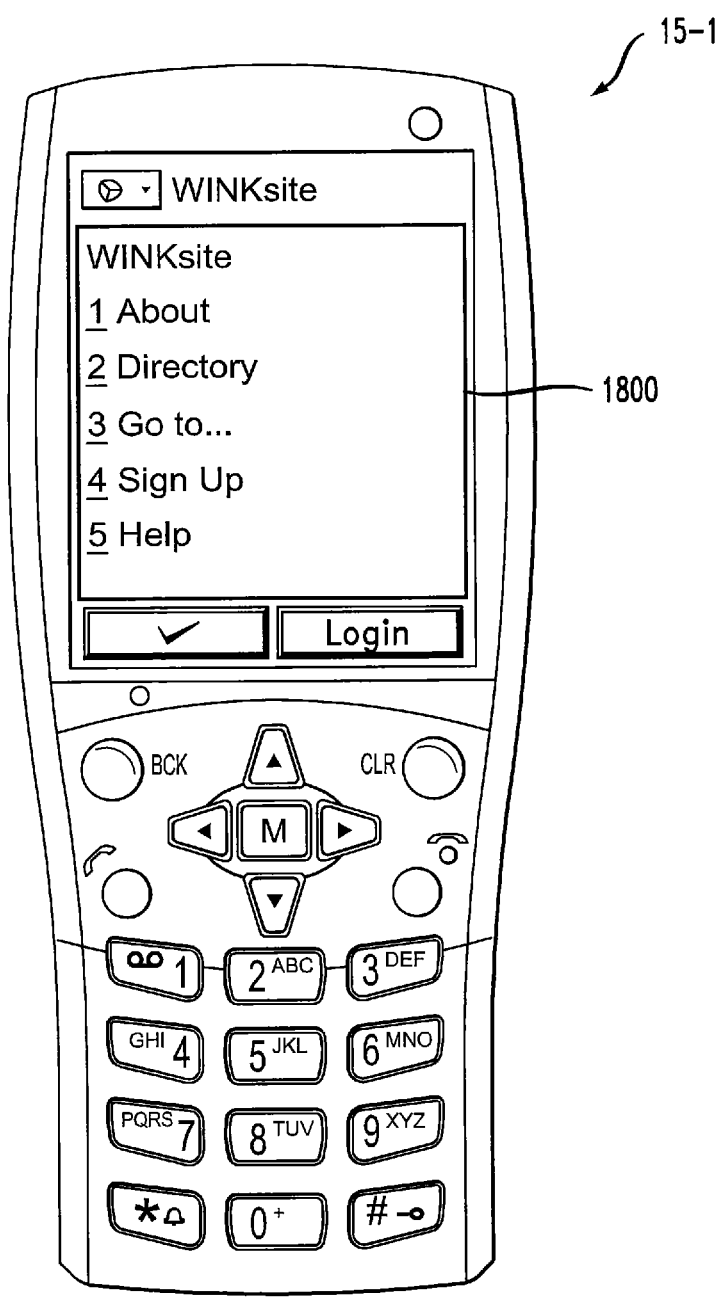
FIG. 18 shows an example mobile device suitable for use in the system of FIG. 1A.

FIG. 18 shows an example mobile device 15-1 suitable for use in the system of FIG. 1A. The mobile device 15-1 in this example is in the form of a web-enabled mobile telephone, but as indicated previously herein, the invention does not require the use of any particular type or configuration of mobile device. The mobile device 15-1 as shown in FIG. 18 includes a display screen 1800 on which an example screenshot associated with a mobile site main menu page is shown. This screenshot may correspond, for example, to a portion of the page 400 previously described in conjunction with FIG. 4. Additional example screenshots that may be viewed as being generally associated with the mobile site main menu page 400 or the mobile site page 500 are shown in FIGS. 24A-24G and FIGS. 25A-25O.

The operation of certain aspects of the system 10 of FIG. 1A will now be described with reference to the flow diagrams of FIGS. 19 through 23.

Figure 19:
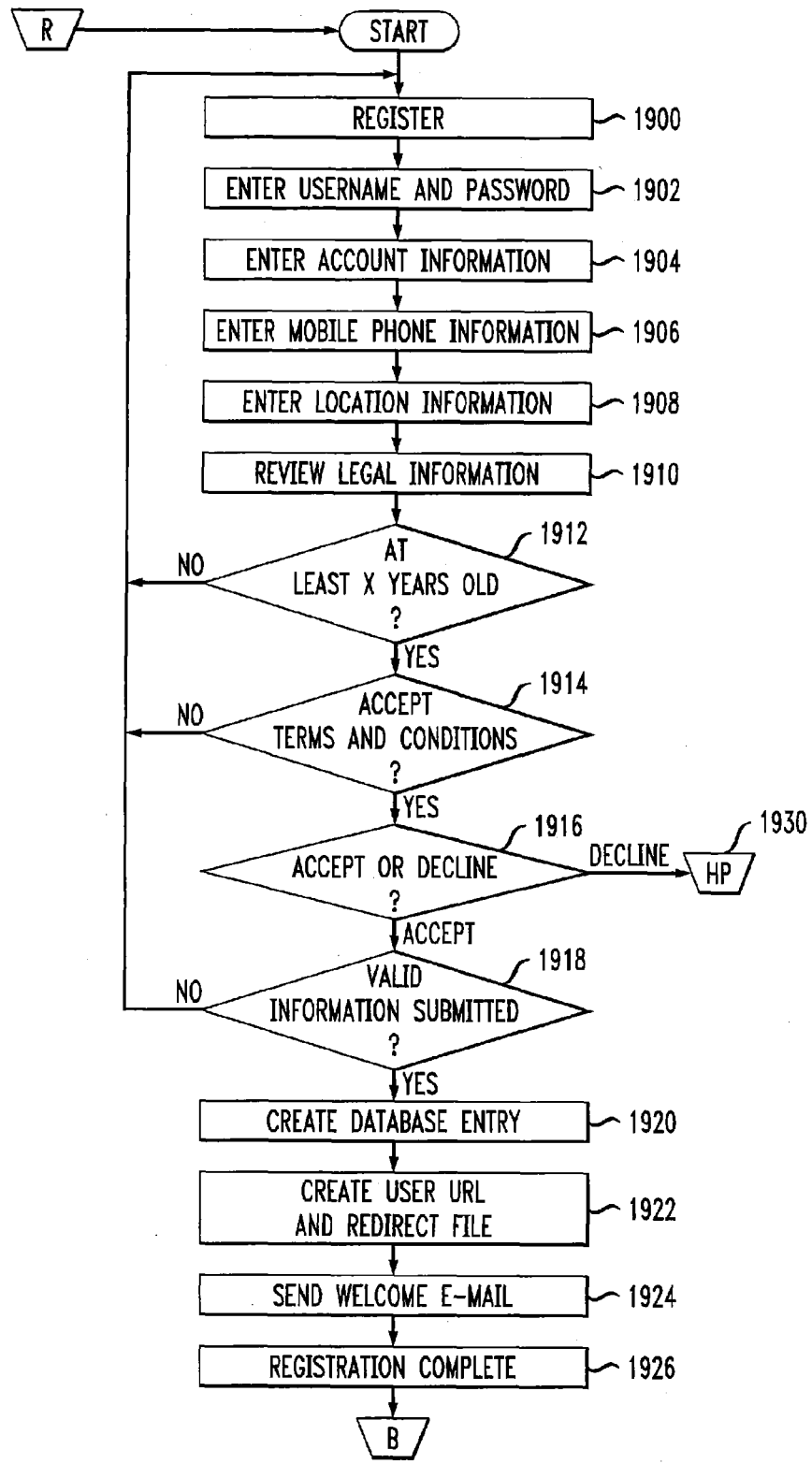
FIG. 19 is an exemplary operational flow diagram of a registration process in accordance with the invention.

FIG. 19 shows an example registration process (R) accessible via the content management site. A user enters the registration process at step 1900, and is prompted to create a user name and password in step 1902, to provide account information that includes a variety of personal information such as first name, last name, date of birth and gender in step 1904, to provide mobile phone information in step 1906, and to provide a variety of location information such as zip code, state, country and time zone in step 1908. The entered information establishes a personal profile for the user, and is stored in a memory or other storage device associated with the content management site.

In step 1910, the user reviews legal information pertaining to the use of the content management site and its terms of service. Step 1912 determines whether the user is of the requisite age to use the site, step 1914 determines if the user accepts specified terms and conditions, step 1916 determines if the submitted information will be accepted or declined, and step 1918 determines if valid information has been submitted. A negative determination in any of steps 1912, 1914 and 1918 results in the process returning to step 1900 to allow the user to make at least one more registration attempt. A negative determination in step 1916 terminates the registration process and returns the user to the home page (HP) from which the registration process was initiated, as indicated at 1930.

After positive determinations in steps 1912, 1914, 1916 and 1918, a database entry is created for the user in step 1920, a user URL and redirect file are created in step 1922, a welcoming email is sent to the user in step 1924, and the registration is completed in step 1926. At this point, a user may be permitted to build a mobile site, as indicated by the transition to the site building indicator (B).

Figure 20:
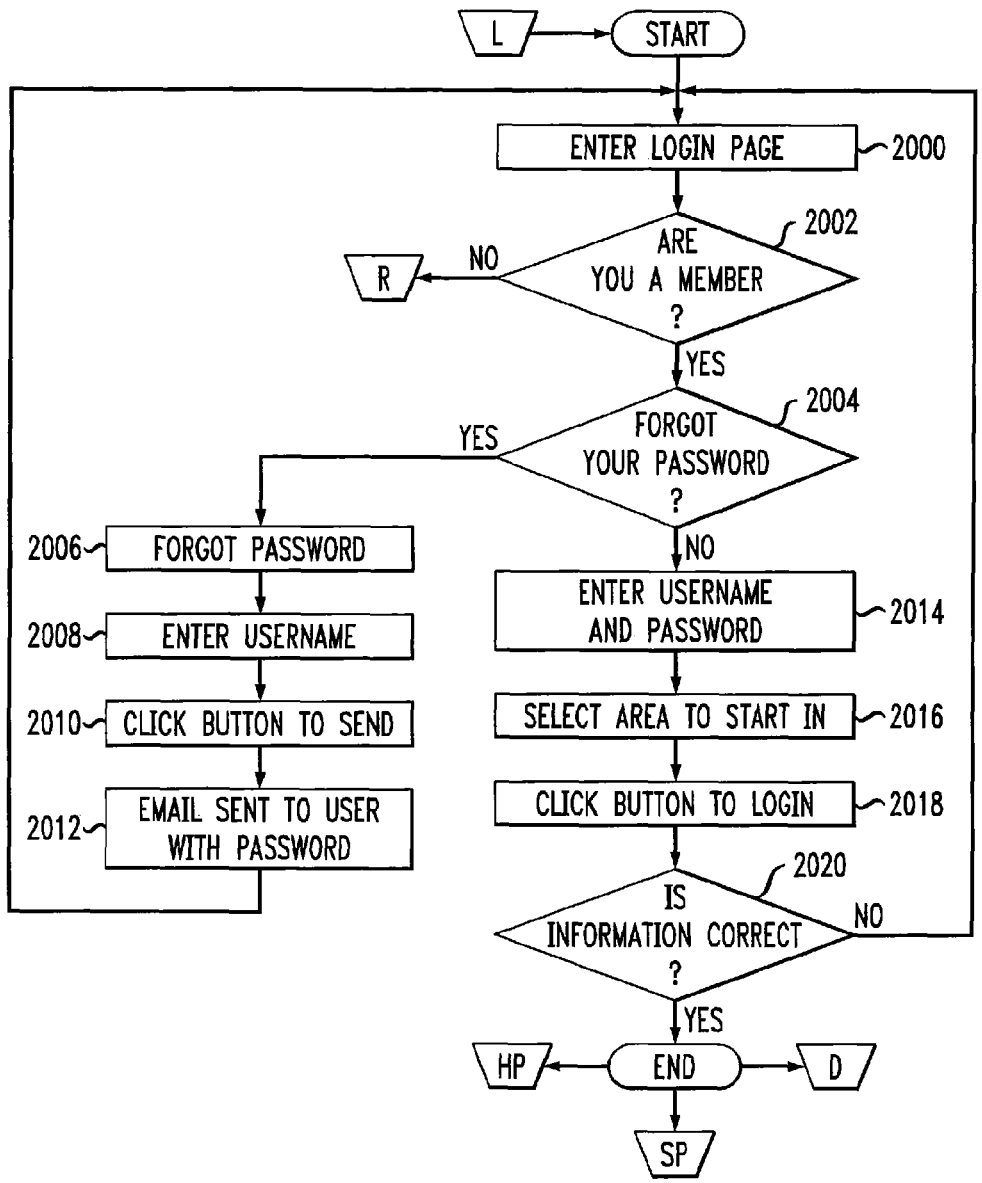
FIG. 20 is an exemplary operational flow diagram of a login process in accordance with the invention.

Referring now to FIG. 20, an example login process (L) accessible via the content management site is shown. A user enters a login page at step 2000, and is requested at step 2002 to confirm that he or she is a "member," i.e., that he or she is already registered with the system. If the user is not registered, a link to the registration process (R) described previously and depicted in FIG. 19 is activated. Otherwise, step 2004 determines if the user has forgotten his or her password. If this is the case, steps 2006 through 2012 are executed to prompt the user to enter a user name, and/or other identifying information, and to click a send button, such that an email containing the forgotten password is then sent to the user, after which the process returns to step 2000. A negative determination in step 2004 results in execution of steps 2014 through 2018, prompting the user to enter a user name and password, to select an area of the content management site to start in, and to click a button to submit the login information. Step 2020 determines if the submitted login information is correct. If it is, the process ends, and the user can be directed, for example, to the home page (HP), the directory (D), the start page (SP), or to any other desired page of the site. The resulting presented page is preferably customized to include information specific to the user, such as the information shown generally at 702 in FIG. 7.

If the login information entered by the user is incorrect, the process may return to step 2000 so that correct or more current login information may be submitted. While in some embodiments of the invention these verification steps could be repeated indefinitely, it is preferable to place a limit on the number of times that the system will continue to attempt such verification without success, after which the login process will end and no further submissions of login information will be accepted from that user until some specified remedial action takes place. Similar restrictions may be placed on repetition of the registration process previously described in conjunction with FIG. 19.

Figure 21:
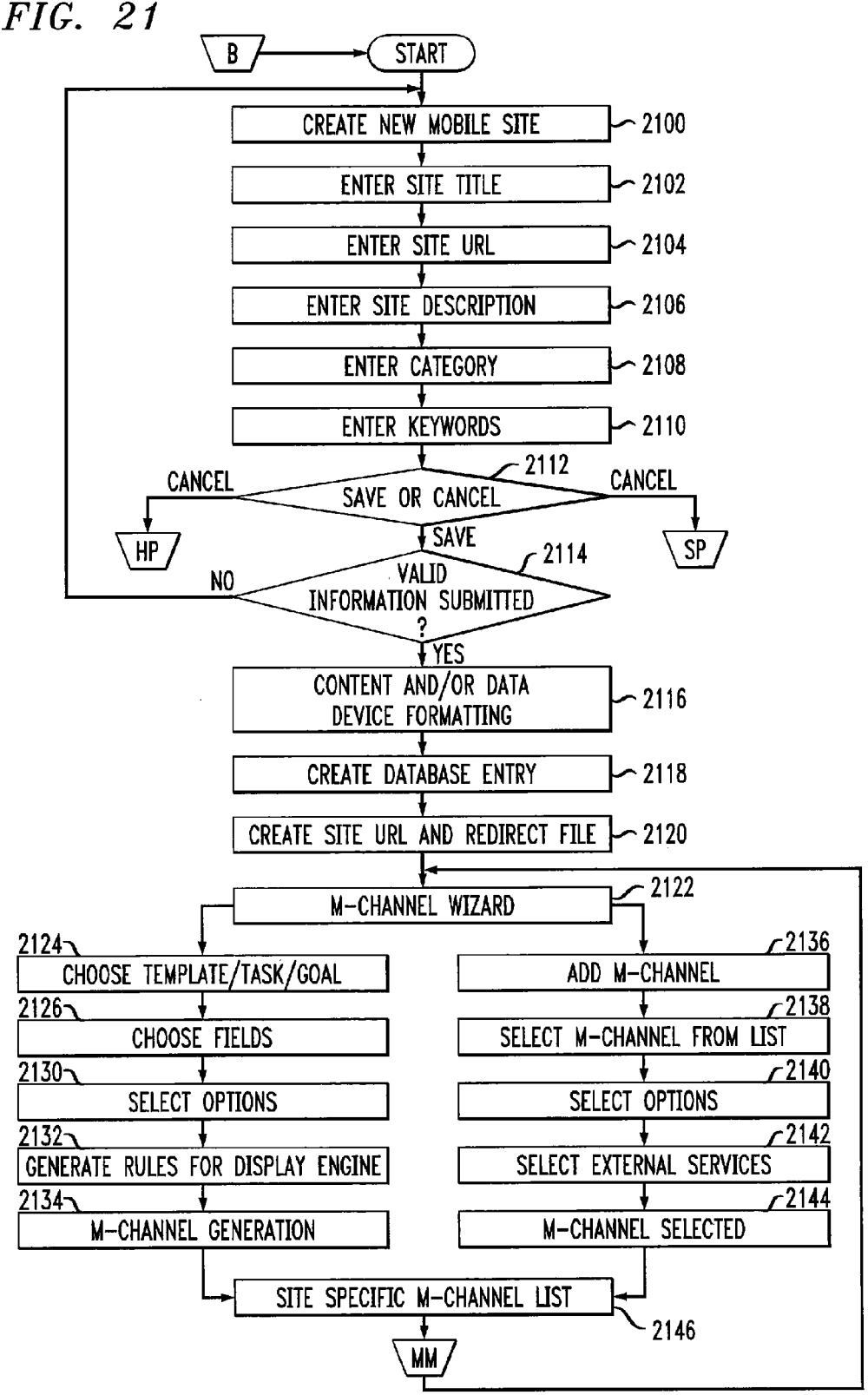
FIG. 21 is an exemplary operational flow diagram of a mobile site creation process in accordance with the invention.

FIG. 21 shows an example process for creating a mobile site using the content management site. This process may be accessed, for example, upon completion of the registration process, or upon activation of the link associated with block 226 of FIG. 2. After initiation of the mobile site creation process in step 2100, the user is prompted in step 2102 to enter a site title, in step 2104 to enter a site URL, in 2106 to enter a site description, in step 2108 to enter a category, and in step 2110 to enter keywords. Steps 2102 to 2110 should be viewed as examples of the type of information a registered user could be asked to enter in order to create the mobile site, but a given mobile site in accordance with the invention can of course be created using other types of information.

Step 2112 determines if the submitted information is to be saved or canceled. The latter results in the process being directed to the home page (HP), the start page (SP), or other specified page of the content management site. If the submitted information is to be saved, step 2114 determines if the submitted information is valid. If the submitted information is not valid, the process returns to step 2100 to allow the user at least one additional attempt to create the mobile site. A positive determination in step 2114 results in the execution of content and/or data device formatting step 2116, database entry creation step 2118, and site URL and redirect file creation step 2120. The URL is used to access the mobile site that is created as a result of the FIG. 21 process.

Step 2122 represents the start of an M-channel selection wizard. From the M-channel selection wizard step, the user can choose a template, task and/or goal in step 2124, choose appropriate fields in step 2126, and select desired options in step 2130. At this point, the process generates the appropriate rules for the display engine in step 2132, and then activates or otherwise generates one or more M-channels for the mobile site in step 2134. The result is a site specific M-channel list as indicated in step 2146, an example of which was previously described in conjunction with the screenshot of FIG. 8. Supplementary to this portion of the process, the user is also provided with an opportunity in steps 2136, 2138, 2140, 2142 and 2144 of FIG. 21 to add additional M-channels, options, external services, and the like to the mobile site. Any such added elements are taken into account in generating the site specific M-channel list in step 2146. At the completion of step 2146, the process returns to the main menu (MM), from which the M-channel wizard step 2122 can again be initiated to further modify the previously-created mobile site.

Figure 22:
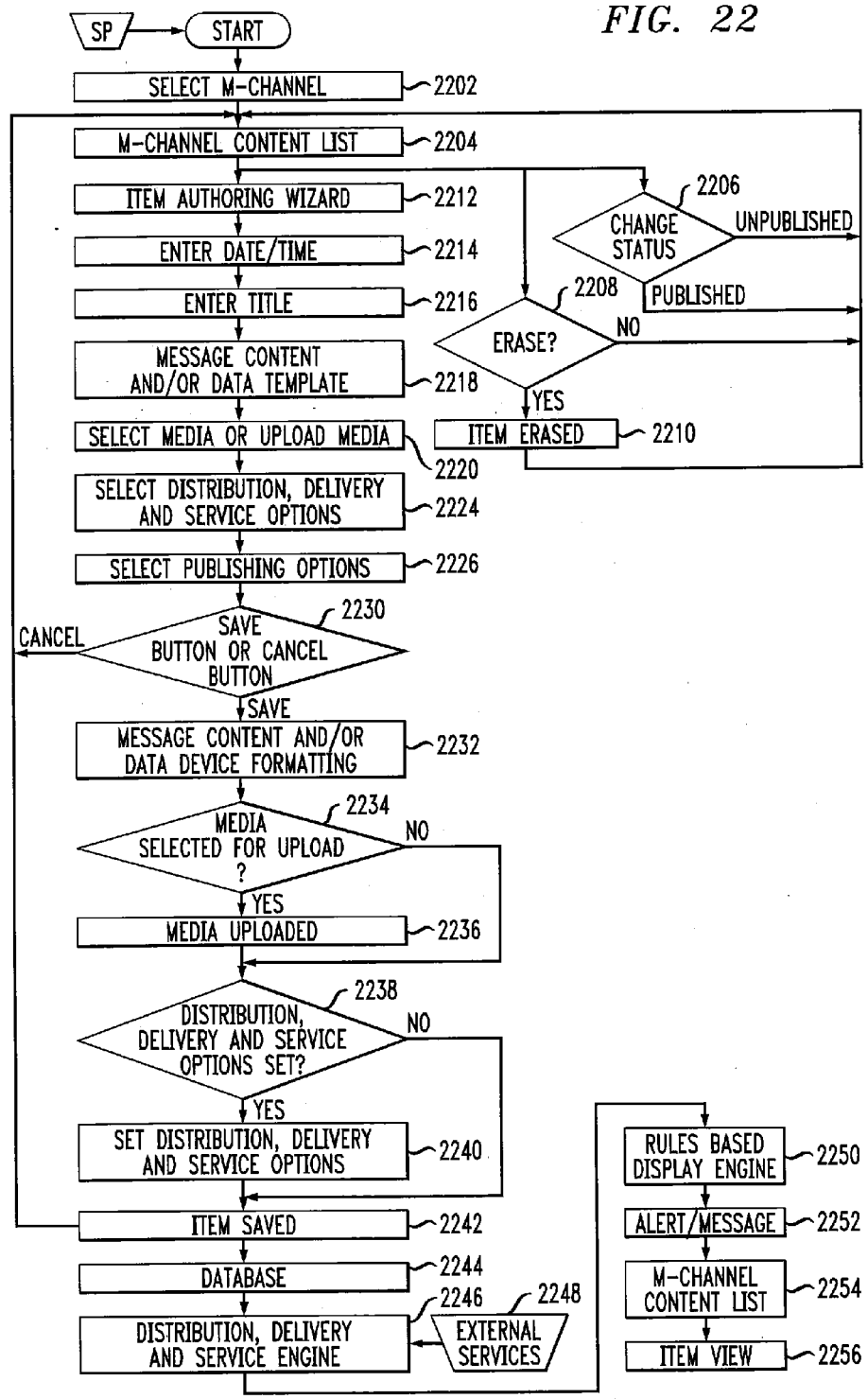
FIG. 22 is an exemplary operational flow diagram of a mobile site content authoring process in accordance with the invention.

Turning now to FIG. 22, an example process for content authoring at the content management site is shown. The user in step 2202 selects a particular M-channel for which the content is to be authored. Step 2204 generates an M-channel content list, and step 2206 allows the status of the various content items to be changed from published to unpublished and vice-versa. Steps 2208 and 2210 allow content items on the M-channel content list to be erased. From the M-channel content list generated in step 2204, an item authoring wizard may be initiated in step 2212. This wizard facilitates the authoring of a content item by prompting the user to enter date and time in step 2214, to enter a title in step 2216, to enter message content, data template or both in step 2218, to select or upload media in step 2220, to select distribution, delivery and service options in step 2224, and to select publishing options in step 2226.

Selectable or uploadable media may include, for example, an XML/RSS feed, a database entry, a syndication item, a document, a video, a photo, a graphic, a music file, etc. Distribution, delivery and service options may include, for example, a distribution list based on group(s) or individual(s), SMS delivery, MMS delivery, email delivery, WAP availability, syndication availability, particular content to be combined or otherwise integrated with the content item upon delivery, etc. The publishing options may specify launch date, expiration date, private, public, group-specific, etc.

Step 2230 determines if a save button or a cancel button has been activated. Activation of the cancel button returns the process to the M-channel content list in step 2204. Activation of the save button causes formatting of the message content and/or data device in step 2232. Step 2234 determines if media has been selected for upload. If so, the selected media is uploaded in step 2236. In any case, step 2238 then determines if distribution, delivery and service options have been set. A positive determination results in the setting of the distribution, delivery and service options in step 2240. The process then proceeds to step 2242, in which the generated content item and its associated settings are saved, preferably by storage in a database or other memory or storage device of the system, as indicated at 2244. The process then returns to the M-channel content list in step 2202.

Step 2246 initiates a distribution, delivery and service engine which sends the content item out to a rules-based display engine in step 2250 which then, driven by the options previously selected in steps 2224 and 2226, handles the presentation of the content in a manner appropriate to the mobile devices 15 on which it is to be viewed. The distribution, delivery and service engine may also take into account one or more external services 2248 as indicated. The display engine further provides appropriate interaction mechanisms consistent with the content and its associated options. In addition, alerts and/or other messages can be sent out in step 2252 based on options selected in step 2224 for notifying the recipient(s) that the content item is now available for access via the mobile site. The M-channel content list, and more specifically the item view associated with the particular content item, are updated as appropriate, in steps 2254 and 2256.

Figure 23:
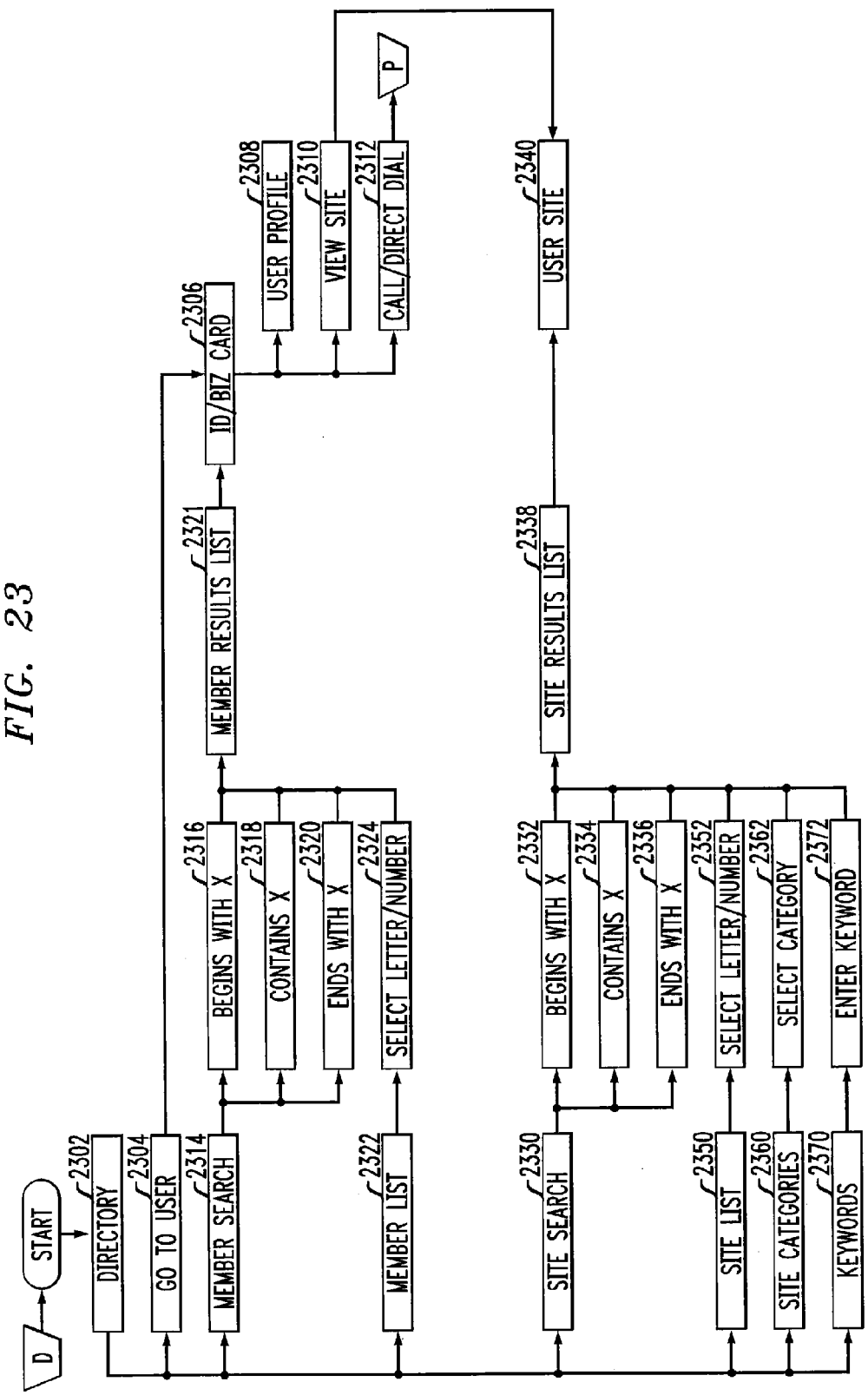
FIG. 23 is an exemplary operational flow diagram of a directory process in accordance with the invention.

FIG. 23 shows an example directory process that may be implemented at the content management site. The directory process is initiated in step 2302, and in step 2304 permits a user to go directly to another user, which may result in the retrieval at step 2306 of the identification card or business card, also referred to herein as an M-card, of the other user. It is also possible in step 2314 to perform a member search, which may include specifying in steps 2316, 2318 and 2320 the respective beginning, containing or ending parameters of the member name. This leads to a member results list in step 2321 that can be used to retrieve one or more M-cards in step 2306. Another option is to view a member list, as indicated in step 2322, from which the user can select a letter and/or a number, leading again to a member results list in step 2321. The M-cards retrieved in step 2306 can be used to provide user profile information in step 2308, to view a mobile site or sites associated with the corresponding user(s) in step 2310, or to call via direct dial or otherwise the corresponding user(s) in step 2312. The direct dial call may be placed to a phone (P) or any other device capable of participating in a voice or data call.

It is also possible from the directory step 2302 to initiate a site search in step 2330, which may include specifying in steps 2332, 2334 and 2336 the respective beginning, containing or ending parameters of the desired site. This leads to a site results list in step 2338 that can be used to retrieve one or more user mobile sites in step 2340. Other mobile site directory functions include generation of a site list in step 2350, leading to user selection of a letter and/or a number in step 2352, generation of site categories in step 2360, leading to user selection of a category in step 2362, and generation of keywords in step 2370, leading to user entry of a particular keyword or keywords in step 2372. Each of these functions results in generation of a site results list in step 2338, from which a user mobile site can be accessed in step 2340.

It is to be appreciated that the processes and their associated steps as described in conjunction with the operational flow diagrams of FIGS. 19 through 23 are merely exemplary, and the invention does not require the particular steps shown, or their particular order of execution.

The above-described illustrative embodiment of the invention provides a number of significant advantages relative to conventional techniques.

For example, the system 10 as described herein is advantageous in that it can be used to allow content providers to cost-effectively publish, distribute and generate revenue from a mobile content service.

Also, the system provides a platform for the development of a wide variety of personalized content applications for users of mobile devices, thereby allowing wireless network service providers not only to increase their subscriber base, but also to reduce turnover in their subscriber base.

Furthermore, the invention allows users to more efficiently communicate, collaborate and otherwise interact with their friends or colleagues instantly and seamlessly within a single system that provides a mobile web site integrating existing wireless networking functionalities, such as IM, SMS, MMS, location-based services, or email, with personally authored content.

Yet another advantage of the system described in conjunction with the illustrative embodiment is that it does not require users to download and install any particular client-side software. The generation of a given mobile site and the management of the content associated therewith is driven in the illustrative embodiment from the content management site at the server side of the system, accessible via a standard browser. The system is configured to operate independently of the user device operating system or other user device configuration parameters, such that a given user may author, create, publish, send, convey, share, receive, respond to, subscribe to, collaborate with, track, transact, maintain and manage personalized messaging content from any type of user device running any operating system.

It should again be emphasized that the illustrative embodiment as described above is presented by way of example only, and should not be construed as limiting in any way. Numerous alternative embodiments within the scope of the appended claims will be readily apparent to those skilled in the art.

What is claimed is:

1. A method comprising:
capturing content at a mobile device;
identifying a previously established application-based information channel into which the captured content is to be inserted, the identified application-based information channel permitting interaction between a user of the mobile device and one or more additional users;
determining information associated with at least one wireless networking functionality of the mobile device;
providing the captured content from the mobile device to at least one server for insertion in association with the determined information into the identified application-based information channel; and
receiving other content, at the mobile device via the identified application-based information channel, from at least one of the additional users.

2. The method of claim 1 wherein the identified application-based information channel comprises a personalized content application.

3. The method of claim 1 wherein the identified application-based information channel comprises a collaborative workspace.

4. The method of claim 1 wherein the identified application-based information channel comprises a chat channel.

5. The method of claim 1 wherein the identified application-based information channel comprises an Internet storefront.

6. The method of claim 1 wherein the information associated with said at least one wireless networking functionality of the mobile device comprises location information of the mobile device.

7. The method of claim 1 wherein the information associated with said at least one wireless networking functionality of the mobile device comprises information specifying at least one location-based service action implementable over said at least one wireless network.

8. The method of claim 1 wherein the information associated with said at least one wireless networking functionality of the mobile device comprises information specifying at least one messaging action implementable over said at least one wireless network.

9. The method of claim 1 wherein the information associated with said at least one wireless networking functionality of the mobile device comprises information specifying at least one collaboration action implementable over said at least one wireless network.

10. The method of claim 1 wherein determining the information associated with said at least one wireless networking functionality of the mobile device comprises:
providing one or more content integration options to the user of the mobile device;
receiving user input selecting at least one of the content integration options; and
determining the information associated with said at least one wireless network functionality of the mobile device in accordance with the selected content integration options.

11. The method of claim 1 wherein providing the one or more content integration options to the user of the mobile device comprises providing a subset of a plurality of content integration options to the user of the mobile device, the subset being based in part on wireless networking functionalities available at the mobile device.

12. The method of claim 1 wherein the information associated with said at least one wireless networking functionality of the mobile device comprises information associated with a billing system accessible to the mobile device via said at least one wireless network.

13. The method of claim 1 wherein the captured content is obtained from a device-captured data source of the mobile device, the device-captured data source comprising a source of at least one of device-captured video data, device-captured image data, device-captured audio data and device-captured location coordinates.

14. The method of claim 1 wherein the mobile device comprises at least one of a mobile telephone, a tablet computer and a camera.

15. The method of claim 1 wherein the mobile device comprises a global positioning system (GPS)-based navigational device.

16. The method of claim 1 wherein the mobile device comprises a watch or other timepiece.

17. A non-transitory computer-readable storage medium having embodied therein executable code of one or more software programs, wherein said executable program code when executed by a processing element of the mobile device causes the mobile device to perform the method of claim 1.

18. A mobile device comprising:
at least one processing element comprising a processor coupled to a memory; and
at least one network interface;
said at least one processing element being configured to:
capture content at the mobile device;
identify a previously established application-based information channel into which the captured content is to be inserted, the identified application-based information channel permitting interaction between a user of the mobile device and one or more additional users;
determine information associated with at least one wireless networking functionality of the mobile device;
provide, via said at least one network interface, the captured content from the mobile device to at least one server for insertion in association with the determined information into the identified application-based information channel; and
receive other content, via the identified application-based information channel, from at least one of the additional users.

19. A method comprising:
receiving, at a server from a mobile device, content for insertion into a previously established application-based information channel, the previously established application-based information channel permitting interaction between a user of the mobile device and one or more additional users;
receiving, at the server from the mobile device, information associated with at least one wireless networking functionality of the mobile device;
integrating the content and the information associated with said at least one wireless networking functionality of the mobile device into the previously established application-based information channel; and
inserting other content from at least one of the additional users into the previously established application-based information channel.

20. The method of claim 19, wherein integrating the content and the information associated with said at least one wireless networking functionality of the mobile device comprises:
obtaining location information of the mobile device; and
inserting additional content into the previously established application-based information channel based on the obtained location information.

21. The method of claim 20 wherein said additional content comprises advertising content.

22. A non-transitory computer-readable storage medium having embodied therein executable code of one or more software programs, wherein said executable program code when executed by a processing element of the server causes the server to perform the method of claim 19.

23. A server comprising:
at least one processing element comprising a processor coupled to a memory; and
at least one network interface;
said at least one processing element being configured to:
receive, from a mobile device, content for insertion into a previously established application-based information channel, the previously established application-based information channel permitting interaction between a user of the mobile device and one or more additional users;
receive, from the mobile device, information associated with at least one wireless networking functionality of the mobile device;
integrate the content and the information associated with said at least one wireless networking functionality of the mobile device into the previously established application-based information channel; and insert other content from at least one of the additional users into the previously established application-based information channel.

24. The method of claim 1 further comprising accessing integrated content at the mobile device via the identified application-based information channel, the integrated content comprising a combination of at least a portion of the captured content and at least a portion of the determined information.

25. The method of claim 1 wherein integrated content is stored by the at least one server, the integrated content comprising a combination of at least a portion of the captured content and at least a portion of the determined information.

26. The method of claim 1 further comprising receiving additional content at the mobile device via the identified application-based information channel, the additional content being based on at least a portion of the determined information.

27. The method of claim 26 wherein the additional content comprises advertising content.

28. The method of claim 1 wherein the application-based information channel is accessible via a mobile website previously established for the user of the mobile device.

29. The method of claim 1 wherein the application-based information channel is accessible via a personalized content application particularly configured to run on the mobile device.

30. The method of claim 1 wherein the other content comprises at least one message relating to the captured content that is received at said at least one server and inserted by said at least one server into the application-based information channel.

* * * * *

UNITED STATES PATENT AND TRADEMARK OFFICE
CERTIFICATE OF CORRECTION

| | | |
|---|---|---|
| PATENT NO. | : 9,032,039 B2 | Page 1 of 1 |
| APPLICATION NO. | : 14/483916 | |
| DATED | : May 12, 2015 | |
| INVENTOR(S) | : David Walker Harper et al. | |

It is certified that error appears in the above-identified patent and that said Letters Patent is hereby corrected as shown below:

In the claims:

Claim 11, column 19, line 34, please change "claim 1" to "claim 10"

Signed and Sealed this
Fifteenth Day of December, 2015

Michelle K. Lee
*Director of the United States Patent and Trademark Office*